US012567665B2

(12) United States Patent
Hiramatsu et al.

(10) Patent No.: US 12,567,665 B2
(45) Date of Patent: Mar. 3, 2026

(54) RADIO WAVE REFRACTING PLATE

(71) Applicant: KYOCERA CORPORATION, Kyoto (JP)

(72) Inventors: Nobuki Hiramatsu, Yokohama (JP); Hiromichi Yoshikawa, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 262 days.

(21) Appl. No.: 18/298,324

(22) Filed: Apr. 10, 2023

(65) Prior Publication Data

US 2023/0327334 A1 Oct. 12, 2023

(30) Foreign Application Priority Data

Apr. 11, 2022 (JP) ................................. 2022-065351

(51) Int. Cl.
*H01Q 1/52* (2006.01)
*H01Q 19/08* (2006.01)

(52) U.S. Cl.
CPC ............. *H01Q 1/526* (2013.01); *H01Q 19/08* (2013.01)

(58) Field of Classification Search
CPC ..... H01Q 1/526; H01Q 19/08; H01Q 15/0026
See application file for complete search history.

(56) References Cited

U.S. PATENT DOCUMENTS

| | | | | |
|---|---|---|---|---|
| 6,054,952 | A * | 4/2000 | Shen | H01Q 9/0407 343/702 |
| 2012/0075692 | A1 | 3/2012 | Baik et al. | |
| 2016/0172750 | A1* | 6/2016 | Ng | H01Q 9/0421 343/841 |
| 2019/0044244 | A1 | 2/2019 | Kristou et al. | |
| 2020/0411954 | A1* | 12/2020 | Jia | H01Q 15/0026 |

FOREIGN PATENT DOCUMENTS

| | | | |
|---|---|---|---|
| JP | 2015231182 | A | 12/2015 |
| JP | 2021057722 | A | 4/2021 |
| JP | 2022039867 | A | 3/2022 |
| JP | 2022165403 | A | 10/2022 |
| KR | 1020120031735 | A | 4/2012 |
| KR | 1020120070498 | A | 6/2012 |

* cited by examiner

*Primary Examiner* — Dieu Hien T Duong
*Assistant Examiner* — Austin M Back
(74) *Attorney, Agent, or Firm* — HAUPTMAN HAM, LLP

(57) ABSTRACT

A radio wave refracting plate includes a plurality of unit structures arrayed in a first plane direction and a reference conductor serving as a reference potential of the plurality of unit structures. The plurality of unit structures is represented by an equivalent circuit including three or more resonant circuits.

16 Claims, 55 Drawing Sheets

1C

RADIO WAVE REFRACTING PLATE

RELATED APPLICATIONS

The present application claims priority based on Japanese Patent Application No. 2022-065351, filed Apr. 11, 2022, which is incorporated by reference herein in its entirety.

TECHNICAL FIELD

The present disclosure relates to a radio wave refracting plate.

BACKGROUND OF INVENTION

A known technique involves controlling electromagnetic waves without using a dielectric lens. For example, Patent Document 1 describes a technique of refracting radio waves by changing parameters of respective elements in a structure including an array of resonator elements.

CITATION LIST

Patent Literature

Patent Document 1: JP 2015-231182 A

SUMMARY

Problem to be Solved

In the resonator element described in Patent Document 1, even when the parameters are changed, an amount of change in phase of only 180° can be achieved. For example, a configuration in which a refraction angle of one resonator element is set to 30° and the amount of change in phase is set to 180° has limitations, such as that a radio wave refracting plate can only have a maximum size of about 1 cm. A radio wave refracting plate free from size limitation has been in demand.

The present disclosure provides a radio wave refracting plate free from size limitation.

Solution to Problem

In the present disclosure, a radio wave refracting plate includes a plurality of unit structures and a reference conductor. The plurality of unit structures are arrayed in a first plane direction. The reference conductor serves as a reference potential of the plurality of unit structures. The plurality of unit structures are represented by an equivalent circuit including three or more resonant circuits.

In the present disclosure, a radio wave refracting plate includes a plurality of unit structures and a reference conductor. The plurality of unit structures are arrayed in a first plane direction. The reference conductor serves as a reference potential of the plurality of unit structures. The plurality of unit structures include: three or more resonators extending in the first plane direction; and a connector including the reference conductor, the connector magnetically or capacitively connecting the resonators.

In the present disclosure, a radio wave refracting plate includes a plurality of unit structures and a reference conductor. The plurality of unit structures are arrayed in a first plane direction. The reference conductor serves as a reference potential of the plurality of unit structures. The plurality of unit structures include: a first resonator extending in the first plane direction; a second resonator positioned away from the first resonator in a first direction and extending in the first plane direction; and a connector magnetically or capacitively connecting the first resonator and the second resonator in the first direction.

In the present disclosure, a radio wave refracting plate includes a plurality of unit structures, a reference conductor, a first resonator, and a second resonator. The plurality of unit structures are arrayed in a first plane direction. The reference conductor is entirely connected across the plurality of unit structures and serves as a reference potential. The first resonator receives an electromagnetic wave from a free space and is coupled to the electromagnetic wave. The second resonator outputs an electromagnetic wave to the free space and is coupled to the electromagnetic wave. The first resonator and the second resonator are electromagnetically coupled to a third resonator group including one or more resonators disposed in a stacking direction. Main coupling is dependently coupled between the resonators. The plurality of unit structures are represented by an equivalent circuit whose coupling and frequency are adjusted by the reference conductor.

Advantageous Effect

According to the present disclosure, the radio wave refracting plate free from size limitation can be provided.

DESCRIPTION OF EMBODIMENTS

Embodiments of the present disclosure will be described in detail with reference to the drawings. The embodiments descried below do not limit the present disclosure.

In the following description, an XYZ orthogonal coordinate system is set, and the positional relationship between respective portions will be described by referring to the XYZ orthogonal coordinate system. A direction parallel to an X-axis in a horizontal plane is defined as an X-axis direction, a direction parallel to a Y-axis orthogonal to the X-axis in the horizontal plane is defined as a Y-axis direction, and a direction parallel to a Z-axis orthogonal to the horizontal plane is defined as a Z-axis direction. A plane including the X-axis and the Y-axis is appropriately referred to as an XY plane, a plane including the X-axis and the Z-axis is appropriately referred to as an XZ plane, and a plane including the Y-axis and the Z-axis is appropriately referred to as a YZ plane. The XY plane is parallel to the horizontal plane. The XY plane, the XZ plane, and the YZ plane are orthogonal to each other.

Overview

Figure 1:
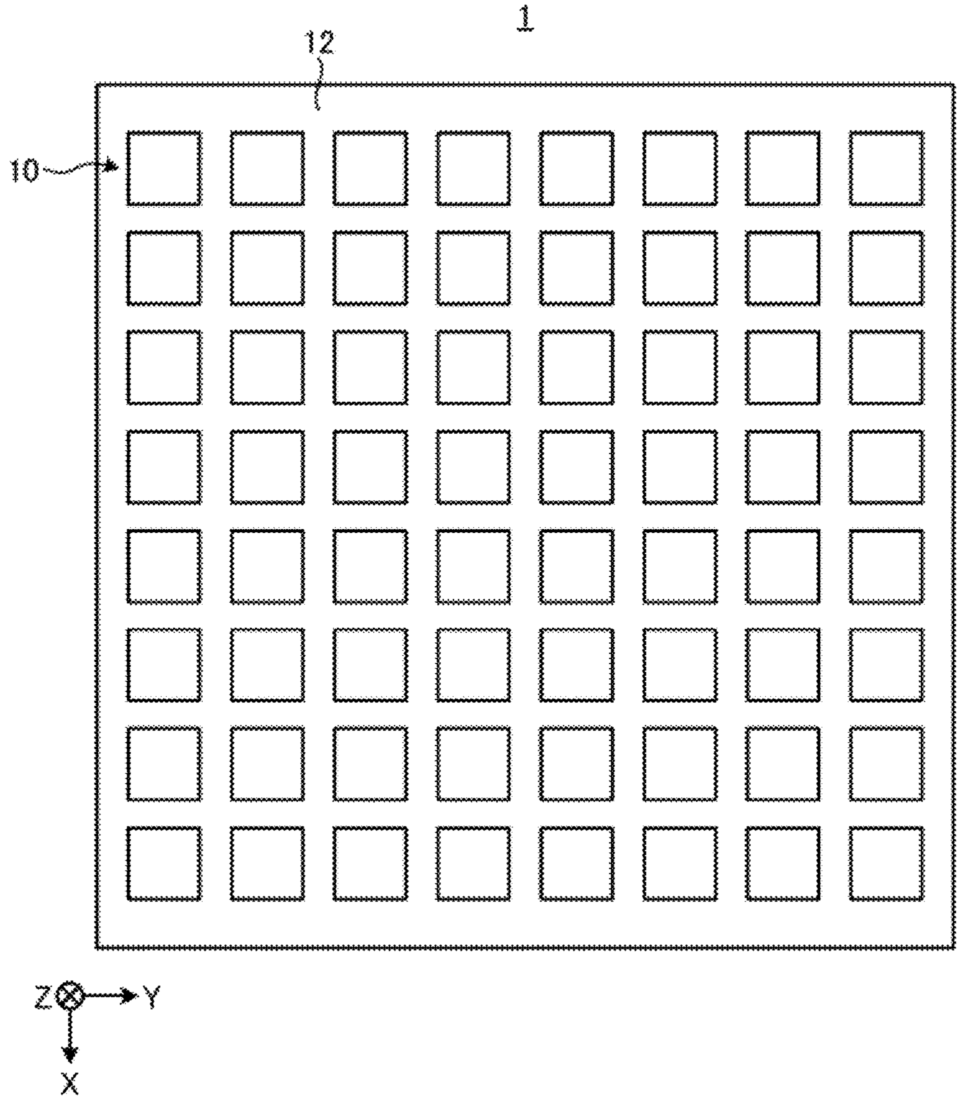
FIG. 1 is a diagram illustrating an overview of a radio wave refracting plate according to each embodiment.

An overview of a radio wave refracting plate according to each embodiment will be described with reference to FIG. 1. FIG. 1 is a diagram illustrating an overview of the radio wave refracting plate according to each embodiment.

As illustrated in FIG. 1, a radio wave refracting plate 1 includes a plurality of unit structures 10 and a substrate 12.

The plurality of unit structures 10 are arranged in the XY plane direction. The XY plane direction may also be referred to as a first plane direction. That is, the plurality of unit structures 10 are arranged two-dimensionally. In the present embodiment, each of the plurality of unit structures 10 has a resonance structure. The structure of the unit structure 10 will be described later. The substrate 12 may be, for example, a dielectric substrate made of a dielectric body. That is, in the radio wave refracting plate 1 of the present embodiment, the plurality of unit structures 10 each having a resonance structure are two-dimensionally arranged on the substrate 12 made of a dielectric body.

First Embodiment

Radio Wave Refracting Plate

Figure 2:
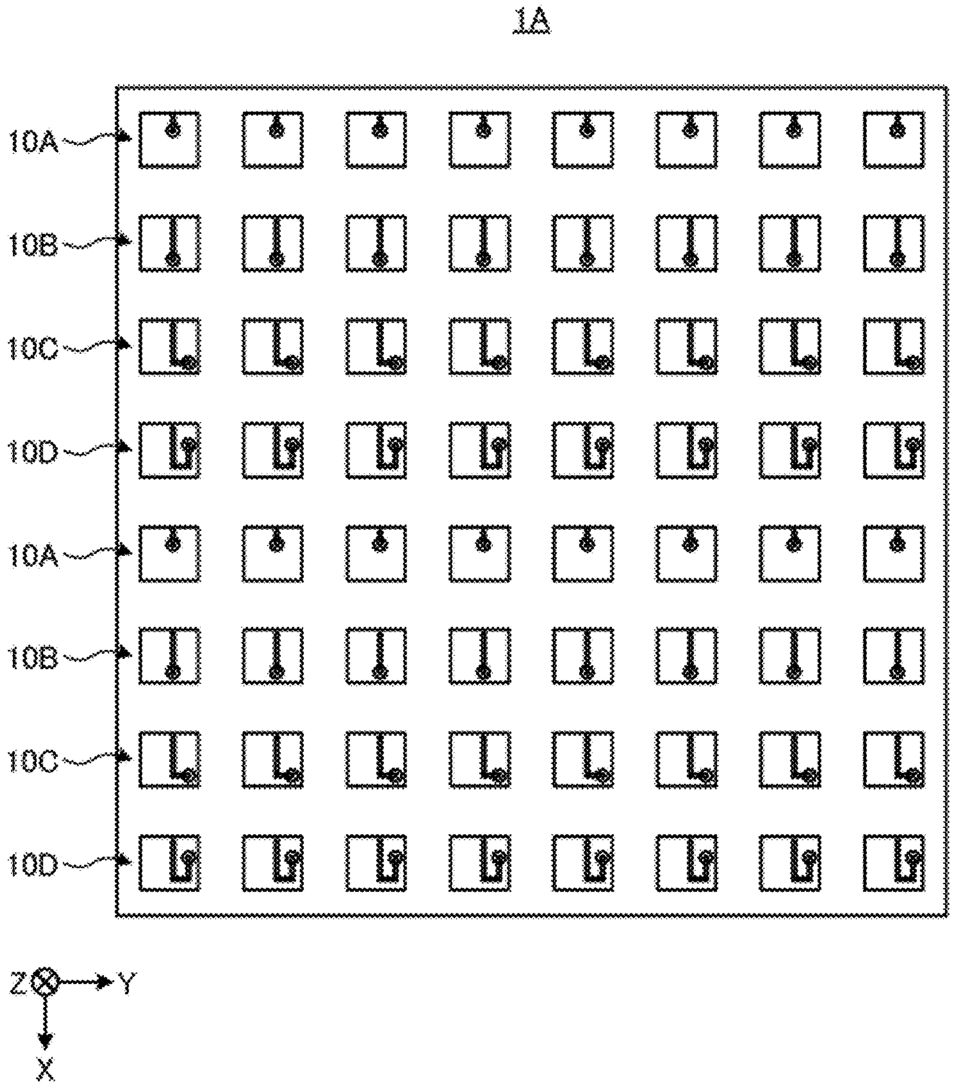
FIG. 2 is a diagram illustrating a configuration example of a radio wave refracting plate according to a first embodiment.

A configuration example of the radio wave refracting plate according to the first embodiment will be described with reference to FIG. 2. FIG. 2 is a diagram illustrating a configuration example of the radio wave refracting plate according to the first embodiment.

As illustrated in FIG. 2, a radio wave refracting plate 1A according to the first embodiment includes a plurality of unit structures 10A, a plurality of unit structures 10B, a plurality of unit structures 10C, and a plurality of unit structures 10D. The unit structures 10A, the unit structures 10B, the unit structures 10C, and the unit structures 10D are two-dimensionally arranged in the XY plane. The unit structures 10A, the unit structures 10B, the unit structures 10C, and the unit structures 10D are arranged in a lattice pattern in the XY plane. In the radio wave refracting plate 1A, the two unit structures adjacent in the X direction or the Y direction, which is an in-plane direction of the XY plane, generate a phase difference between phases of electromagnetic waves incident from first resonators 14 (see FIG. 6) and radiated from second resonators 16 (see FIG. 6).

In the example illustrated in FIG. 2, the plurality of unit structures 10A are arranged in a first row of the radio wave refracting plate 1A along the Y direction. The plurality of unit structures 10B are arranged in a second row of the radio wave refracting plate 1A along the Y direction. The plurality of unit structures 10C are arranged in a third row of the radio wave refracting plate 1A along the Y direction. The plurality of unit structures 10D are arranged in a fourth row of the radio wave refracting plate 1A along the Y direction. The plurality of unit structures 10A are arranged in a fifth row of the radio wave refracting plate 1A along the Y direction. The plurality of unit structures 10B are arranged in a sixth row of the radio wave refracting plate 1A along the Y direction. The plurality of unit structures 10C are arranged in a seventh row of the radio wave refracting plate 1A along the Y direction. The plurality of unit structures 10D are arranged in an eighth row of the radio wave refracting plate 1A along the Y direction.

The unit structures 10A and the unit structures 10B are arranged adjacent in the X direction. The unit structures 10B and the unit structures 10C are arranged adjacent in the X direction. The unit structures 10C and the unit structures 10D are arranged adjacent in the X direction. The unit structures 10D and the unit structures 10A are arranged adjacent in the X direction.

The length of a connection line path 20 (see FIG. 6) differs between the unit structure 10A, the unit structure 10B, the unit structure 10C, and the unit structure 10D. For example, the connection line path 20 becomes longer in the order of the unit structure 10A, the unit structure 10B, the unit structure 10C, and the unit structure 10D. That is, each of the unit structure 10A, the unit structure 10B, the unit structure 10C, and the unit structure 10D changes the phase of the electromagnetic wave incident on the first resonator 14 and radiates the electromagnetic wave from the second resonator 16.

Figure 3:
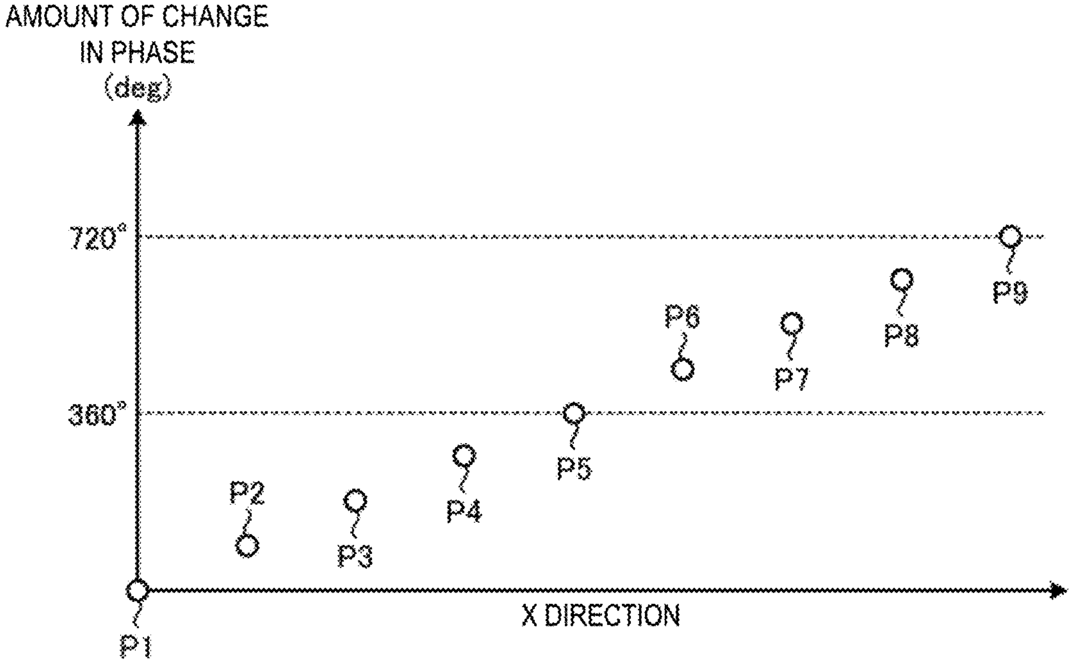
FIG. 3 is a graph showing an amount of change in phase of a unit structure.

The amount of change in phase of the unit structure according to the first embodiment will be described with reference to FIG. 3. FIG. 3 is a graph showing the amount of change in phase of the unit structure.

In the present embodiment, in the example illustrated in FIG. 2, the four unit structures of the unit structure 10A, the unit structure 10B, the unit structure 10C, and the unit structure 10D change the phases of the electromagnetic waves incident on the radio wave refracting plate 1A by 360°. FIG. 3 shows the amount of change in phase in the X-axis direction. Specifically, FIG. 3 shows an example in which a direction of a plane wave arriving at the radio wave refracting plate 1A is refracted and radiated as a plane wave. A point P1 indicates the phase of the incident electromagnetic wave, and the amount of change in phase is 0°. A point P2 indicates the amount of change in phase of the first unit structure 10A in the X-axis direction, and the amount of change in phase is 90°. A point P3 indicates the amount of change in phase of the first unit structure 10B in the X-axis direction, and the amount of change in phase is 180°. A point P4 indicates the amount of change in phase of the first unit structure 10C in the X-axis direction, and the amount of change in phase is 270°. A point P5 indicates the amount of change in phase of the first unit structure 10D in the X-axis direction, and the amount of change in phase is 360°. A point P6, a point P7, a point P8, and a point P9 indicate the amounts of change in phase of a second unit structure 10A, a second unit structure 10B, a second unit structure 10C, and a second unit structure 10D, respectively. The amounts of change in phase of the second unit structure 10A, the second unit structure 10B, the second unit structure 10C, and the second unit structure 10D are 450°, 540°, 630°, and 720°, respectively. That is, in the present embodiment, the four unit structures of the unit structure 10A, the unit structure 10B, the unit structure 10C, and the unit structure 10D change the phases of the electromagnetic waves arriving at the radio wave refracting plate 1A by 360°.

The unit structure 10 may be referred to as a unit cell. For example, each of the unit structures 10A, 10B, 10C, and 10D may be referred to as a unit cell. A repeating unit in which a plurality of unit cells having different structures is arranged may be referred to as a supercell. For example, arrangement of the unit structures 10A, 10B, 10C, and 10D may be referred to as a supercell. The supercell may have a function, such as causing the phase change from 0° to 360°. The area of the radio wave refracting plate 1 may be increased by forming the supercell as a cell of one unit. Note that the unit of phase change that may be the supercell is not limited to from 0° to 360°, and one unit may be from 0° to 360°×n times (where n is a natural number).

That is, in the example illustrated in FIG. 2, in the plurality of unit structures arranged in the X-axis direction, the phase difference becomes larger with respect to a reference unit structure (for example, the unit structure 10A) as the phase advances in the X direction or the —X direction. In the example illustrated in FIG. 3, in the plurality of unit structures arranged in the X-axis direction, the phase advances or retards by a first phase difference (for example, 90°) as the phase advances in the X direction or the —X direction.

In the radio wave refracting plate 1A, when an interval between adjacent unit structures is d, a difference between the adjacent amounts of change in phase is $\Delta\Phi$, an angle at which the electromagnetic wave arriving at the radio wave refracting plate 1A is refracted is $\theta$, and a wave number of the electromagnetic wave arriving at the radio wave refracting plate 1A is k, the relationship of "$\Delta\Phi=kd \sin \theta$" is established. In the example of FIG. 3, a gradient of the amount of change in phase is depicted as the X-axis direction, but the present disclosure is not limited thereto. In the present disclosure, the refraction direction can be arbitrarily designed by setting the gradient of the amount of change in phase to any direction. In the example of FIG. 3, the amount of change in phase is depicted as a linear change, but the present disclosure is not limited thereto. In the present disclosure, for example, changing the gradient of the amount of change in phase to a curve allows the plane wave arriving at the radio wave refracting plate 1A to converge to any place or to diffuse.

In the example shown in FIG. 3, the phase difference of the electromagnetic waves radiated from two unit structures adjacent in the X-axis direction is described as 90°, but the present disclosure is not limited thereto. The phase difference between the electromagnetic waves radiated from two adjacent unit structures may be, for example, 30°, 45°, or 60°. That is, the phase difference between the electromagnetic waves radiated from two adjacent unit structures may be arbitrary.

In the example illustrated in FIG. 3, each of the phase difference between the electromagnetic waves radiated by the unit structure 10A and the unit structure 10B, the phase difference between the electromagnetic waves radiated by the unit structure 10B and the unit structure 10C, the phase difference between the electromagnetic waves radiated by the unit structure 10C and the unit structure 10D, and the phase difference between the electromagnetic waves radiated by the unit structure 10D and the unit structure 10A are the same, 90°, but the present disclosure is not limited thereto. The respective phase difference of the electromagnetic waves radiated by the unit structure 10A and the unit structure 10B, the phase difference of the electromagnetic waves radiated by the unit structure 10B and the unit structure 10C, the phase difference of the electromagnetic waves radiated by the unit structure 10C and the unit structure 10D, and the phase difference of the electromagnetic waves radiated by the unit structure 10D and the unit structure 10A may be different. The phase difference of the electromagnetic waves radiated by the unit structure 10A and the unit structure 10B, the phase difference of the electromagnetic waves radiated by the unit structure 10B and the unit structure 10C, the phase difference of the electromagnetic waves radiated by the unit structure 10C and the unit structure 10D, and the phase difference of the electromagnetic waves radiated by the unit structure 10D and the unit structure 10A only need to be set according to design, usage, and/or the like.

As described above, in the first embodiment, the plurality of unit structures including the connection line paths 20 different in length is two-dimensionally arrayed to change the phase of the arriving electromagnetic wave by 360°. Thus, in the first embodiment, repeating the sets of arrays to change the phase of the arriving electromagnetic wave by 360° makes it possible to increase the area of the radio wave refracting plate 1A.

In the first embodiment, using the radio wave refracting plate 1A to refract radio waves for a place where radio wave intensity was weak and communication failed increases the radio wave intensity, allowing expansion of the communicable area. In the first embodiment, increasing the area of the radio wave refracting plate 1A allows further expansion of the communicable area. Since gain can be increased as the area of the radio wave refracting plate 1A increases, refracting the radio waves to converge to a predetermined place allows gain to be further improved. Thus, for example, even when a window pane or a wall with large attenuation of the radio wave is present between the radio wave refracting plate 1A and the place where the radio waves are refracted to converge, stable communication can established even after the radio waves pass through the window pane or the wall.

Second Embodiment

A second embodiment of the present disclosure will be described.

In the first embodiment, the amount of change in phase is changed by two-dimensionally arraying, in a lattice pattern, the unit structures 10A, the unit structures 10B, the unit structures 10C, and the unit structures 10D in which the lengths of the connection line paths connecting the first resonators 14 and the second resonators 16 are different. On the other hand, in the second embodiment, the amount of change in phase is changed by changing the areas of the first resonators 14 and the second resonators 16 without changing the lengths of the connection line paths connecting the first resonators 14 and the second resonators 16.

Radio Wave Refracting Plate

Figure 4:
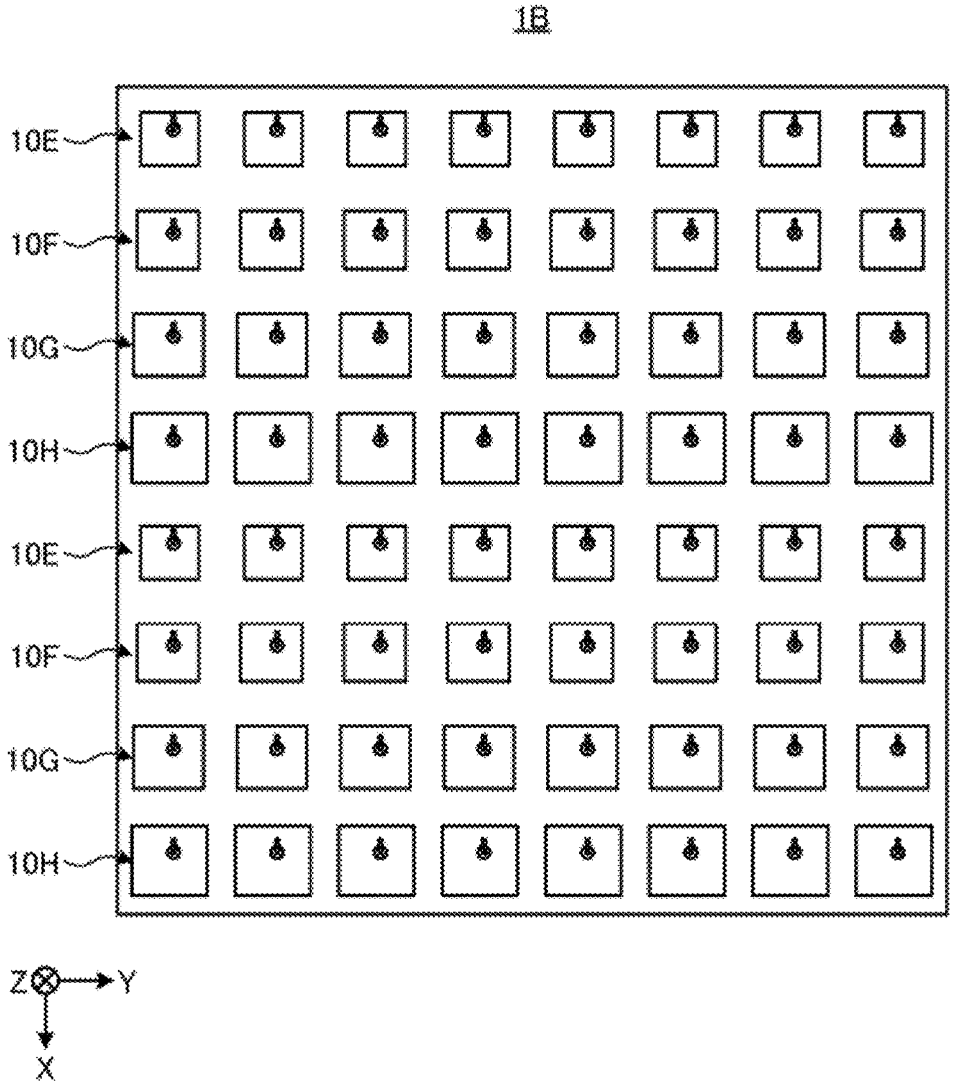
FIG. 4 is a diagram illustrating a configuration example of a radio wave refracting plate according to a second embodiment.

A configuration example of the radio wave refracting plate according to the second embodiment will be described with reference to FIG. 4. FIG. 4 is a diagram illustrating a configuration example of the radio wave refracting plate according to the second embodiment.

As illustrated in FIG. 4, a radio wave refracting plate 1B according to the second embodiment includes a plurality of unit structures 10E, a plurality of unit structures 10F, a plurality of unit structures 10G, and a plurality of unit structures 10H. The unit structures 10E, the unit structures 10F, the unit structures 10G, and the unit structures 10H are two-dimensionally arranged in the XY plane. The unit structures 10E, the unit structures 10F, the unit structures 10G, and the unit structures 10H are arranged in a lattice pattern in the XY plane. The unit structures 10E, the unit structures 10F, the unit structures 10G, and the unit structures 10H each change the phase of the electromagnetic wave incident on the first resonator 14 and radiate the electromagnetic wave from the second resonator 16. In the radio wave refracting plate 1B, two unit structures adjacent in the X direction or the Y direction, which is an in-plane direction of the XY plane, generate a phase difference between phases of electromagnetic waves incident from the first resonators 14 and radiated from the second resonators 16.

In the example illustrated in FIG. 4, the plurality of unit structures 10E are arranged in the first row along the Y direction of the radio wave refracting plate 1B. The plurality of unit structures 10F are arranged in a second row of the radio wave refracting plate 1B along the Y direction. The plurality of unit structures 10G are arranged in a third row of the radio wave refracting plate 1B along the Y direction. The plurality of unit structures 10H are arranged in a fourth row of the radio wave refracting plate 1B along the Y direction. The plurality of unit structures 10E are arranged in a fifth row of the radio wave refracting plate 1B along the Y direction. The plurality of unit structures 10F are arranged in a sixth row of the radio wave refracting plate 1B along the Y direction. The plurality of unit structures 10G are arranged in a seventh row of the radio wave refracting plate 1B along the Y direction. The plurality of unit structures 10H are arranged in an eighth row of the radio wave refracting plate 1B along the Y direction.

The areas of the first resonators 14 and the second resonators 16 differ between the unit structure 10E, the unit structure 10F, the unit structure 10G, and the unit structure 10H. For example, the areas of the first resonators 14 and the second resonators 16 increase in the order of the unit structure 10E, the unit structure 10F, the unit structure 10G, and the unit structure 10H. That is, the unit structure 10E, the unit structure 10F, the unit structure 10G, and the unit structure 10H have different resonance frequencies. That is, in the second embodiment, the amount of change in phase is changed by changing the resonance frequency according to the position where each of the unit structures is arranged in the radio wave refracting plate 1B.

In the second embodiment, in the example illustrated in FIG. 4, the four unit structures of the unit structure 10E, the unit structure 10F, the unit structure 10G, and the unit structure 10H change the phases of electromagnetic waves incident on the radio wave refracting plate 1B by 360°. Since the phase difference between the two adjacent radio wave refracting plates 1B is as that shown in FIG. 3, the description thereof is omitted.

As described above, in the second embodiment, the plurality of unit structures having the different areas of the first resonators 14 and the second resonators 16 are two-dimensionally arrayed to change the phases of the arriving electromagnetic waves by 360°. Thus, in the second embodiment, repeating the sets of arrays to change the phase of the arriving electromagnetic wave by 360° makes it possible to increase the area of the radio wave refracting plate 1B.

In the first embodiment, the plurality of unit structures having the different path lengths of the connection line paths 20 are arranged to configure the radio wave refracting plate, and in the second embodiment, the plurality of unit structures having the different areas of the first resonators 14 and the second resonators 16 are arranged to configure the radio wave refracting plate. However, no limitation is intended. The first embodiment and the second embodiment may be combined in the present disclosure.

That is, in the present disclosure, when each of the unit structures are two-dimensionally arrayed, the path lengths of the connection line paths 20 may be changed and the areas of the first resonators 14 and the second resonators 16 may be changed according to the positions where the unit structures are arranged. Thus, the present disclosure allows the radio wave refracting plate to be designed with a higher degree of freedom.

Although the path length of the connection line path 20 is changed to control the amount of change in phase in the first embodiment and the areas of the first resonator 14 and the second resonator 16 are changed to control the amount of change in phase in the second embodiment, the present disclosure is not limited thereto. In the present disclosure, the distance between the first resonator 14 and a reference conductor 18 and the distance between the second resonator 16 and the reference conductor 18 may be changed to control the amount of change in phase. In this case, the distance between the first resonator 14 and the reference conductor 18 and the distance between the second resonator 16 and the reference conductor 18 may be the same or different.

Third Embodiment

A configuration of a radio wave refracting plate and a configuration of unit structures according to the third embodiment will be described.

Radio Wave Refracting Plate

Figure 5:
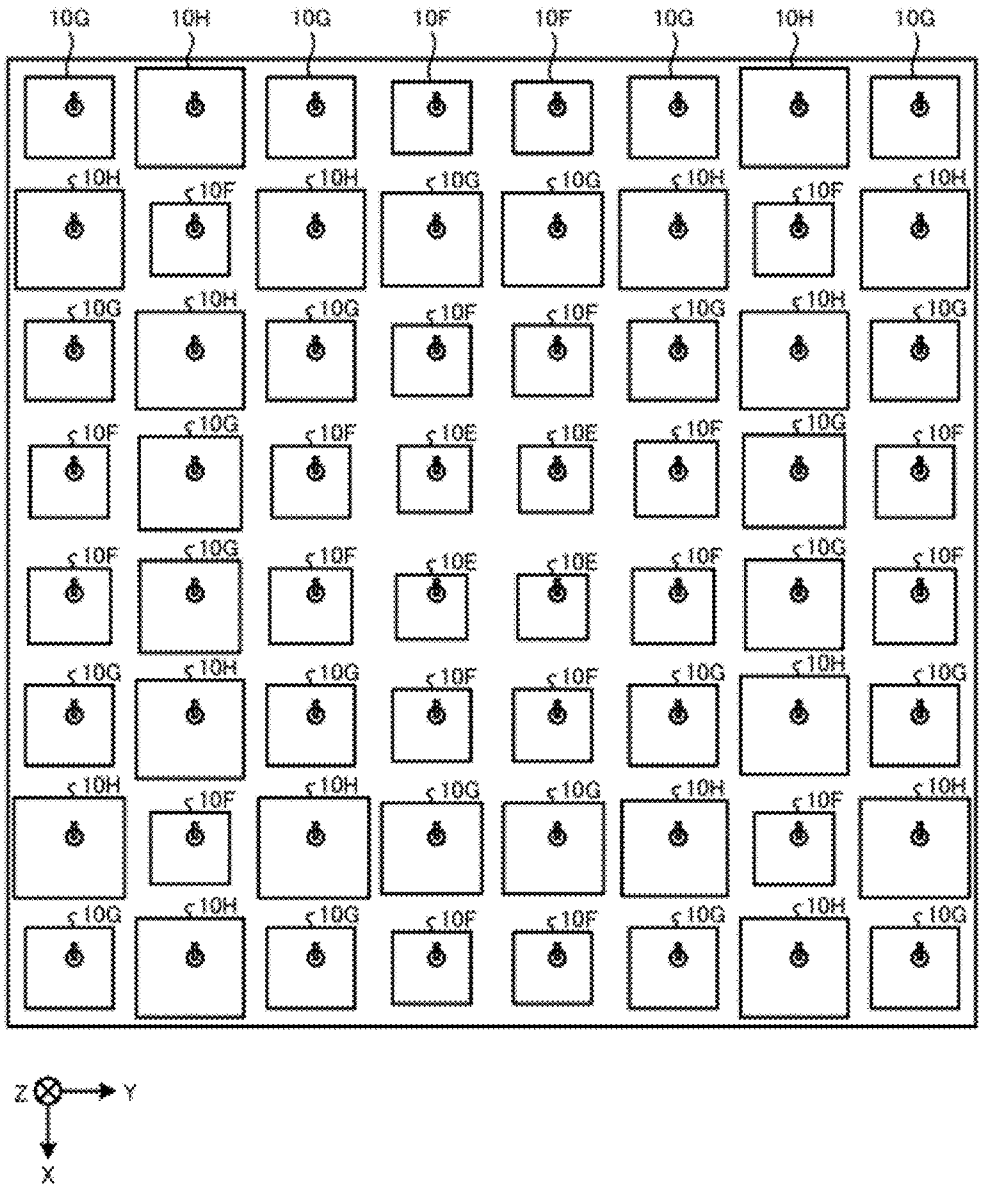
FIG. 5 is a diagram illustrating a configuration example of a radio wave refracting plate according to a third embodiment.

A configuration example of the radio wave refracting plate according to the third embodiment will be described with reference to FIG. 5. FIG. 5 is a diagram illustrating the configuration example of the radio wave refracting plate according to the third embodiment.

As illustrated in FIG. 5, a radio wave refracting plate 1C according to another embodiment includes the plurality of unit structures 10E, the plurality of unit structures 10F, the plurality of unit structures 10G, and the plurality of unit structures 10H. The radio wave refracting plate 1C differs from the radio wave refracting plate 1B illustrated in FIG. 4 in that the unit structures 10E, the unit structures 10F, the unit structures 10G, and the unit structures 10H are radially arranged in the XY plane. In the radio wave refracting plate 1C, the two unit structures adjacent in the X direction or the Y direction, which is an in-plane direction of the XY plane, generate a phase difference between phases of electromagnetic waves incident from the first resonators 14 and radiated from the second resonators 16.

In the example illustrated in FIG. 5, in the first row of the radio wave refracting plate 1C along the Y direction, the unit structure 10G, the unit structure 10H, the unit structure 10G, the unit structure 10F, the unit structure 10F, the unit structure 10G, the unit structure 10H, and the unit structure 10G are arranged in this order.

In the example illustrated in FIG. 5, in the second row of the radio wave refracting plate 1C along the Y direction, the unit structure 10H, the unit structure 10F, the unit structure 10H, the unit structure 10G, the unit structure 10G, the unit structure 10H, the unit structure 10F, and the unit structure 10H are arranged in this order.

In the example illustrated in FIG. 5, in the third row of the radio wave refracting plate 1C along the Y direction, the unit structure 10G, the unit structure 10H, the unit structure 10G, the unit structure 10F, the unit structure 10F, the unit structure 10G, the unit structure 10H, and the unit structure 10G are arranged in this order.

In the example illustrated in FIG. 5, in the fourth row of the radio wave refracting plate 1C along the Y direction, the unit structure 10F, the unit structure 10G, the unit structure 10F, the unit structure 10E, the unit structure 10E, the unit structure 10F, the unit structure 10G, and the unit structure 10F are arranged in this order.

In the example illustrated in FIG. 5, in the fifth row of the radio wave refracting plate 1C along the Y direction, the unit structure 10F, the unit structure 10G, the unit structure 10F, the unit structure 10E, the unit structure 10E, the unit structure 10F, the unit structure 10G, and the unit structure 10F are arranged in this order.

In the example illustrated in FIG. 5, in the sixth row of the radio wave refracting plate 1C along the Y direction, the unit structure 10G, the unit structure 10H, the unit structure 10G, the unit structure 10F, the unit structure 10F, the unit structure 10G, the unit structure 10H, and the unit structure 10G are arranged in this order.

In the example illustrated in FIG. 5, in the seventh row of the radio wave refracting plate 1C along the Y direction, the unit structure 10H, the unit structure 10F, the unit structure 10H, the unit structure 10G, the unit structure 10G, the unit structure 10H, the unit structure 10F, and the unit structure 10H are arranged in this order.

In the example illustrated in FIG. 5, in the eighth row of the radio wave refracting plate 1C along the Y direction, the unit structure 10G, the unit structure 10H, the unit structure 10G, the unit structure 10F, the unit structure 10F, the unit structure 10G, the unit structure 10H, and the unit structure 10G are arranged in this order.

That is, in the central region of the radio wave refracting plate 1C, of the unit structure 10E, the unit structure 10F, the unit structure 10G, and the unit structure 10H, four of the unit structures 10E in which the areas of the first resonators 14 and the second resonators 16 are the smallest are arranged. In the radio wave refracting plate 1C, the unit structures 10F, the unit structures 10G, and the unit structures 10H are radially arranged around the four unit structures 10E. In the example illustrated in FIG. 5, the four unit structures of the unit structure 10E, the unit structure 10F, the unit structure 10G, and the unit structure 10H change the phases of the electromagnetic waves incident on the radio wave refracting plate 1C by 360°. In the radio wave refracting plate 1C, unit structures adjacently located in a first radiation direction, which is an in-plane direction of the XY plane, generate a phase difference (for example, 90°) when the electromagnetic waves incident on the first resonators 14 are radiated from the second resonators 16. In the plurality of unit structures arranged in the first radiation direction of the XY plane in the radio wave refracting plate 1C, the phase difference increases with respect to a reference unit structure (for example, the unit structure 10E) as the positions advance in a direction from the center toward the outside or a direction from the outside toward the center. In the plurality of unit structures arranged in the first radiation direction of the XY plane in the radio wave refracting plate 1C, the phase advances or retards by a second phase difference (for example, 90°) as the positions advance in a direction from the center toward the outside or a direction from the outside toward the center.

Fourth Embodiment

A configuration example of the unit structure included in the radio wave refracting plate according to each embodiment of the present disclosure will be described.

Configuration of Unit Structure

Figure 6:
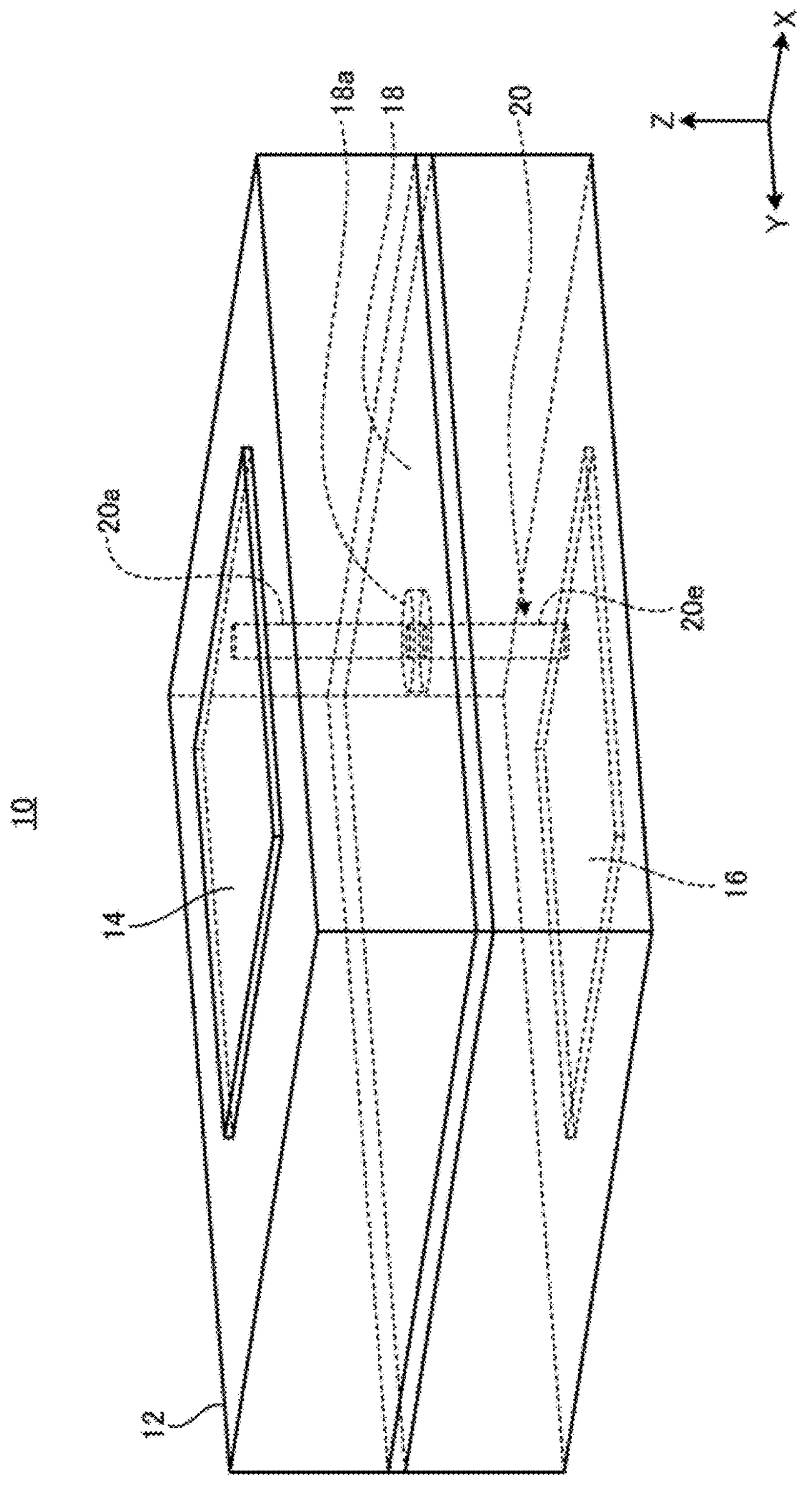
FIG. 6 is a diagram illustrating a configuration example of a unit structure according to a fourth embodiment.

The configuration of the unit structure according to the fourth embodiment will be described with reference to FIG. 6. FIG. 6 is a diagram illustrating the configuration of the unit structure according to the fourth embodiment.

As illustrated in FIG. 6, the unit structure 10 includes the first resonator 14, the second resonator 16, the reference conductor 18, and the connection line path 20.

The first resonator 14 may be arranged on the substrate 12, extending on the XY plane. The first resonator 14 may be made of a conductor. The first resonator 14 may be, for example, a patch conductor formed in a rectangular shape. In the example illustrated in FIG. 6, the first resonator 14 is illustrated as the rectangular patch conductor, but the present disclosure is not limited thereto. The first resonator 14 may have, for example, a linear shape, a circular shape, a loop shape, or a polygonal shape other than a rectangular shape. That is, the shape of the first resonator 14 may be arbitrarily changed according to the design. The first resonator 14 resonates by an electromagnetic wave received from the +Z-axis direction.

The first resonator 14 radiates an electromagnetic wave during resonance. The first resonator 14 radiates the electromagnetic wave to the +Z-axis direction side during resonance.

The second resonator 16 may be arranged on the substrate 12 to extend on the XY plane at a position away from the first resonator 14 in the Z-axis direction. The second resonator 16 may be, for example, a patch conductor formed in a rectangular shape. In the example illustrated in FIG. 6, the second resonator 16 is illustrated as the rectangular patch conductor, but the present disclosure is not limited thereto. The second resonator 16 may have, for example, a linear shape, a circular shape, a loop shape, or a polygonal shape other than a rectangular shape. That is, the shape of the second resonator 16 may be arbitrarily changed according to the design. The shape of the second resonator 16 may be the same as or different from the shape of the first resonator 14. The area of the second resonator 16 may be the same as or different from the area of the first resonator 14.

The second resonator 16 radiates an electromagnetic wave during resonance. The second resonator 16, for example, radiates the electromagnetic wave to the —Z-axis direction side. The second resonator 16 radiates the electromagnetic wave to the —Z-axis direction side during resonance. The second resonator 16 resonates by receiving the electromagnetic wave from the —Z-axis direction.

The second resonator 16 may resonate at a phase different from that of the first resonator 14. The second resonator 16 may resonate in a direction different from the resonance direction of the first resonator 14 in the XY plane direction. For example, when the first resonator 14 resonates in the X-axis direction, the second resonator 16 may resonate in the Y-axis direction. The resonance direction of the second resonator 16 may change with time in the XY plane direction corresponding to change with time in the resonance direction of the first resonator 14. The second resonator 16 may radiate the electromagnetic wave received by the first resonator 14 with a first frequency band thereof attenuated.

The reference conductor 18 may be arranged between the first resonator 14 and the second resonator 16 in the substrate 12. The reference conductor 18 may be, for example, at the center between the first resonator 14 and the second resonator 16 in the substrate 12, but the present disclosure is not limited thereto. For example, the reference conductor 18 may be at a position where the distance from the reference conductor 18 to the first resonator 14 differs from the distance from the reference conductor 18 to the second resonator 16. The reference conductor 18 has a through-hole 18*a* through which the connection line path 20 extends. The reference conductor 18 surrounds at least a part of the connection line path 20.

The connection line path 20 may be made of a conductor. The connection line path 20 is located between the first resonator 14 and the second resonator 16 in the Z-axis direction. The Z-axis direction may also be referred to as a first direction, for example. The connection line path 20 may be connected to each of the first resonator 14 and the second resonator 16. Although the connection line path 20 passes through the through-hole 18*a*, the connection line path 20 is not in contact with the reference conductor 18. The connection line path 20 may be magnetically or capacitively connected to each of the first resonator 14 and the second resonator 16, for example. For example, the connection line path 20 may be electrically connected to each of the first resonator 14 and the second resonator 16. The connection line path 20 is connected to a side of the first resonator 14 parallel to the X-axis direction and is connected to a side of the second resonator 16 parallel to the X-axis direction. The connection line path 20 may be a path parallel to the Z-axis direction. The connection line path 20 may be a third resonator. That is, the unit structure 10 may be represented by an equivalent circuit including three LC resonant circuits. For example, the unit structure 10 may be represented by an equivalent circuit including three or more LC resonant circuits. In other words, the unit structure 10 may include three or more resonators. In this case, the connection line path 20 is located between the respective resonators. In this case, the connection line path 20 magnetically or capacitively connects the respective resonators.

The unit structure 10 magnetically or capacitively connects the first resonator 14 and the second resonator 16 or electrically connects them to be combined. By combining the three resonators, the unit structure 10 transmits a high frequency excited by an electromagnetic wave incident on the first resonator 14 through the composite resonator. The unit structure 10 may have any one or more functions of a phase shift, a band-pass filter, a high-pass filter, and a low-pass filter depending on the transmission characteristics of the composite resonator.

The unit structure 10 changes the phase of the electromagnetic wave incident on the first resonator 14 and radiates the electromagnetic wave from the second resonator 16. The amount of change in phase changes depending on the length of the connection line path 20. The amount of change in phase also changes depending on the area of the first resonator 14 or the second resonator 16.

Figure 7:
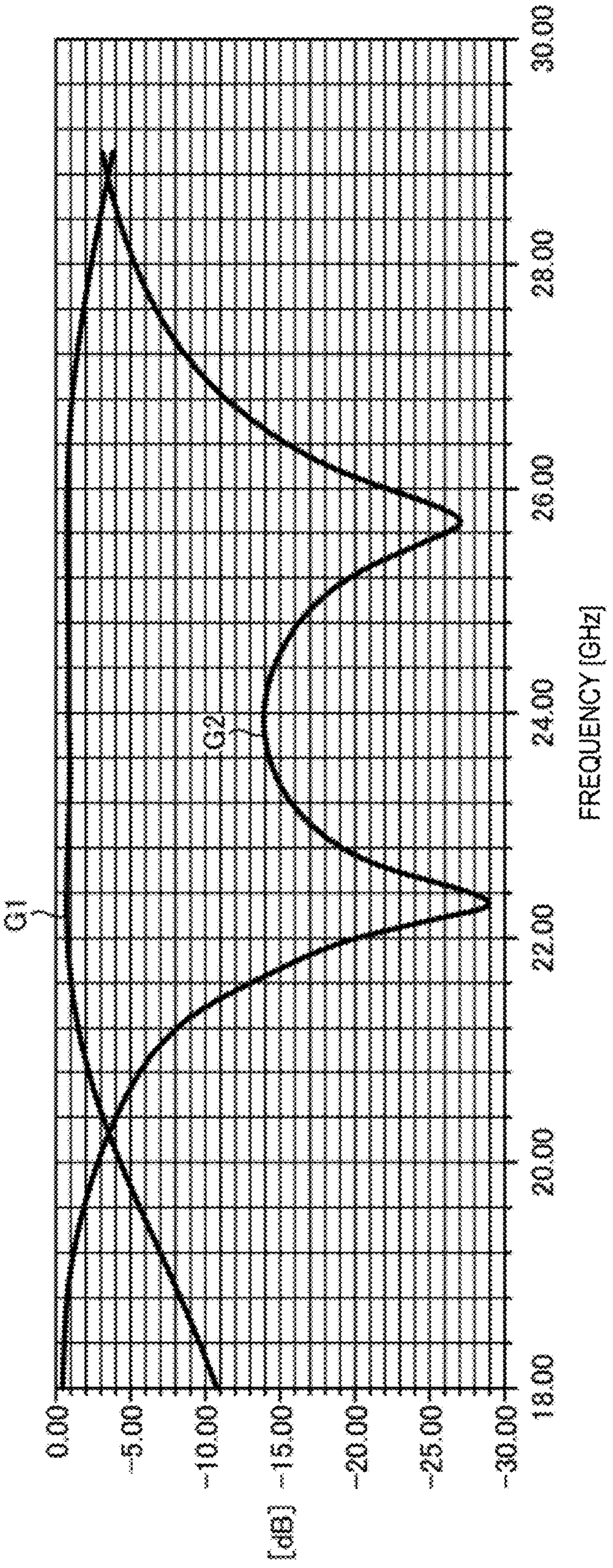
FIG. 7 is a graph showing frequency characteristics of the unit structure according to the fourth embodiment.

Frequency characteristics of the unit structure according to the fourth embodiment will be described with reference to FIG. 7. FIG. 7 is a graph showing the frequency characteristics of the unit structure according to the fourth embodiment.

In FIG. 7, the horizontal axis represents the frequency [GHz (Gigahertz)] and the vertical axis represents the gain [dB (decibel)]. FIG. 7 shows a graph G1 and a graph G2. The graph G1 indicates a transmission coefficient. The graph G2 indicates a reflection coefficient. The graph G1 shows that insertion loss in a region from the vicinity of 21.00 GHz to the vicinity of 28.00 GHz is −3 dB or more and transmission characteristics are satisfactory. The graph G2 shows that the reflection coefficient in the region from the vicinity of 21.00 GHz to the vicinity of 28.00 GHz is low. That is, the unit structure 10 illustrated in FIG. 6 has satisfactory transmission characteristics over a wide range from the vicinity of 21.00 GHz to the vicinity of 28.00 GHz.

Figure 8:
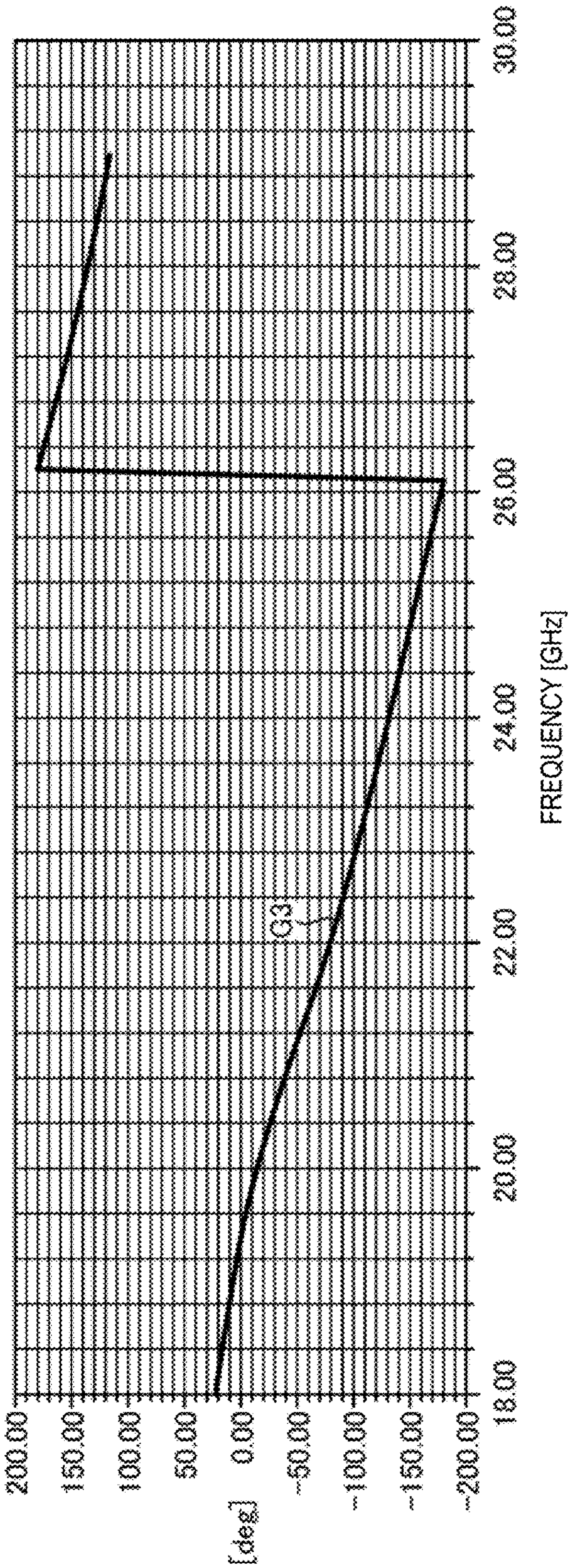
FIG. 8 is a graph showing an amount of change in phase of the unit structure according to the fourth embodiment.

The amount of change in phase of the unit structure according to the fourth embodiment will be described with reference to FIG. 8. FIG. 8 is a graph showing the amount of change in phase of the unit structure according to the fourth embodiment.

In FIG. 8, the horizontal axis represents the frequency [GHz] and the vertical axis represents the amount of change in phase [deg]. FIG. 8 shows a graph G3. The graph G3 shows an amount of phase shift of the electromagnetic wave when the electromagnetic wave incident on the first resonator 14 is radiated from the second resonator 16. For example, when the electromagnetic wave at the frequency in the vicinity of 20.80 GHz is incident on the first resonator 14, the unit structure 10 shifts the phase of the electromagnetic wave by about −38° and radiates the electromagnetic wave from the second resonator 16. For example, when the electromagnetic wave at the frequency in the vicinity of 28.00 GHz is incident on the first resonator 14, the unit structure 10 shifts the phase of the electromagnetic wave by about 135° and radiates the electromagnetic wave from the second resonator 16. That is, the unit structure 10 can be used as a spatial filter that changes the phase of the electromagnetic wave. Two-dimensionally arranging the unit structures 10 in this manner makes it possible to configure the radio wave refracting plate according to each of the embodiments.

Fifth Embodiment

Configuration of Unit Structure

Figure 9:
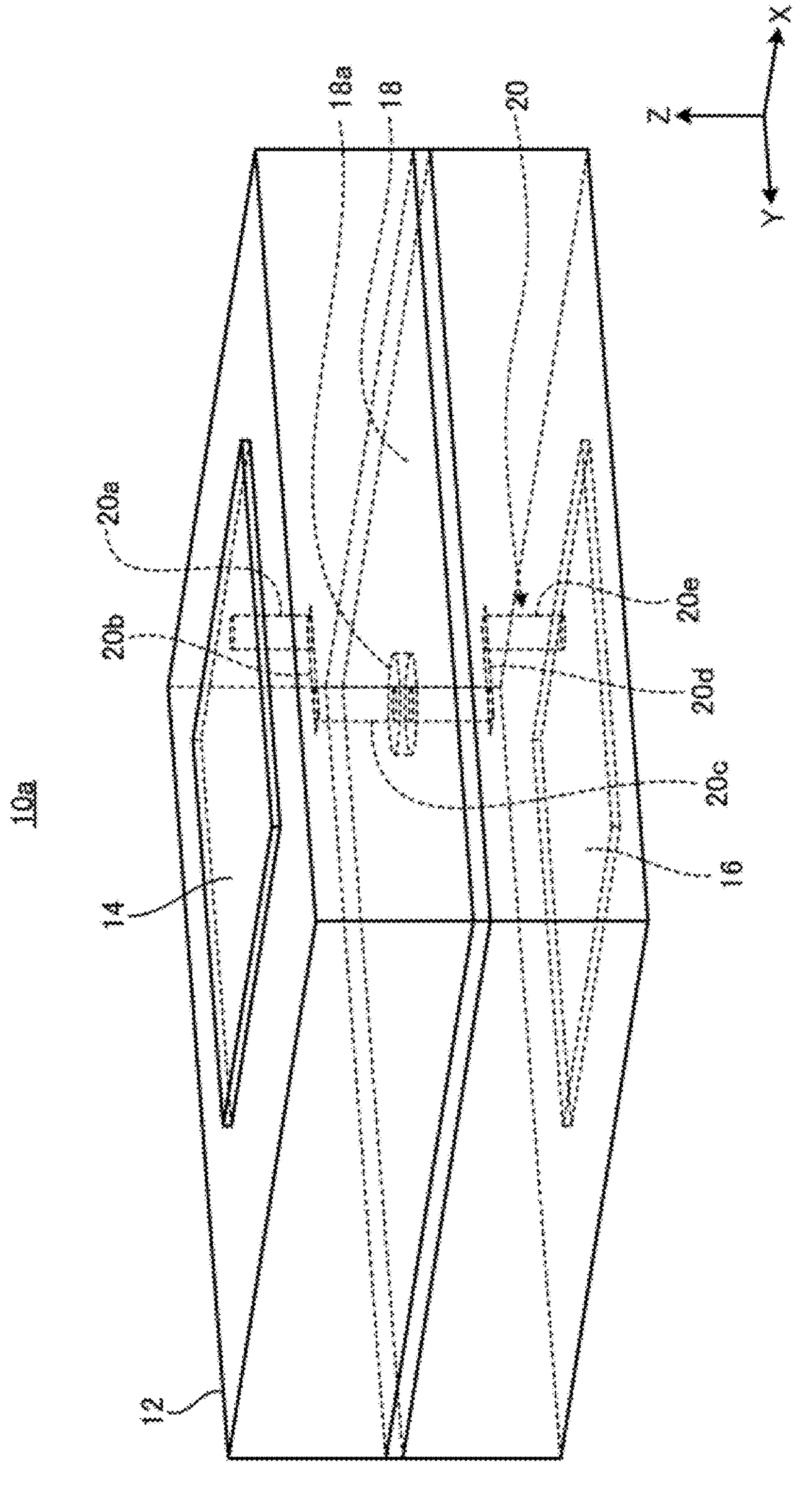
FIG. 9 is a diagram illustrating a configuration example of a unit structure according to a fifth embodiment.

A configuration example of the unit structure according to the fifth embodiment will be described with reference to FIG. 9. FIG. 9 is a diagram schematically illustrating a configuration example of the unit structure according to the fifth embodiment.

As illustrated in FIG. 9, a unit structure 10*a* differs from the unit structure 10 illustrated in FIG. 6 in that the connection line path 20 is not a linear path parallel to the Z-axis direction. Specifically, the connection line path 20 of the unit structure 10*a* differs from that of the unit structure 10 illustrated in FIG. 6 in that the connection line path 20 includes a first route portion 20*a*, a second route portion 20*b*, a third route portion 20*c*, a fourth route portion 20*d*, and a fifth route portion 20*e*.

The first route portion 20*a* may be a path parallel to the Z-axis direction having one end connected to the first resonator 14 and the other end located between the first resonator 14 and the reference conductor 18. The second route portion 20*b* may be a path parallel to the XY plane having one end connected to the other end of the first route portion 20*a* and the other end located between the first resonator 14 and the reference conductor 18. The third route portion 20*c* may be a path parallel to the Z-axis direction having one end connected to the other end of the second route portion 20*b* and the other end located between the second resonator 16 and the reference conductor 18. The third route portion 20*c* extends through the through-hole 18*a* of the reference conductor 18. The third route portion 20*c* is not in contact with the reference conductor 18. The fourth route portion 20*d* may be a path parallel to the XY plane having one end connected to the other end of the third route portion 20*c* and the other end located between the second resonator 16 and the reference conductor 18. The fifth route portion 20*e* may be a path parallel to the Z-axis direction having one end connected to the fourth route portion 20*d* and the other end connected to the fifth route portion 20*e*.

In FIG. 9, a description has been made that the connection line path 20 includes the five paths from the first route portion 20*a* to the fifth route portion 20*e*. However, this is merely an example and does not limit the present disclosure. The number of paths included in the connection line path 20 may be more or less than five. The plurality of route portions may also be referred to as sub-resonators. For example, the connection line path 20 may have a bent portion bent in a curved shape.

The unit structure 10*a* changes the phase of the electromagnetic wave incident on the first resonator 14 and radiates the electromagnetic wave from the second resonator 16. The amount of change in phase changes depending on the length of the connection line path 20. The amount of change in phase also changes depending on the area of the first resonator 14 or the second resonator 16.

Figure 10:
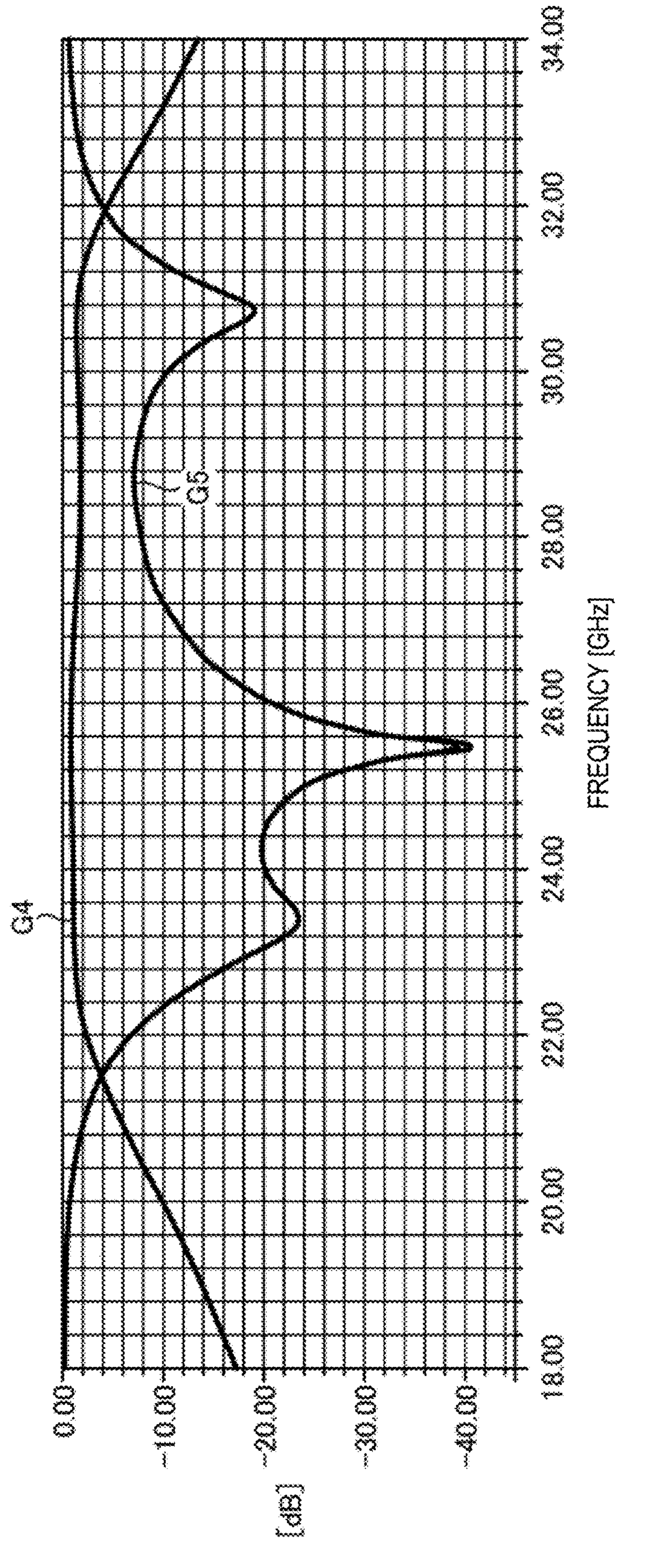
FIG. 10 is a graph showing frequency characteristics of the unit structure according to the fifth embodiment.

Frequency characteristics of the unit structure according to the fifth embodiment will be described with reference to FIG. 10. FIG. 10 is a graph showing the frequency characteristics of the unit structure according to the fifth embodiment.

In FIG. 10, the horizontal axis represents the frequency [GHz] and the vertical axis represents the gain [dB]. FIG. 10 shows a graph G4 and a graph G5. The graph G4 indicates a transmission coefficient. The graph G5 indicates a reflection coefficient. The graph G4 shows that insertion loss in a region from the vicinity of 22.00 GHz to the vicinity of 31.40 GHz is −3 dB or more and transmission characteristics are satisfactory. The graph G5 shows that the reflection coefficient in the region from the vicinity of 22.00 GHz to the vicinity of 31.40 GHz is low. That is, the unit structure 10*a* illustrated in FIG. 9 has satisfactory transmission characteristics over a wide range from the vicinity of 22.00 GHz to the vicinity of 31.40 GHz.

Figure 11:
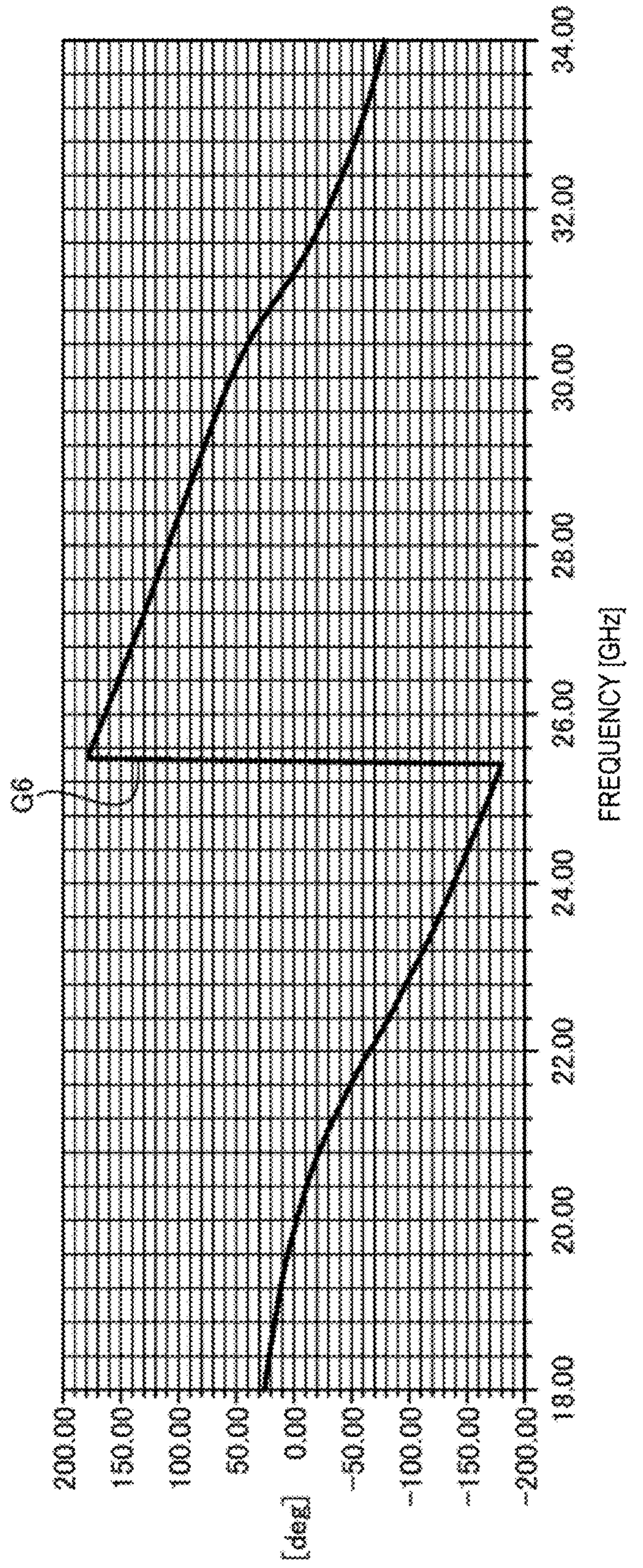
FIG. 11 is a graph showing an amount of change in phase of the unit structure according to the fifth embodiment.

The amount of change in phase of the unit structure according to the fifth embodiment will be described with reference to FIG. 11. FIG. 11 is a graph showing the amount of change in phase of the unit structure according to the fifth embodiment.

In FIG. 11, the horizontal axis represents the frequency [GHz] and the vertical axis represents the amount of change in phase [deg]. FIG. 11 shows a graph G6. The graph G6 shows an amount of phase shift of the electromagnetic wave when the electromagnetic wave incident on the first resonator 14 is radiated from the second resonator 16. For example, when the electromagnetic wave at a frequency in the vicinity of 22.00 GHz is incident on the first resonator 14, the unit structure 10*a* shifts the phase of the electromagnetic wave by about −65° and radiates the electromagnetic wave from the second resonator 16. For example, when the electromagnetic wave at a frequency in the vicinity of 31.40 GHz is incident on the first resonator 14, the unit structure 10*a* shifts the phase of the electromagnetic wave by about −5° and radiates the electromagnetic wave from the second resonator 16. That is, the unit structure 10*a* can be used as a spatial filter that changes the phase of the electromagnetic wave. Two-dimensionally arranging the unit structures 10*a* in this manner makes it possible to configure the radio wave refracting plate according to each of the embodiments.

Sixth Embodiment

Configuration of Unit Structure

Figure 12:
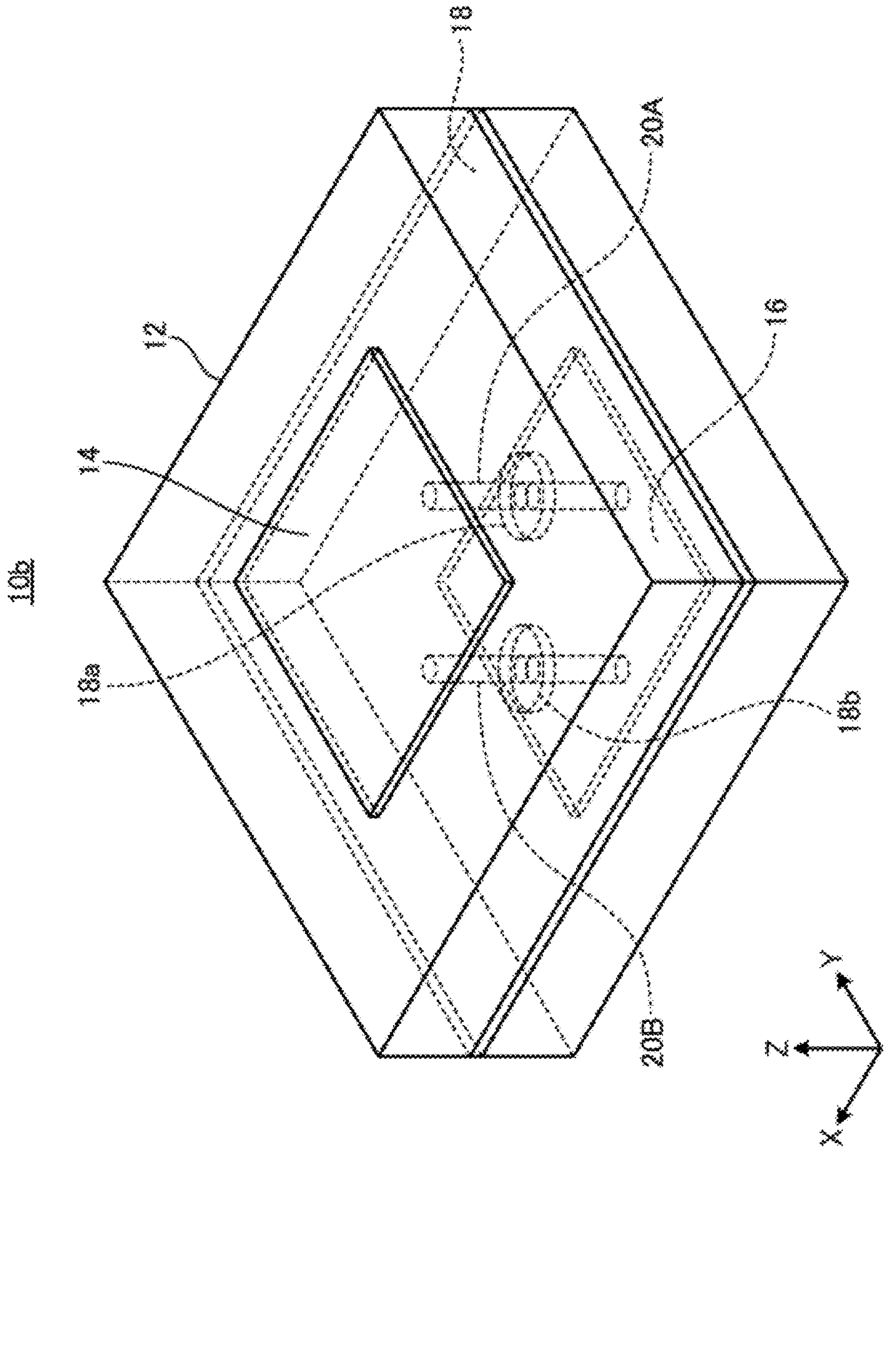
FIG. 12 is a diagram schematically illustrating a configuration example of a unit structure according to a sixth embodiment.

A configuration example of the unit structure according to the sixth embodiment will be described with reference to FIG. 12. FIG. 12 is a diagram schematically illustrating a configuration example of the unit structure according to the sixth embodiment.

As illustrated in FIG. 12, a unit structure 10*b* differs from the unit structure 10 illustrated in FIG. 2 in that the unit structure 10*b* includes a connection line path 20A and a connection line path 20B.

In the unit structure 10*b*, the reference conductor 18 includes the through-hole 18*a* and a through-hole 18*b*. The connection line path 20A passes through the through-hole 18*a*. The connection line path 20B passes through the through-hole 18*b*.

The connection line path 20A may be made of a conductor. The connection line path 20A is located between the first resonator 14 and the second resonator 16 in the Z-axis direction. The connection line path 20A is connected to each of the first resonator 14 and the second resonator 16. Specifically, the connection line path 20A has one end connected to a side of the first resonator 14 parallel to the Y-axis direction and the other end connected to a side of the second resonator 16 parallel to the Y-axis direction. Although the connection line path 20A passes through the through-hole 18*a*, the connection line path 20 is not in contact with the reference conductor 18.

The connection line path 20B may be made of a conductor. The connection line path 20B is located between the first resonator 14 and the second resonator 16 in the Z-axis direction. The connection line path 20B is connected to each of the first resonator 14 and the second resonator 16. Specifically, the connection line path 20B has one end connected to a side of the first resonator 14 parallel to the X-axis direction and the other end connected to a side of the second resonator 16 parallel to the X-axis direction. Although the connection line path 20B passes through the through-hole 18*b*, the connection line path 20B is not in contact with the reference conductor 18.

Figure 13:
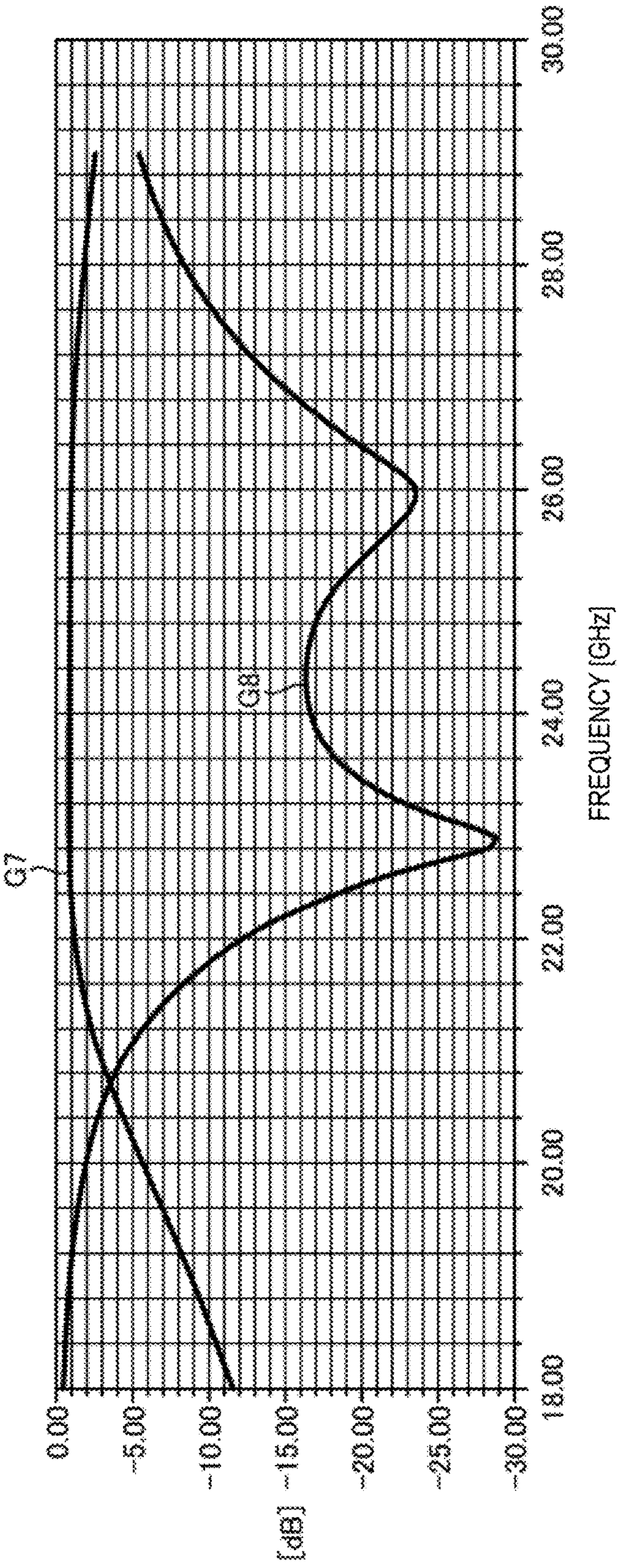
FIG. 13 is a graph showing frequency characteristics of the unit structure according to the sixth embodiment.
Figure 14:
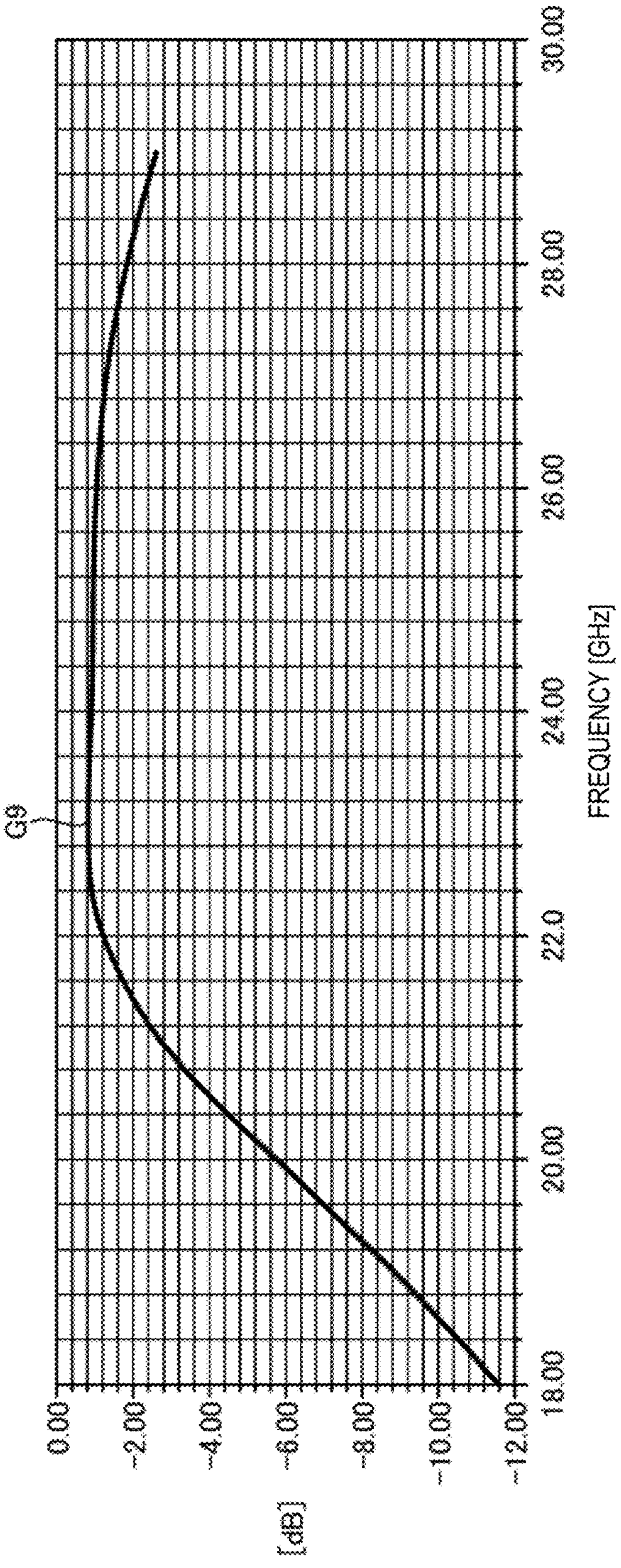
FIG. 14 is a graph showing frequency characteristics of the unit structure according to the sixth embodiment.

Frequency characteristics of the unit structure according to the sixth embodiment will be described with reference to FIGS. 13 and 14. FIGS. 13 and 14 are graphs showing the frequency characteristics of the unit structure according to the sixth embodiment.

In FIG. 13, the horizontal axis represents the frequency [GHz] and the vertical axis represents the gain [dB]. FIG. 13 shows a graph G7 and a graph G8. The graph G7 shows a transmission coefficient when the electromagnetic wave incident from the X-axis direction is radiated in the X-axis direction. The graph G8 indicates a reflection coefficient. The graph G7 shows that insertion loss in a region from the vicinity of 21.00 GHz to the vicinity of 28.00 GHz is about −3 dB or more and transmission characteristics are satisfactory. The graph G8 shows that the reflection coefficient in the region from the vicinity of 21.00 GHz to the vicinity of 28.00 GHz is low. That is, the unit structure 10*b* illustrated in FIG. 12 has satisfactory transmission characteristics over a wide range from the vicinity of 21.00 GHz to the vicinity of 28.00 GHz.

In FIG. 14, the horizontal axis represents the frequency [GHz] and the vertical axis represents the gain [dB]. FIG. 14 shows a graph G9. The graph G9 shows a transmission coefficient when the electromagnetic wave incident from the Y-axis direction is radiated in the Y-axis direction. As shown in the graph G9, in the transmission coefficient when the electromagnetic wave incident from the Y-axis direction is radiated in the Y-axis direction, the insertion loss in a region from the vicinity of 21.00 GHz to the vicinity of 28.00 GHz is about −3 dB or more and transmission characteristics are satisfactory.

The unit structure 10*b* has a satisfactory transmission coefficient of the electromagnetic wave from the X-axis direction to the X-axis direction and a satisfactory transmission coefficient from the Y-axis direction to the Y-axis direction. That is, the unit structure 10*b* has both properties of a function as a spatial filter and a function of substantially polarization-dependent transmission. Two-dimensionally arranging the unit structures 10*b* in this manner makes it possible to configure the radio wave refracting plate according to each of the embodiments.

Seventh Embodiment

Figure 15:
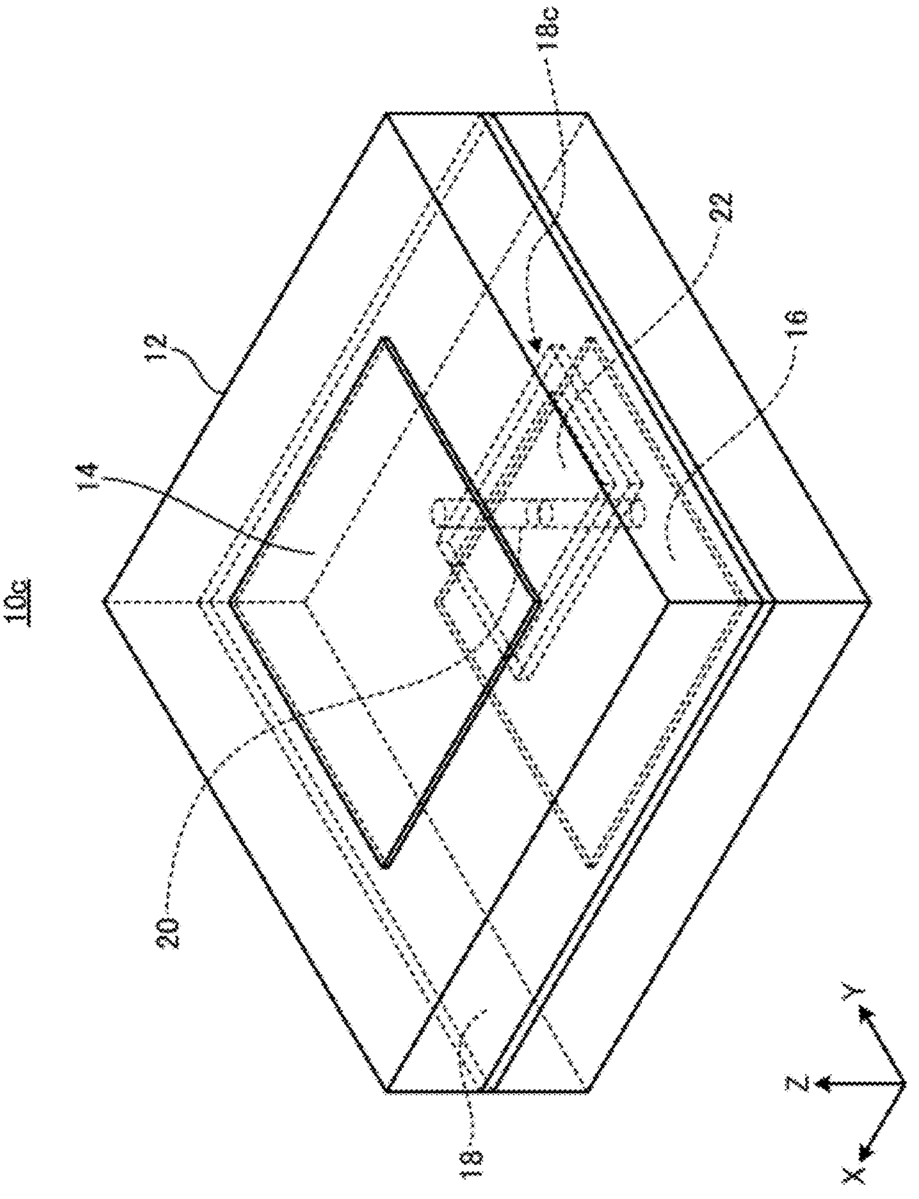
FIG. 15 is a diagram illustrating a configuration example of a unit structure according to a seventh embodiment.

The configuration of the unit structure according to the seventh embodiment will be described with reference to FIG. 15. FIG. 15 is a diagram illustrating a configuration of a unit structure according to the seventh embodiment.

As illustrated in FIG. 15, a unit structure 10*c* includes the substrate 12, the first resonator 14, the second resonator 16, the reference conductor 18, the connection line path 20, and a third resonator 22. The unit structure 10*c* differs from the unit structure 10 illustrated in FIG. 2 in that the unit structure 10*c* includes the third resonator 22. In the unit structure 10*c*, the reference conductor 18 has an opening 18*c* for arranging the third resonator 22.

The third resonator 22 may be arranged between the first resonator 14 and the second resonator 16 in the Z-axis direction. The third resonator 22 may be inside the opening 18*c* of the reference conductor 18. The third resonator 22 may be inside the opening 18*c* to avoid contact with the reference conductor 18. The third resonator 22 may be configured integrally with the connection line path 20. The third resonator 22 may be magnetically or capacitively connected to each of the first resonator 14 and the second resonator 16, for example. That is, the third resonator 22 is surrounded by the reference conductor 18. The third resonator 22 is capacitively connected to the reference conductor 18.

In the present embodiment, when a wavelength of a fundamental wave of the arriving electromagnetic wave is λ, the length of at least one side of the first resonator 14 is set to λ/2, the length of at least one side of the second resonator 16 is set to λ/2, and the length of at least one side of the third resonator 22 is set to λ/4.

Figure 16:
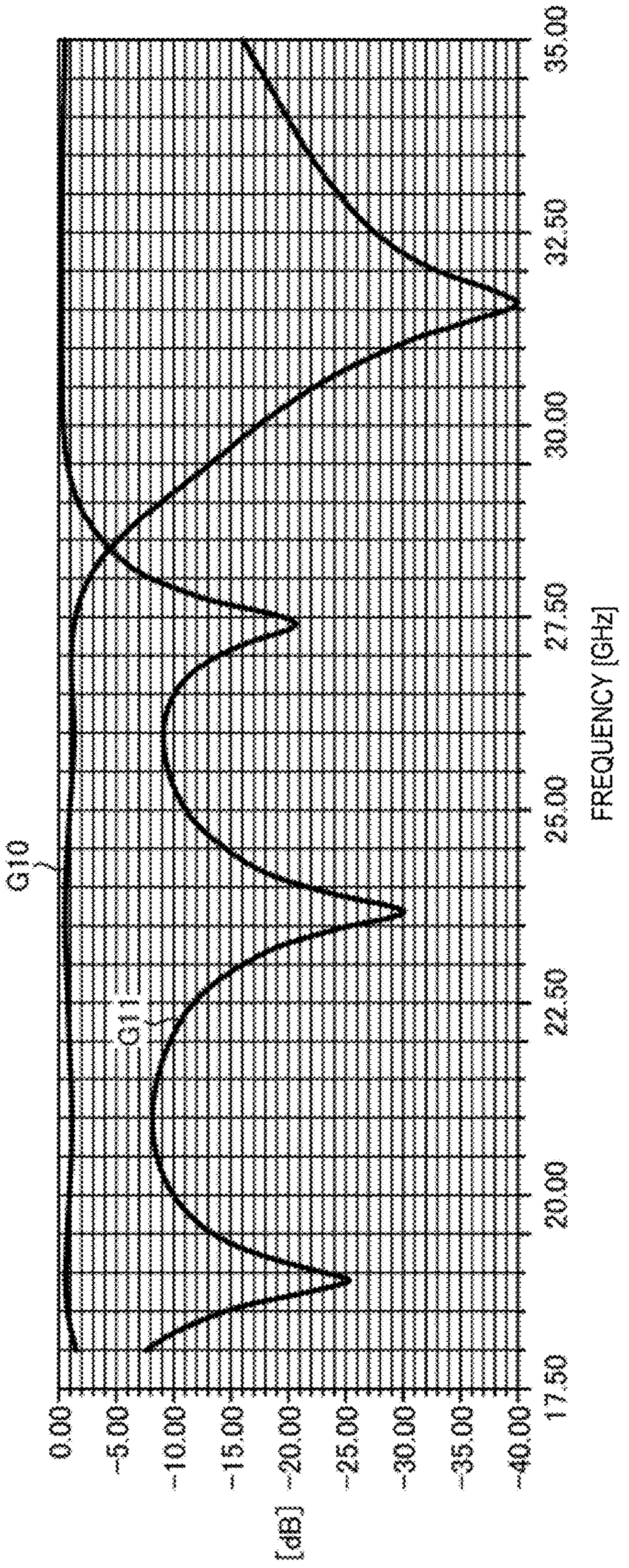
FIG. 16 is a graph showing frequency characteristics of the unit structure according to the seventh embodiment.

Frequency characteristics of the unit structure according to the seventh embodiment will be described with reference to FIG. 16. FIG. 16 is a graph showing the frequency characteristics of the unit structure according to the seventh embodiment.

In FIG. 16, the horizontal axis represents the frequency [GHz] and the vertical axis represents the gain [dB]. FIG. 16 shows a graph G10 and a graph G11. The graph G10 shows the transmission coefficient from the X-axis direction to the X-axis direction. The graph G11 shows the reflection coefficient of the electromagnetic wave incident in the X-axis direction. The graph G10 shows that insertion loss in a region from the vicinity of 18.00 GHz to the vicinity of 28.00 GHz is about −2 dB or more and transmission characteristics are satisfactory. The graph G11 shows that the reflection coefficient in the region from the vicinity of 18.00 GHz to the vicinity of 28.00 GHz is low. As shown in the graph G10, the unit structure 10*c* has steep attenuation characteristics in a high frequency band than attenuation characteristics of the unit structure 10 illustrated in FIG. 6. That is, the unit structure 10*c* illustrated in FIG. 15 has satisfactory transmission characteristics over a wide range from the vicinity of 18.00 GHz to the vicinity of 28.00 GHz.

Figure 17:
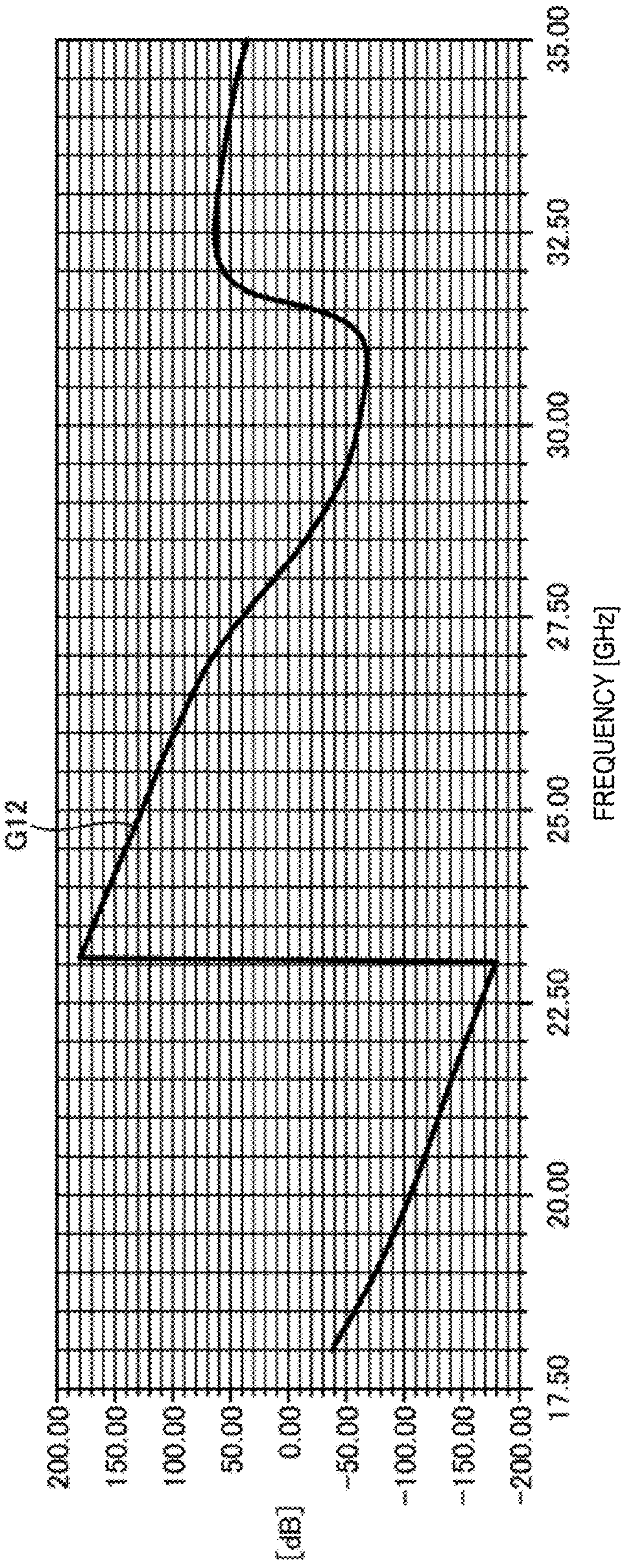
FIG. 17 is a graph showing an amount of change in phase of the unit structure according to the seventh embodiment.

The amount of change in phase of the unit structure according to the seventh embodiment will be described with reference to FIG. 17. FIG. 17 is a graph showing an amount of change in phase of the unit structure according to the seventh embodiment.

In FIG. 17, the horizontal axis represents the frequency [GHz] and the vertical axis represents the gain [dB]. FIG. 17 shows a graph G12. The graph G12 shows an amount of phase shift of the electromagnetic wave when the electromagnetic wave incident on the first resonator 14 is radiated from the second resonator 16. For example, when the electromagnetic wave at the frequency in the vicinity of 18.00 GHz is incident on the first resonator 14, the unit structure 10*c* shifts the phase of the electromagnetic wave by about −37° and radiates the electromagnetic wave from the second resonator 16. For example, when the electromagnetic wave at the frequency in the vicinity of 27.50 GHz is incident on the first resonator 14, the unit structure 10*c* shifts the phase of the electromagnetic wave by about −40° and radiates the electromagnetic wave from the second resonator 16. That is, even when the plurality of resonators are provided as in the unit structure 10*c*, the phase of the arriving electromagnetic wave can be shifted. Two-dimensionally arranging the unit structures 10*c* in this manner makes it possible to configure the radio wave refracting plate according to each of the embodiments.

Eighth Embodiment

Configuration of Unit Structure

Figure 18:
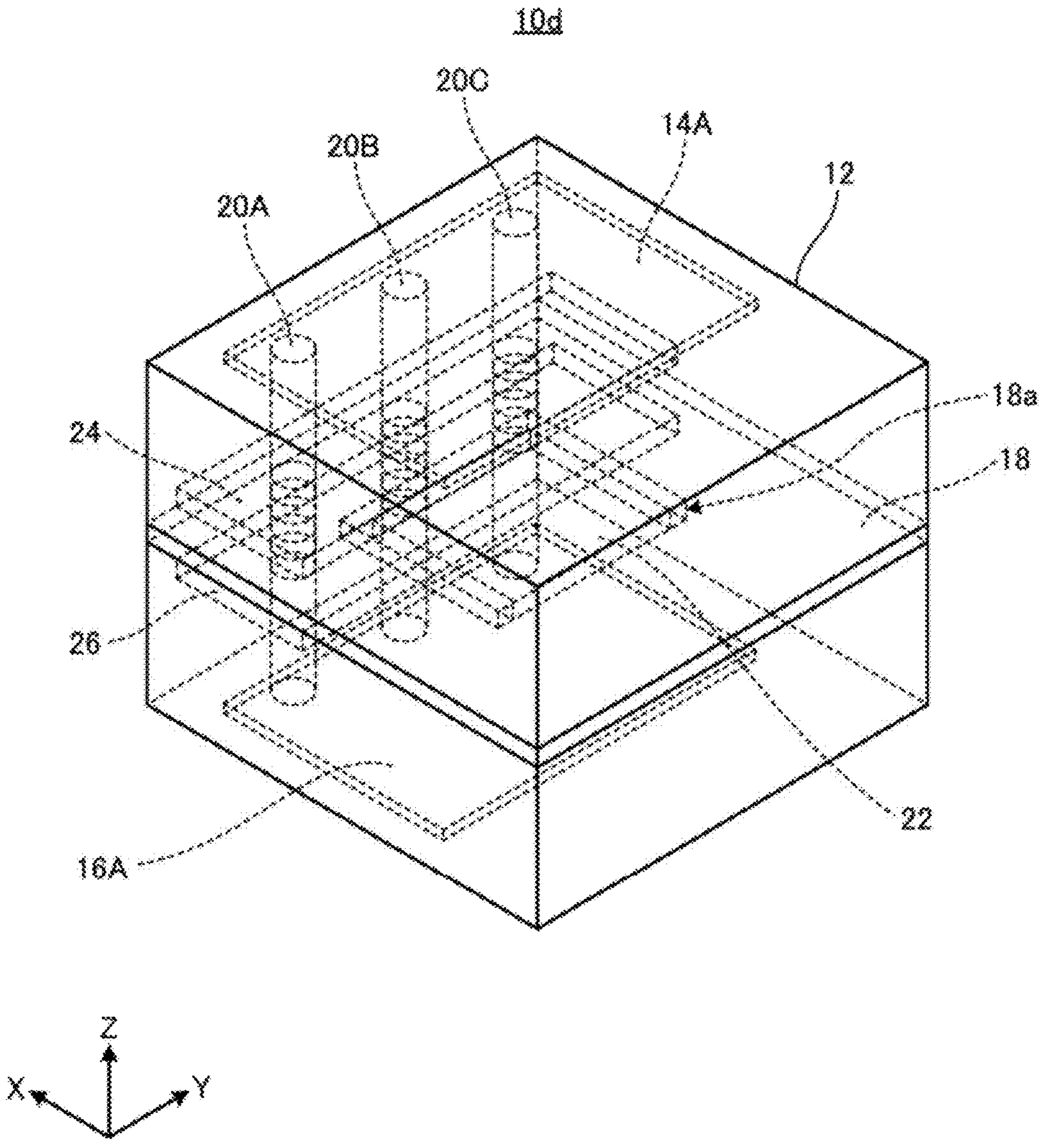
FIG. 18 is a diagram illustrating a configuration example of a unit structure according to an eighth embodiment.

A configuration example of the unit structure according to the eighth embodiment will be described with reference to FIG. 18. FIG. 18 is a diagram illustrating a configuration example of a unit structure according to the eighth embodiment.

As illustrated in FIG. 18, a unit structure 10*d* includes a first resonator 14A, a second resonator 16A, the reference conductor 18, the connection line path 20A, the connection line path 20B, a connection line path 20C, the third resonator 22, a first auxiliary reference conductor 24, and a second auxiliary reference conductor 26.

The first resonator 14A differs from the first resonator 14 illustrated in FIG. 2 in that the length of at least one side is set to λ/4. The second resonator 16A differs from the second resonator 16 illustrated in FIG. 2 in that the length of at least one side is set to λ/4.

The first resonator 14A resonates by receiving an electromagnetic wave from the +Z-axis direction. The first resonator 14A radiates the electromagnetic wave during resonance. The first resonator 14A radiates the electromagnetic wave to the +Z-axis direction side during resonance.

The second resonator 16A radiates the electromagnetic wave during resonance. The second resonator 16A radiates the electromagnetic wave to the −Z-axis direction side during resonance. The second resonator 16A resonates by receiving the electromagnetic wave from the −Z-axis direction.

The second resonator 16A may resonate at a phase different from that of the first resonator 14A. The second resonator 16A may resonate in a direction different from the resonance direction of the first resonator 14A in the XY plane direction. For example, when the first resonator 14A resonates in the X-axis direction, the second resonator 16A may resonate in the Y-axis direction. The resonance direction of the second resonator 16A may change with time in the XY plane direction with respect to the resonance direction of the first resonator 14A. The second resonator 16A may radiate the electromagnetic wave received by the first resonator 14A after a first frequency band of the second resonator 16A is attenuated.

The third resonator 22 may be arranged between the first resonator 14A and the second resonator 16A in the Z-axis direction. The third resonator 22 may be inside the opening 18*c* of the reference conductor 18. The third resonator 22 may be inside the opening 18*c* to avoid contact with the reference conductor 18. That is, the third resonator 22 is surrounded by the reference conductor 18.

The first auxiliary reference conductor 24 may be arranged between the first resonator 14A and the reference conductor 18. The first auxiliary reference conductor 24 may be made of a conductor. The second auxiliary reference conductor 26 may be arranged between the second resonator 16A and the reference conductor 18. The second auxiliary reference conductor 26 may be made of a conductor.

The connection line path 20A, the connection line path 20B, and the connection line path 20C have one ends each electromagnetically connected to the first resonator 14A. The connection line path 20A, the connection line path 20B, and the connection line path 20C have the other ends each electromagnetically connected to the second resonator 16A. The respective connection line path 20A, connection line path 20B, and connection line path 20C are electromagnetically connected to the reference conductor 18, the first auxiliary reference conductor 24, and the second auxiliary reference conductor 26.

Figure 19:
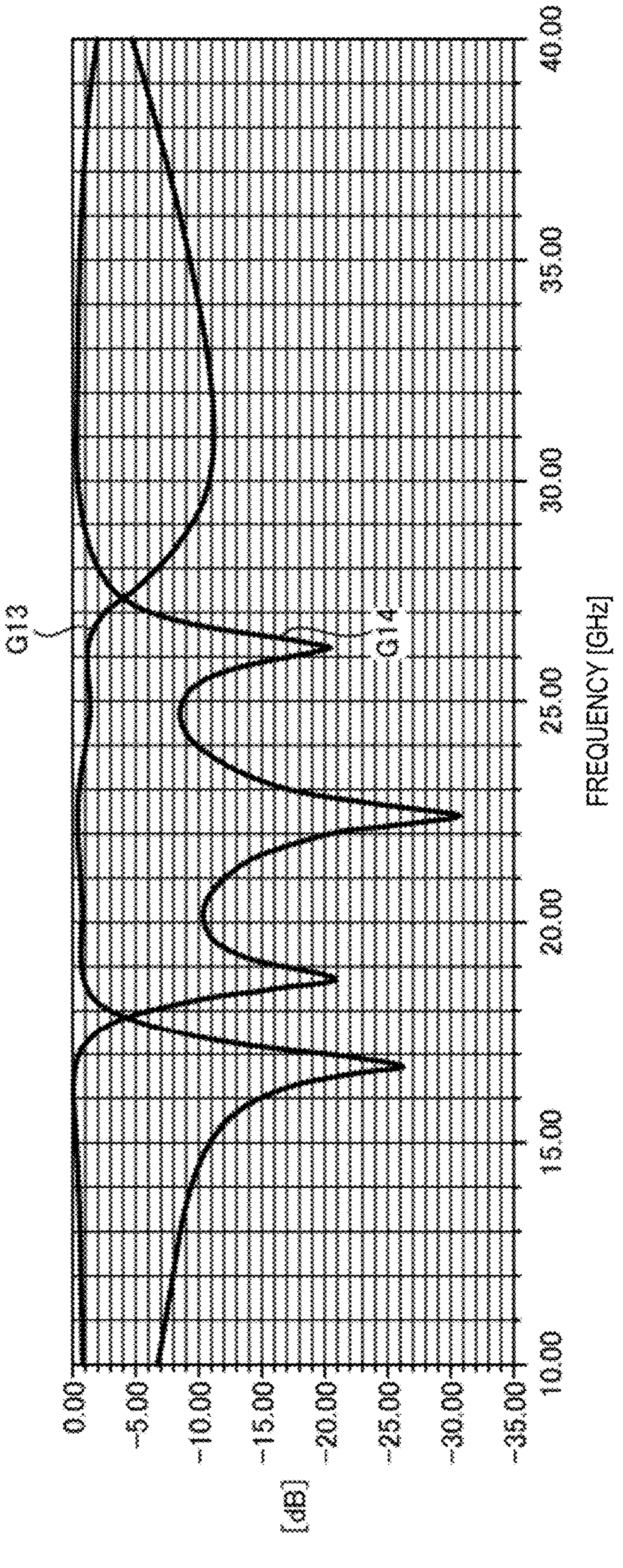
FIG. 19 is a graph showing frequency characteristics of the unit structure according to the eighth embodiment.

Frequency characteristics of the unit structure according to the eighth embodiment will be described with reference to FIG. 19. FIG. 19 is a graph showing the frequency characteristics of the unit structure according to the eighth embodiment.

In FIG. 19, the horizontal axis represents the frequency [GHz] and the vertical axis represents the gain [dB]. FIG. 19 shows a graph G13 and a graph G14. The graph G13 indicates a transmission coefficient. The graph G14 indicates a reflection coefficient. The graph G13 shows that insertion loss in a region from the vicinity of 18.00 GHz to the vicinity of 27.00 GHz is −3 dB or more and transmission characteristics are satisfactory. The graph G14 shows that the reflection coefficient in the region from the vicinity of 18.00 GHz to the vicinity of 27.00 GHz is low. That is, the unit structure 10*d* illustrated in FIG. 18 has satisfactory transmission characteristics over a wide range from the vicinity of 18.00 GHz to the vicinity of 27.00 GHz. Two-dimensionally arranging the unit structures 10*d* in this manner makes it possible to configure the radio wave refracting plate according to each of the embodiments.

Ninth Embodiment

Figure 20:
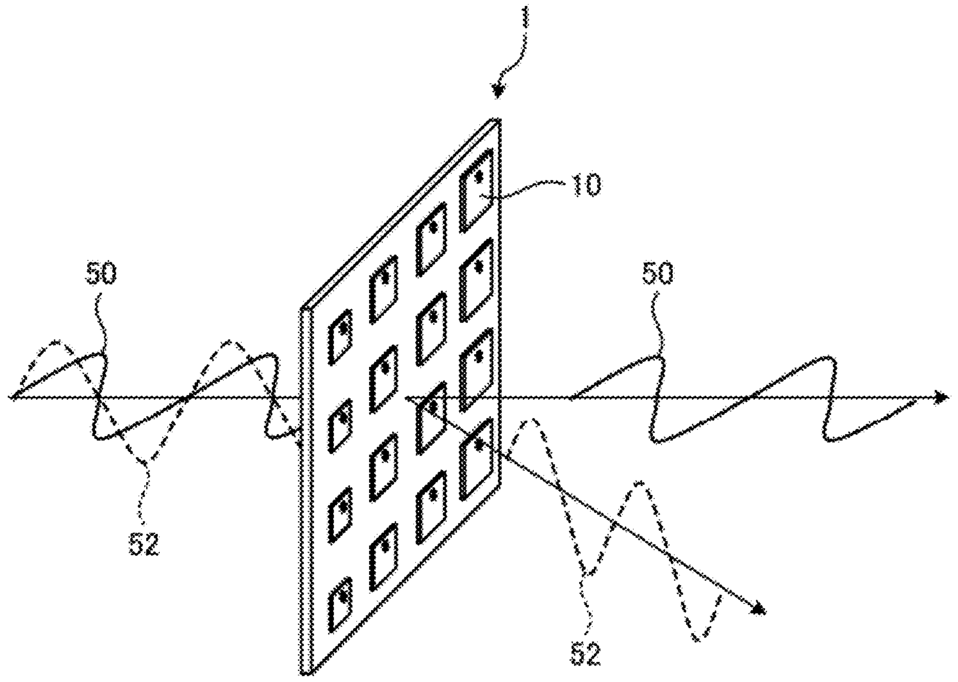
FIG. 20 is a diagram illustrating a refraction direction of a radio wave of the radio wave refracting plate.

A ninth embodiment of the present disclosure will be described. FIG. 20 is a diagram illustrating a refraction direction of a radio wave of the radio wave refracting plate.

FIG. 20 illustrates the radio wave refracting plate 1. The radio wave refracting plate 1 includes the plurality of unit structures 10. The radio wave refracting plate 1 generally has polarization dependency. In the case of a communication method using a horizontally polarized wave and a vertically polarized wave, the radio wave refracting plate 1 receives a horizontally polarized wave 50 and a vertically polarized wave 52. In this case, the horizontally polarized wave 50 and the vertically polarized wave 52 are not refracted in the same direction. For example, the radio wave refracting plate 1 refracts only the vertically polarized wave 52 and transmits the horizontally polarized wave 50. In this case, the received power possibly decreases due to the interposition of the radio wave refracting plate 1.

Configuration of Unit Structure

Figure 21:
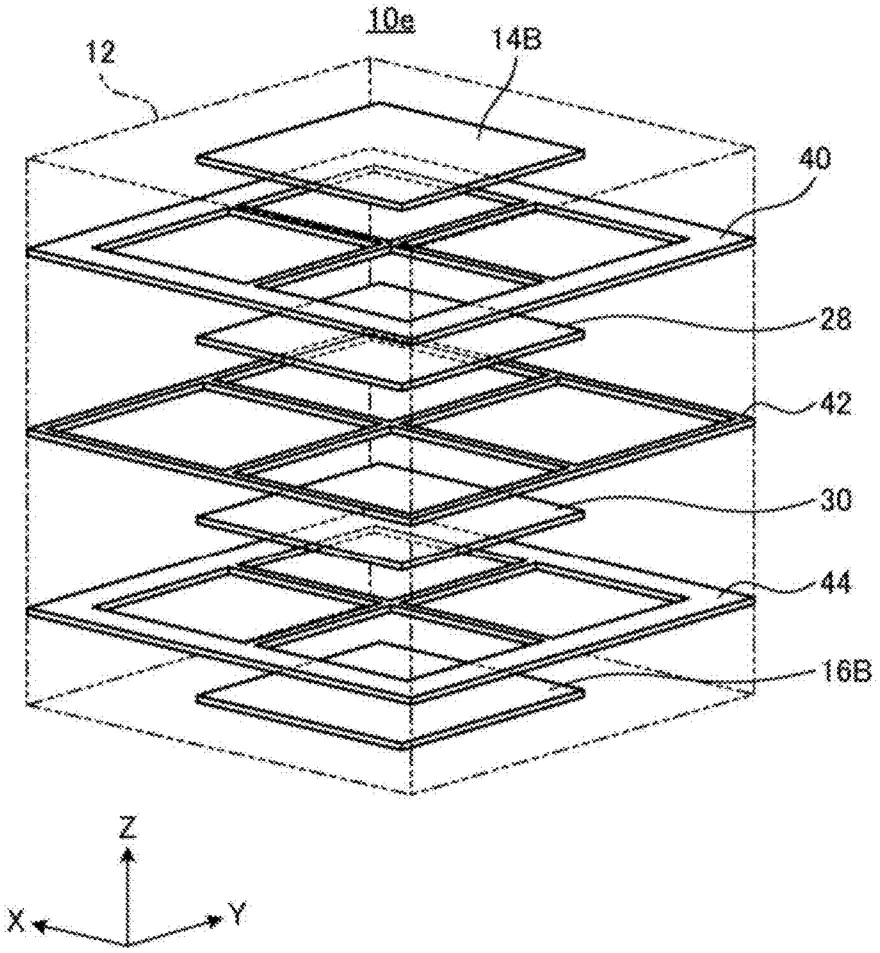
FIG. 21 is a diagram illustrating a configuration example of a unit structure according to a ninth embodiment.

A configuration example of the unit structure according to the ninth embodiment will be described with reference to FIG. 21. FIG. 21 is a diagram illustrating a configuration example of the unit structure according to the ninth embodiment.

As illustrated in FIG. 21, a unit structure 10*e* includes the substrate 12, a first resonator 14B, a second resonator 16B, a third resonator 28, a fourth resonator 30, a first reference conductor 40, a second reference conductor 42, and a third reference conductor 44. The unit structure 10*e* has a seven layer structure in which seven layers of conductors are stacked. In the unit structure 10*e*, the second resonator 16B, the third reference conductor 44, the fourth resonator 30, the second reference conductor 42, the third resonator 28, the first reference conductor 40, and the first resonator 14B are stacked in this order from the bottom. The unit structure 10*e* has four-fold rotational symmetry in the XY plane.

Figure 22A:
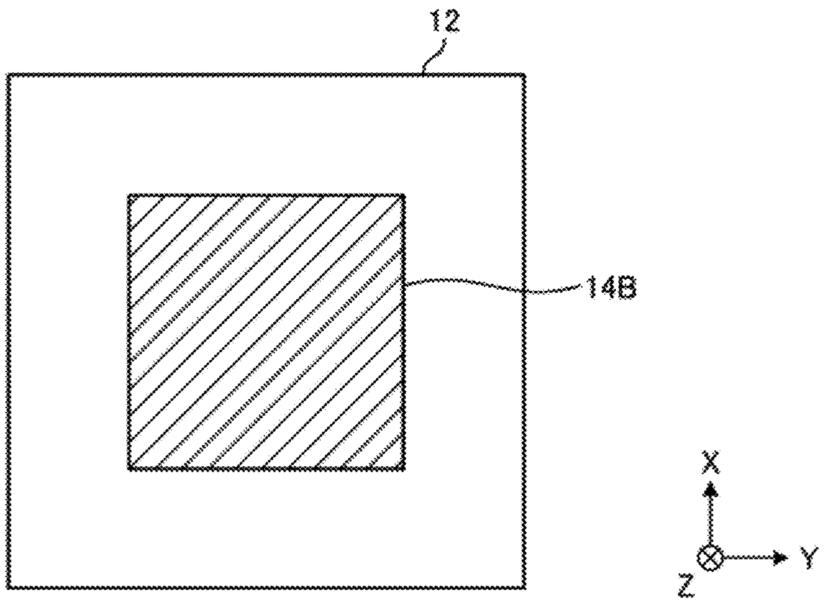
FIG. 22A is a diagram illustrating a configuration example of a first resonator according to the ninth embodiment.

The first resonator 14B is formed in the uppermost layer. FIG. 22A is a diagram illustrating a configuration example of the first resonator 14B according to the ninth embodiment. As illustrated in FIG. 22A, the first resonator 14B extends on the XY plane. The first resonator 14B is formed in, for example, a square patch shape. That is, the first resonator 14B has four-fold rotational symmetry in the XY plane. The first resonator 14B is not in contact with the end portion of the substrate 12. The size of the first resonator 14B may be arbitrarily changed according to the design. The layer in which the first resonator 14B is formed may also be referred to as a first layer.

Figure 22B:
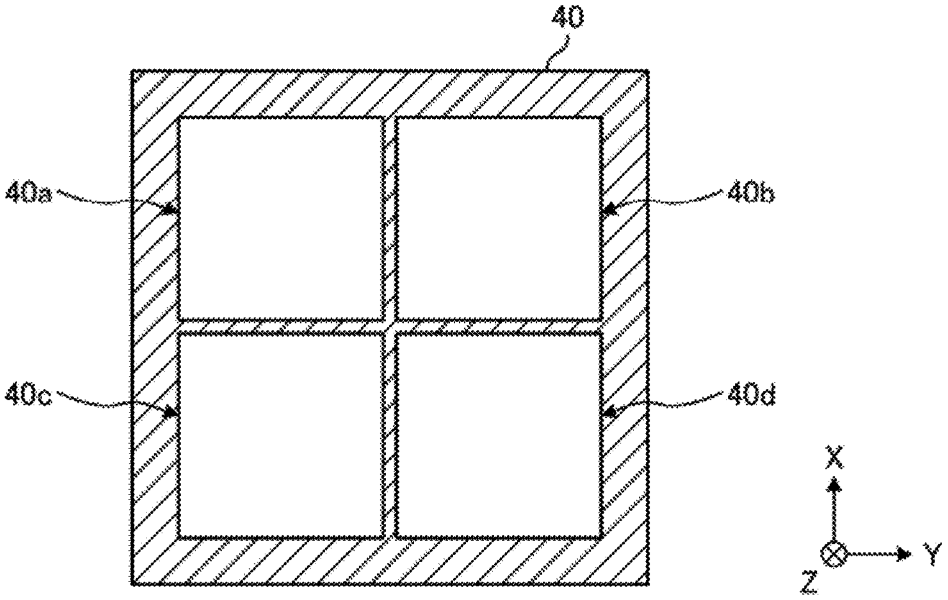
FIG. 22B is a diagram illustrating a configuration example of a first reference conductor according to the ninth embodiment.

The first reference conductor 40 is formed in the layer immediately below the layer in which the first resonator 14B is formed. FIG. 22B is a diagram illustrating a configuration example of the first reference conductor 40 according to the ninth embodiment. As illustrated in FIG. 22B, the first reference conductor 40 extends on the XY plane. The first reference conductor 40 is configured in a square shape. The first reference conductor 40 includes a gap 40*a*, a gap 40*b*, a gap 40*c*, and a gap 40*d*. The gap 40*a* is formed, for example, at the upper left corner of the first reference conductor 40. The gap 40*b* is formed, for example, at the upper right corner of the first reference conductor 40. The gap 40*c* is formed, for example, at the lower left corner of the first reference conductor 40. The gap 40*d* is formed, for example, at the lower right corner of the first reference conductor 40. The gap 40*a*, the gap 40*b*, the gap 40*c*, and the gap 40*d* may be formed in the same square shape, for example. The first reference conductor 40 includes the gap 40*a* to the gap 40*d* to have four-fold rotational symmetry. The size of each of the gap 40*a* to the gap 40*d* may be arbitrarily changed according to the design. The layer in which the first reference conductor 40 is formed may also be referred to as a second layer.

Figure 22C:
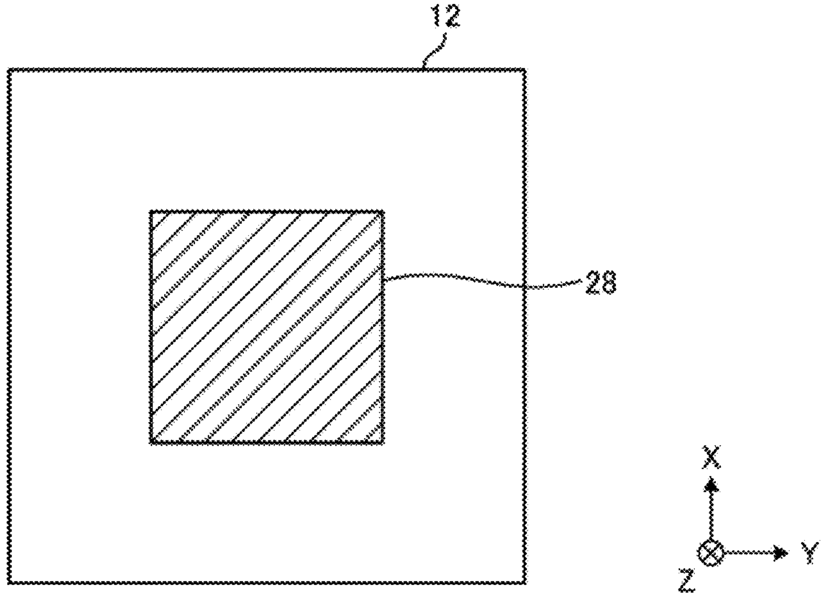
FIG. 22C is a diagram illustrating a configuration example of a third resonator according to the ninth embodiment.

The third resonator 28 is formed in a layer immediately below the layer in which the first reference conductor 40 is formed. FIG. 22C is a diagram illustrating a configuration example of the third resonator 28 according to the ninth embodiment. As illustrated in FIG. 22C, the third resonator 28 extends on the XY plane. The third resonator 28 is formed in, for example, a square patch shape. That is, the third resonator 28 has four-fold rotational symmetry in the XY plane. The third resonator 28 is not in contact with the end portion of the substrate 12. The third resonator 28 may have the size different from that of the first resonator 14B. For example, the third resonator 28 is smaller than the first resonator 14B. The size of the third resonator 28 may be arbitrarily changed according to the design. The first resonator 14B and the third resonator 28 are magnetically or capacitively connected across the gap 40*a* to the gap 40*d*. The layer in which the third resonator 28 is formed may also be referred to as a third layer.

Figure 22D:
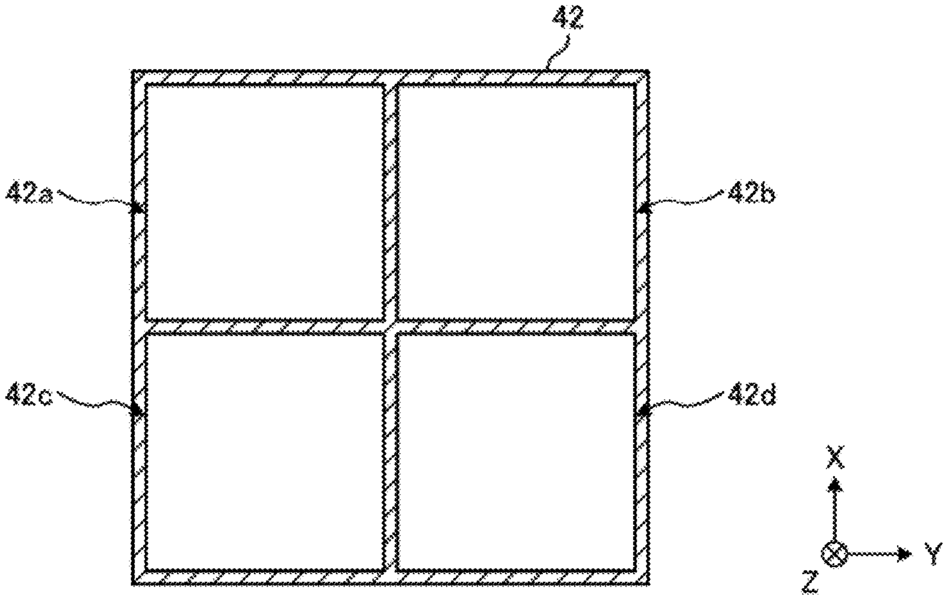
FIG. 22D is a diagram illustrating a configuration example of a second reference conductor according to the ninth embodiment.

The second reference conductor 42 is formed in a layer immediately below the layer in which the third resonator 28 is formed. FIG. 22D is a diagram illustrating a configuration example of the second reference conductor 42 according to the ninth embodiment. As illustrated in FIG. 22D, the second reference conductor 42 extends on the XY plane. The second reference conductor 42 is formed in a square shape. The second reference conductor 42 includes a gap 42*a*, a gap 42*b*, a gap 42*c*, and a gap 42*d*. The gap 42*a* is formed, for example, at the upper left corner of the second reference conductor 42. The gap 42*b* is formed, for example, at the upper right corner of the second reference conductor 42. The gap 42*c* is formed, for example, at the lower left corner of the second reference conductor 42. The gap 42*d* is formed, for example, at the lower right corner of the second reference conductor 42. The gap 42*a*, the gap 42*b*, the gap 42*c*, and the gap 42*d* may be formed in the same square shape, for example. The second reference conductor 42 includes the gap 42*a* to the gap 42*d* to have four-fold rotational symmetry. The gap 42*a* to the gap 42*d* may differ in size from the gap 40*a* to the gap 40*d* of the first reference conductor 40, respectively. The sizes of the gap 42*a* to the gap 42*d* are, for example, larger than the gap 40*a* to the gap 40*d* of the first reference conductor 40, respectively. The size of each of the gap 42*a* to the gap 42*d* can be arbitrarily changed according to the design. The layer in which the second reference conductor 42 is formed may also be referred to as a fourth layer.

Figure 22E:
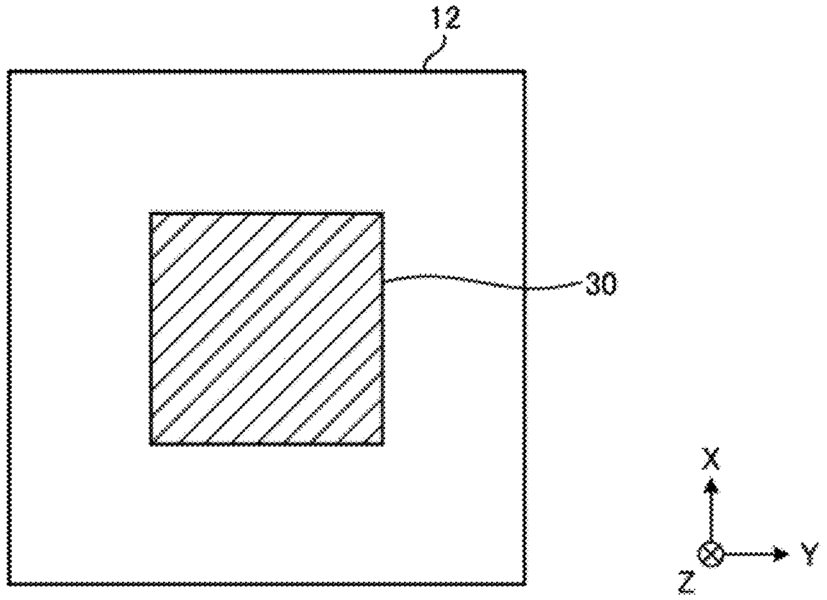
FIG. 22E is a diagram illustrating a configuration example of a fourth resonator according to the ninth embodiment.

The fourth resonator 30 is formed in a layer immediately below the layer in which the second reference conductor 42 is formed. FIG. 22E is a diagram illustrating a configuration example of the fourth resonator 30 according to the ninth embodiment. As illustrated in FIG. 22E, the fourth resonator 30 extends on the XY plane. The fourth resonator 30 is formed in, for example, a square patch shape. That is, the fourth resonator 30 has four-fold rotational symmetry in the XY plane. The fourth resonator 30 is not in contact with the end portion of the substrate 12. The fourth resonator 30 has the same shape as the third resonator 28 illustrated in FIG. 22C. The third resonator 28 and the fourth resonator 30 are magnetically or capacitively connected across the gap 42*a* to the gap 42*d*. The layer in which the fourth resonator 30 is formed may also be referred to as a fifth layer.

Figure 22F:
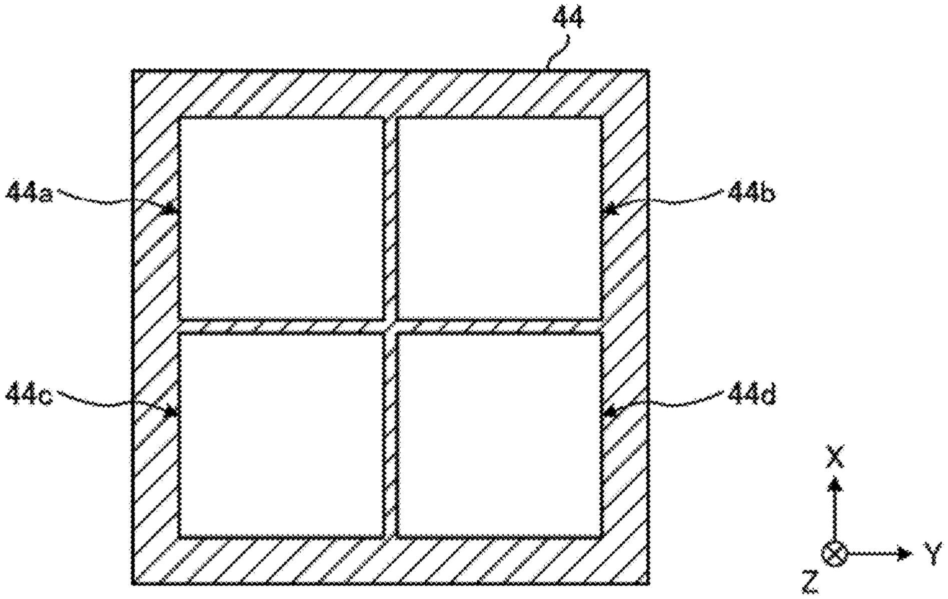
FIG. 22F is a diagram illustrating a configuration example of a third reference conductor according to the ninth embodiment.

The third reference conductor 44 is formed in a layer immediately below the layer in which the fourth resonator 30 is formed. FIG. 22F is a diagram illustrating a configuration example of the third reference conductor 44 according to the ninth embodiment. As illustrated in FIG. 22F, the third reference conductor 44 extends on the XY plane. The third reference conductor 44 is formed in a square shape. The third reference conductor 44 includes a gap 44*a*, a gap 44*b*, a gap 44*c*, and a gap 44*d*. The third reference conductor 44 has the same shape as the second reference conductor 42 illustrated in FIG. 22B. The layer in which the third reference conductor 44 is formed may also be referred to as a sixth layer.

Figure 22G:
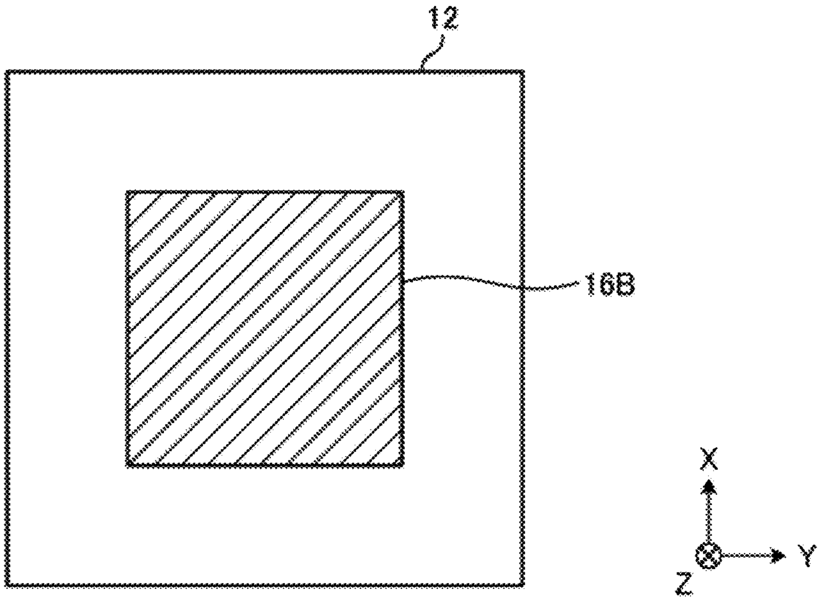
FIG. 22G is a diagram illustrating a configuration example of a second resonator according to the ninth embodiment.

The second resonator 16B is formed in a layer immediately below the layer in which the third reference conductor 44 is formed. FIG. 22G is a diagram illustrating a configuration example of the second resonator 16B according to the ninth embodiment. As illustrated in FIG. 22G, the second resonator 16B extends on the XY plane. The second resonator 16B is formed in, for example, a square patch shape. That is, the second resonator 16B has four-fold rotational symmetry in the XY plane. The second resonator 16B has the same shape as the first resonator 14B illustrated in FIG. 22A. The second resonator 16B and the fourth resonator 30 are magnetically or capacitively connected across the gap 44*a* to the gap 44*d*. The layer in which the second resonator 16B is formed is also referred to as a seventh layer.

Figure 23:
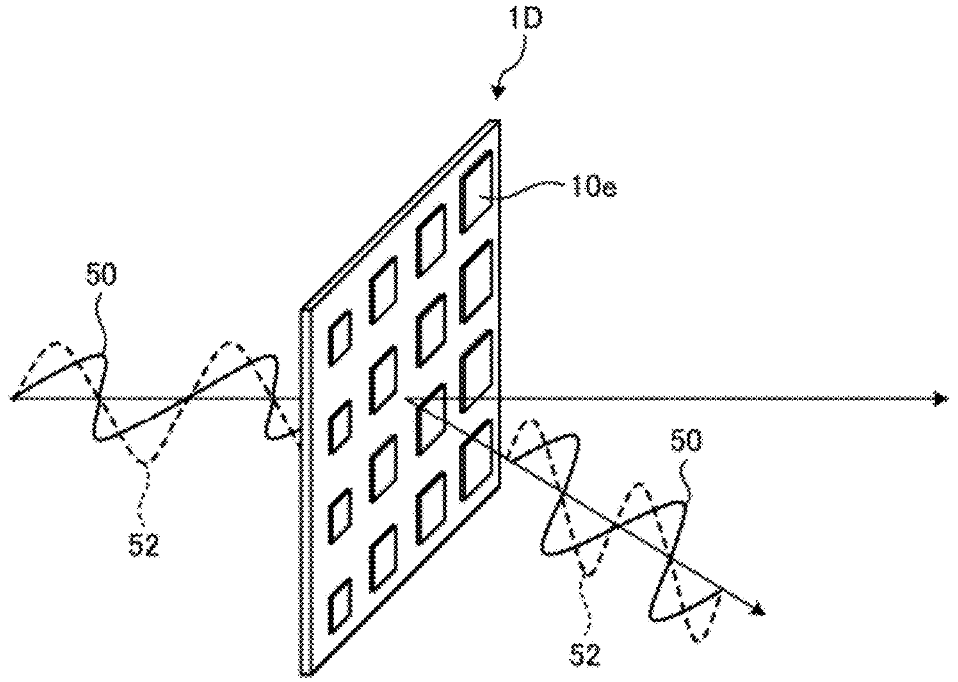
FIG. 23 is a diagram illustrating a refraction direction of a radio wave of a radio wave refracting plate according to the ninth embodiment.

In the unit structure of the present disclosure, the resonator may be formed in an odd-numbered layer, and the reference conductor may be formed in an even-numbered layer. The first resonator 14B and the third resonator 28 are magnetically or capacitively connected at a position of four-fold rotational symmetry. The third resonator 28 and the fourth resonator 30 are magnetically or capacitively connected at a position of four-fold rotational symmetry. The second resonator 16B and the fourth resonator 30 are magnetically or capacitively connected at a position of four-fold rotational symmetry. Therefore, the unit structure 10*e* operates as a filter for both the horizontally polarized wave and the vertically polarized wave. FIG. 23 is a diagram illustrating a refraction direction of a radio wave of the radio wave refracting plate according to the ninth embodiment. FIG. 23 illustrates a radio wave refracting plate 1D according to the ninth embodiment. The radio wave refracting plate 1D includes the plurality of unit structures 10*e*. As illustrated in FIG. 23, the radio wave refracting plate 1D receives the horizontally polarized wave 50 and the vertically polarized wave 52 received from a base station or the like in the same direction. In this case, the horizontally polarized wave 50 and the vertically polarized wave 52 are refracted in the same direction. Therefore, in the ninth embodiment, high received power can be obtained in the refraction direction of the radio wave refracting plate 1D.

In the ninth embodiment, the unit structure 10*e* has been described as having four-fold rotational symmetry, but the present disclosure is not limited thereto. The unit structure of the present disclosure only needs to have N-fold (N is an integer of 3 or more) rotational symmetry.

Variations of Ninth Embodiment

Variations of the ninth embodiment of the present disclosure will be described. In the ninth embodiment, each of the reference conductors has been described as forming the gaps at the four corners of the square patch conductor. However, the present disclosure is not limited thereto.

First Variation

Figure 24:
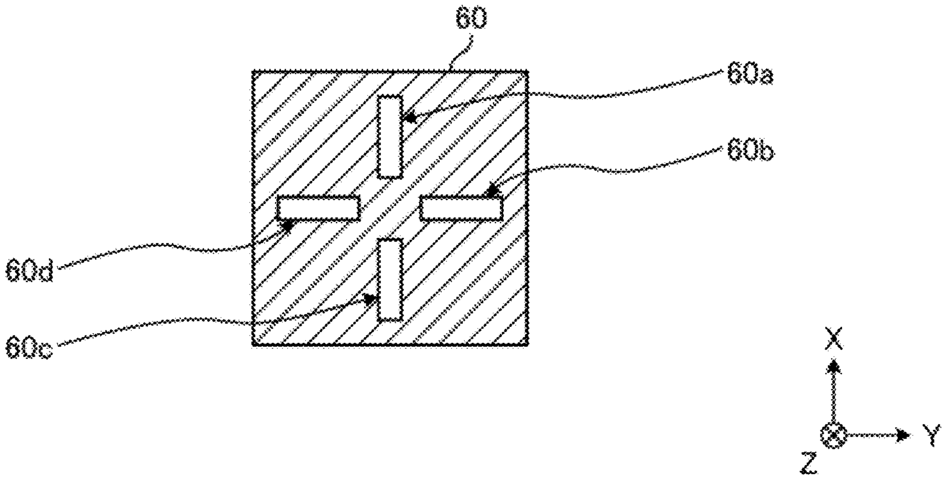
FIG. 24 is a diagram illustrating a configuration example of a reference conductor according to a first variation of the ninth embodiment.

FIG. 24 is a diagram illustrating a configuration example of a reference conductor according to a first variation of the ninth embodiment. As illustrated in FIG. 24, the reference conductor 60 may be formed in a square shape. The reference conductor 60 includes a gap 60*a*, a gap 60*b*, a gap 60*c*, and a gap 60*d*.

The gap 60*a* may be formed in the central upper portion of the reference conductor 60. The gap 60*b* may be formed in the central right portion of the reference conductor 60. The gap 60*c* may be formed in the central lower portion of the reference conductor 60. The gap 60*d* may be formed in the central left portion of the reference conductor 60.

The respective gaps 60*a* to 60*d* may be formed in the same rectangular shape. The reference conductor 60 has four-fold rotational symmetry in the XY plane.

Figure 25:
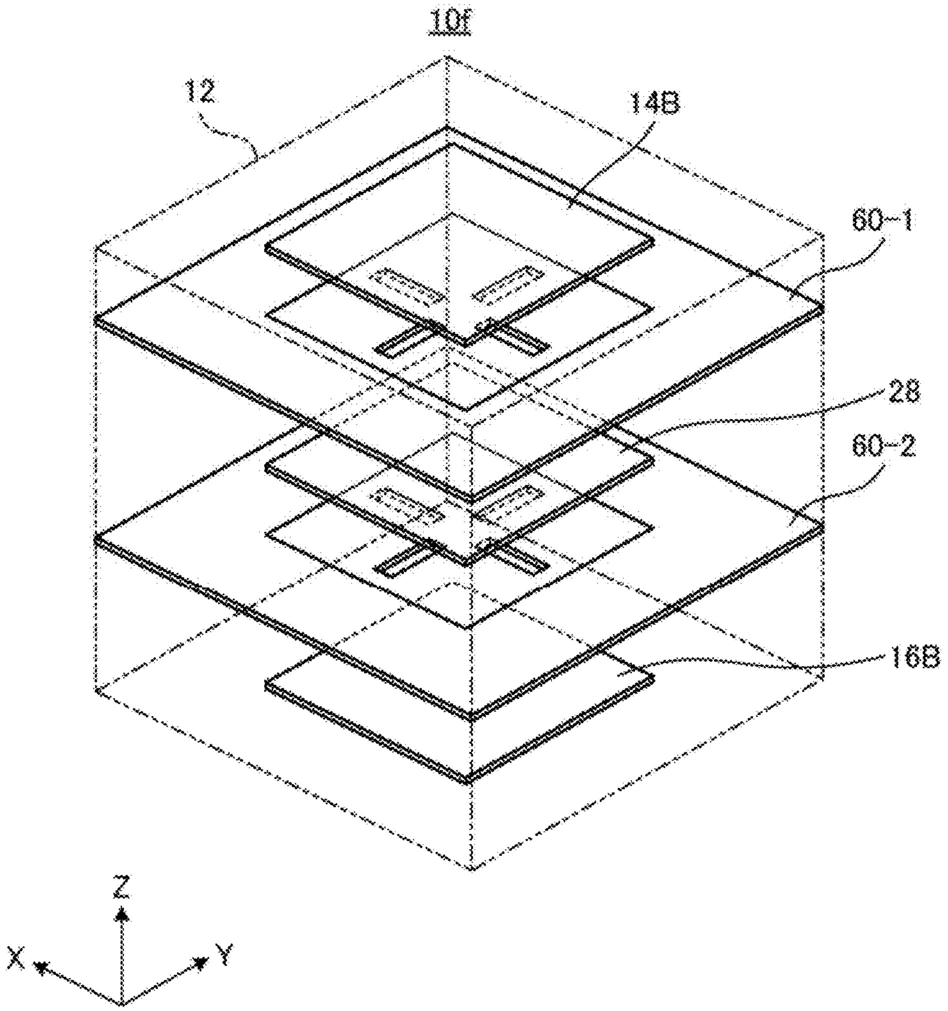
FIG. 25 is a diagram illustrating a configuration example of a unit structure according to the first variation of the ninth embodiment.

FIG. 25 is a diagram illustrating a configuration example of a unit structure according to the first variation of the ninth embodiment. As illustrated in FIG. 25, a unit structure 10*f* includes the substrate 12, the first resonator 14B, the second resonator 16B, the third resonator 28, a reference conductor 60-1, and a reference conductor 60-2. In the unit structure 10*f*, the second resonator 16B, the reference conductor 60-2, the third resonator 28, the reference conductor 60-1, and the first resonator 14B are stacked in this order from the bottom. Each of the substrate 12, the first resonator 14B, the second resonator 16B, the third resonator 28, the reference conductor 60-1, and the reference conductor 60-2 extends on the XY plane. The unit structure 10*f* has four-fold rotational symmetry in the XY plane. The reference conductor 60-1 and the reference conductor 60-2 have the same configuration as that of the reference conductor 60 illustrated in FIG.

24. In FIG. 25, the first resonator 14B and the third resonator 28 are magnetically or capacitively connected across the gap 60*a* to the gap 60*d* of the reference conductor 60-1. The second resonator 16B and the third resonator 28 are magnetically or capacitively connected across the gap 60*a* to the gap 60*d* of the reference conductors 60-2. The unit structure 10*f* has four-fold rotational symmetry in the XY plane.

When the radio wave refracting plate is configured using the unit structures 10*f* according to the first variation of the ninth embodiment, the horizontally polarized wave and the vertically polarized wave can be refracted in the same direction.

Second Variation

Figure 26:
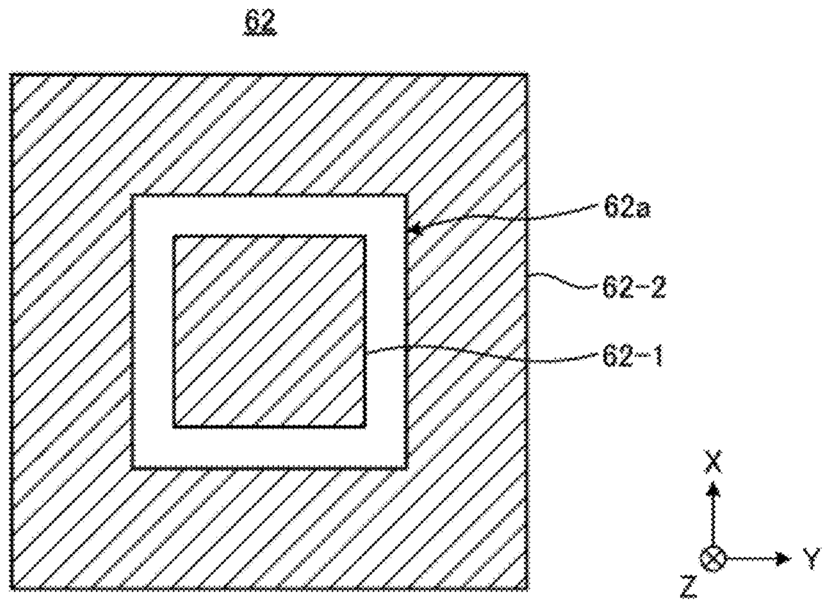
FIG. 26 is a diagram illustrating a configuration example of a reference conductor according to a second variation of the ninth embodiment.

FIG. 26 is a diagram illustrating a configuration example of a reference conductor according to a second variation of the ninth embodiment. As illustrated in FIG. 26, a reference conductor 62 includes a center conductor 62-1 and a peripheral conductor 62-2. The center conductor 62-1 may be formed in a square shape. The peripheral conductor 62-2 may be formed in a square shape. The peripheral conductor 62-2 includes a gap 62*a* in the central portion. The gap 62*a* may be formed in a square shape. The center conductor 62-1 may be located at the central portion inside the gap 62*a*. The reference conductor 62 has four-fold rotational symmetry in the XY plane.

Figure 27:
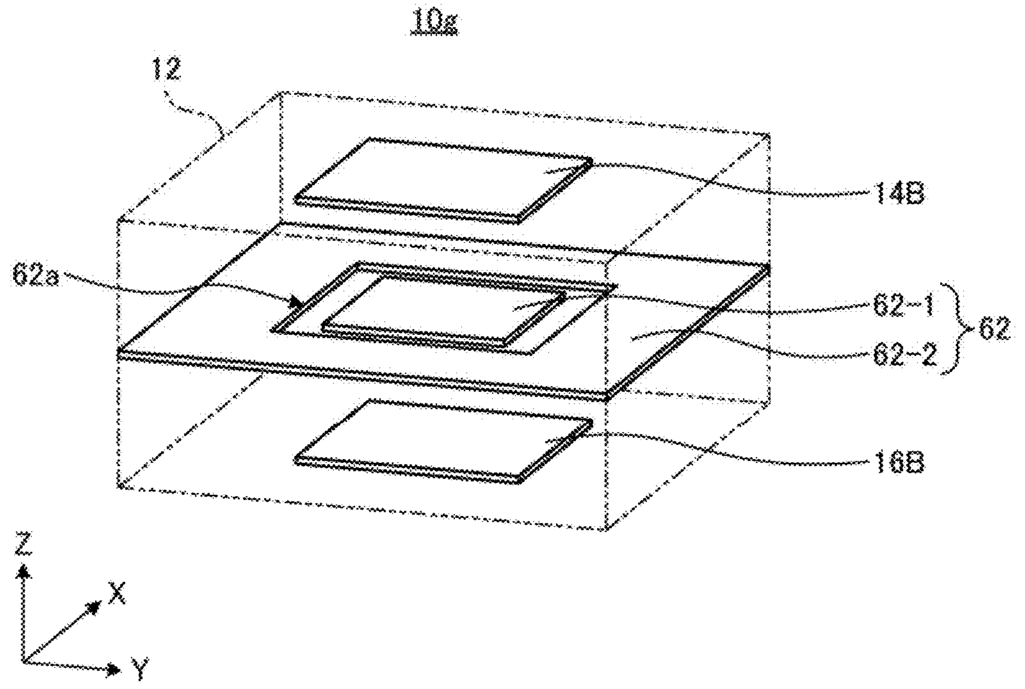
FIG. 27 is a diagram illustrating a configuration example of a unit structure according to the second variation of the ninth embodiment.

FIG. 27 is a diagram illustrating a configuration example of a unit structure according to the second variation of the ninth embodiment. As illustrated in FIG. 27, a unit structure 10*g* includes the substrate 12, the first resonator 14B, the second resonator 16B, and the reference conductor 62. In the unit structure 10*g*, the second resonator 16B, the reference conductor 62, and the first resonator 14B are stacked in this order from the bottom. In FIG. 27, the first resonator 14B and the second resonator 16B are magnetically or capacitively connected across the gap 62*a* of the reference conductor 62. The unit structure 10*g* has four-fold rotational symmetry in the XY plane.

When the radio wave refracting plate is configured using the unit structures 10*g* according to the second variation of the ninth embodiment, the horizontally polarized wave and the vertically polarized wave can be refracted in the same direction.

Third Variation

Figure 28:
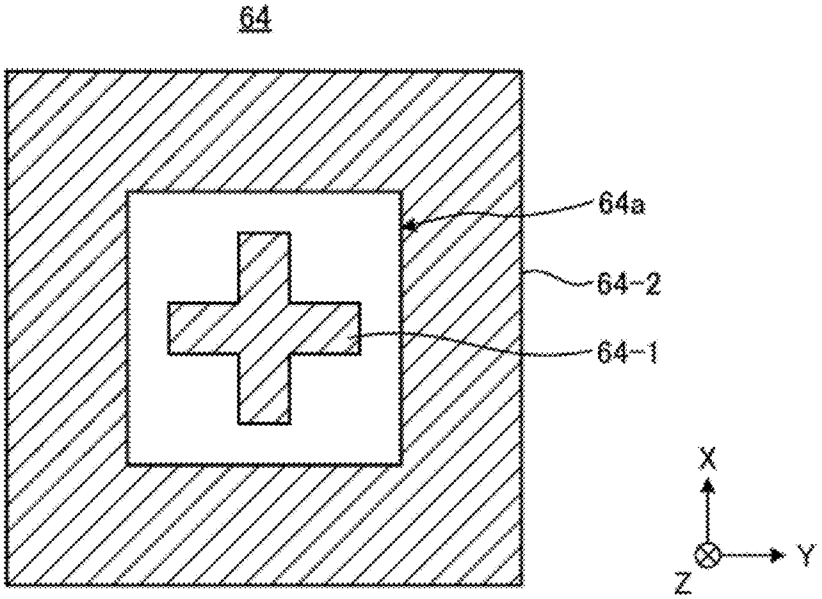
FIG. 28 is a diagram illustrating a configuration example of a reference conductor according to a third variation of the ninth embodiment.

FIG. 28 is a diagram illustrating a configuration example of a reference conductor according to a third variation of the ninth embodiment. As illustrated in FIG. 28, a reference conductor 64 includes a center conductor 64-1 and a peripheral conductor 64-2. The center conductor 64-1 may be formed in a cross shape. The peripheral conductor 64-2 may be formed in a square shape. The peripheral conductor 64-2 includes a gap 64*a* in the central portion. The gap 64*a* may be formed in a square shape. The center conductor 64-1 may be located at the central portion inside the gap 64*a*. The reference conductor 64 has four-fold rotational symmetry in the XY plane.

Figure 29:
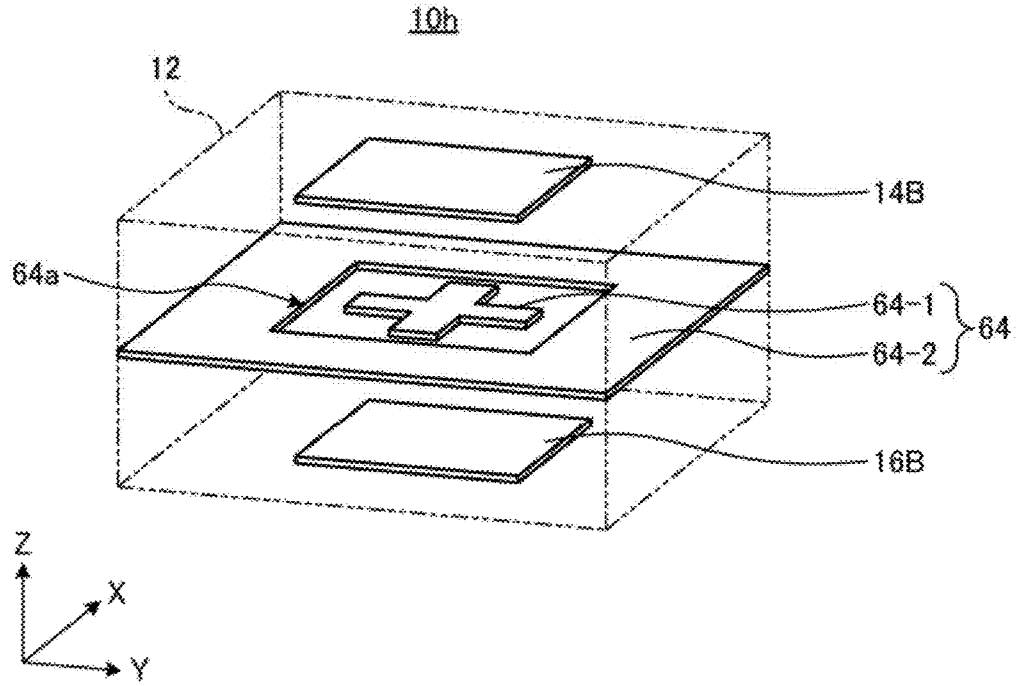
FIG. 29 is a diagram illustrating a configuration example of a unit structure according to the third variation of the ninth embodiment.

FIG. 29 is a diagram illustrating a configuration example of a unit structure according to the third variation of the ninth embodiment. As illustrated in FIG. 29, a unit structure 10*h* includes the substrate 12, the first resonator 14B, the second resonator 16B, and the reference conductor 64. In the unit structure 10*h*, the second resonator 16B, the reference conductor 64, and the first resonator 14B are stacked in this order from the bottom. The first resonator 14B, the second resonator 16B, and the reference conductor 64 extend on the XY plane. In FIG. 29, the first resonator 14B and the second resonator 16B are magnetically or capacitively connected across the gap 64*a* of the reference conductor 64. The unit structure 10*h* has four-fold rotational symmetry in the XY plane.

When the radio wave refracting plate is configured using the unit structures 10*h* according to the third variation of the ninth embodiment, the horizontally polarized wave and the vertically polarized wave can be refracted in the same direction.

Fourth Variation

Figure 30:
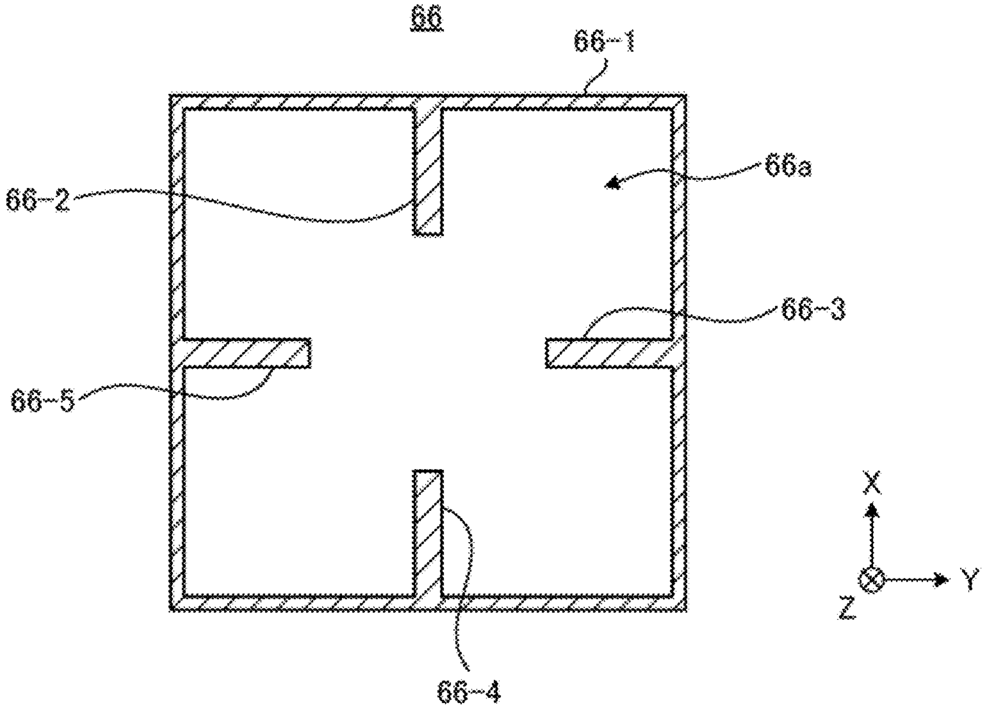
FIG. 30 is a diagram illustrating a configuration example of a reference conductor according to a fourth variation of the ninth embodiment.

FIG. 30 is a diagram illustrating a configuration example of a reference conductor according to a fourth variation of the ninth embodiment. As illustrated in FIG. 30, a reference conductor 66 includes a peripheral conductor 66-1, an upper conductor 66-2, a right conductor 66-3, a lower conductor 66-4, and a left conductor 66-5.

The peripheral conductor 66-1 may be formed in a square frame shape. The peripheral conductor 66-1 has a square gap 66*a*. The upper conductor 66-2 may be formed in the central portion of the upper side of the peripheral conductor 66-1 in the gap 66*a*. The right conductor 66-3 may be formed in the central portion of the right side of the peripheral conductor 66-1 in the gap 66*a*. The lower conductor 66-4 may be formed in the central portion of the lower side of the peripheral conductor 66-1 in the gap 66*a*. The left conductor 66-5 may be formed in the central portion of the left side of the peripheral conductor 66-1 in the gap 66*a*. The upper conductor 66-2, the right conductor 66-3, the lower conductor 66-4, and the left conductor 66-5 may be formed in the same shape. The upper conductor 66-2, the right conductor 66-3, the lower conductor 66-4, and the left conductor 66-5 may be formed in a rectangular shape, for example. The reference conductor 66 has four-fold rotational symmetry in the XY plane.

Figure 31:
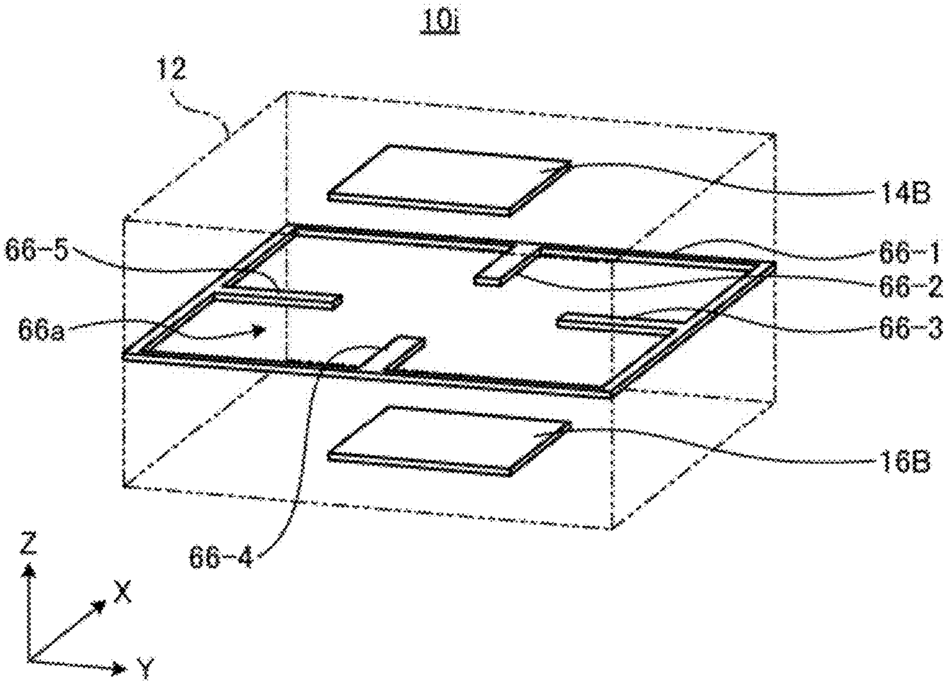
FIG. 31 is a diagram illustrating a configuration example of a unit structure according to the fourth variation of the ninth embodiment.

FIG. 31 is a diagram illustrating a configuration example of a unit structure according to the fourth variation of the ninth embodiment. As illustrated in FIG. 31, a unit structure 10*i* includes the substrate 12, the first resonator 14B, the second resonator 16B, and the reference conductor 66. In the unit structure 10*i*, the second resonator 16B, the reference conductor 66, and the first resonator 14B are stacked in this order from the bottom. In FIG. 31, the first resonator 14B and the second resonator 16B are magnetically or capacitively connected across the gap 66*a* of the reference conductors 66. The unit structure 10*i* has four-fold rotational symmetry in the XY plane.

When the radio wave refracting plate is configured using the unit structures 10*i* according to the fourth variation of the ninth embodiment, the horizontally polarized wave and the vertically polarized wave can be refracted in the same direction.

Fifth Variation

Figure 32:
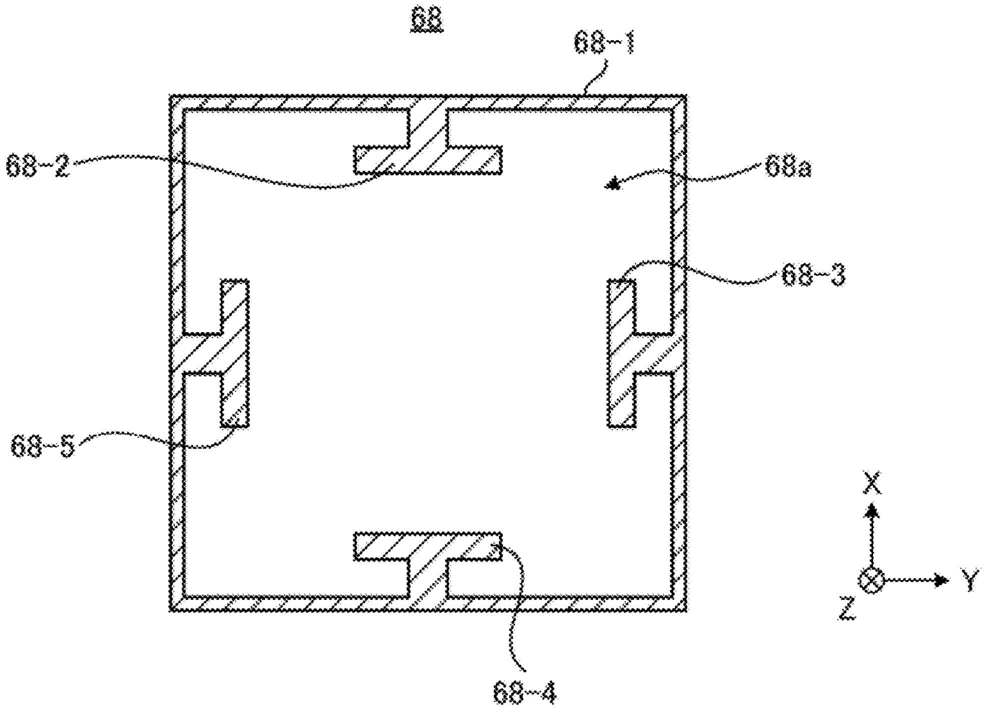
FIG. 32 is a diagram illustrating a configuration example of a reference conductor according to a fifth variation of the ninth embodiment.

FIG. 32 is a diagram illustrating a configuration example of a reference conductor according to a fifth variation of the ninth embodiment. As illustrated in FIG. 32, a reference conductor 68 includes a peripheral conductor 68-1, an upper conductor 68-2, a right conductor 68-3, a lower conductor 68-4, and a left conductor 68-5. The peripheral conductor 68-1 may be formed in a square frame shape. The peripheral conductor 68-1 has a square gap 68*a*. The reference conductor 68 differs from the reference conductor 66 illustrated in FIG. 30 in that the peripheral conductor 68-1, the upper conductor 68-2, the right conductor 68-3, the lower conductor 68-4, and the left conductor 68-5 are formed in T-shapes.

Figure 33:
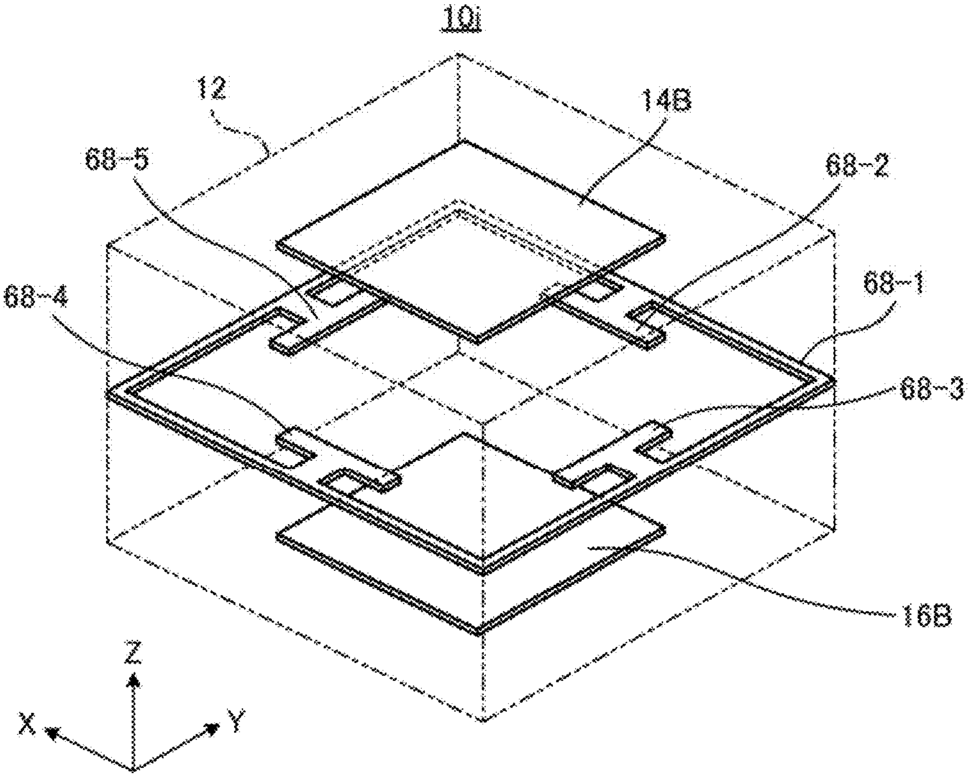
FIG. 33 is a diagram illustrating a configuration example of a unit structure according to the fifth variation of the ninth embodiment.

FIG. 33 is a diagram illustrating a configuration example of a unit structure according to the fifth variation of the ninth embodiment. As illustrated in FIG. 33, a unit structure 10*j* includes the substrate 12, the first resonator 14B, the second resonator 16B, and the reference conductor 68. In the unit structure 10*j*, the second resonator 16B, the reference conductor 68, and the first resonator 14B are stacked in this order from the bottom. The first resonator 14B, the second resonator 16B, and the reference conductor 68 extend on the XY plane. In FIG. 33, the first resonator 14B and the second resonator 16B are magnetically or capacitively connected across the gap 68*a* of the reference conductors 68. The unit structure 10*j* has four-fold rotational symmetry in the XY plane.

When the radio wave refracting plate is configured using the unit structures 10*j* according to the fifth variation of the ninth embodiment, the horizontally polarized wave and the vertically polarized wave can be refracted in the same direction.

Sixth Variation

Figure 34:
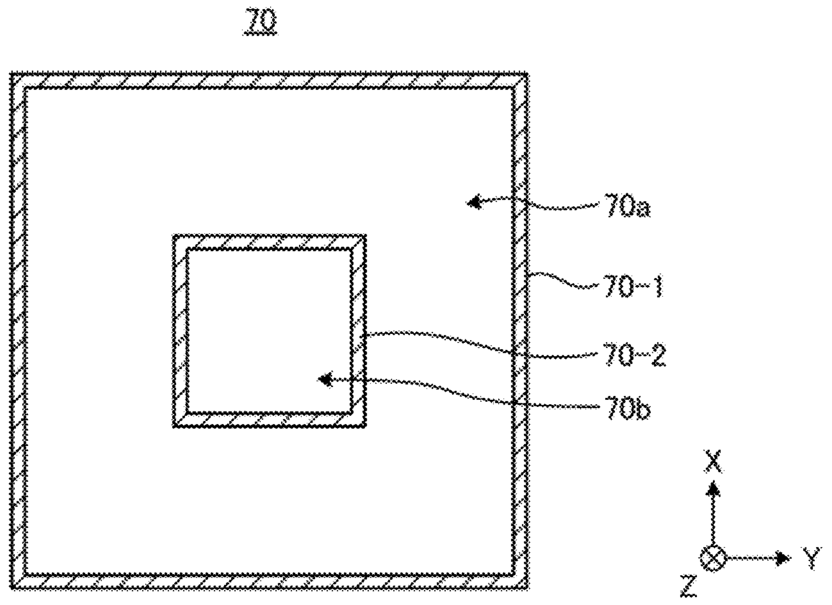
FIG. 34 is a diagram illustrating a configuration example of a reference conductor according to a sixth variation of the ninth embodiment.

FIG. 34 is a diagram illustrating a configuration example of a reference conductor according to a sixth variation of the ninth embodiment. As illustrated in FIG. 34, a reference conductor 70 includes a frame conductor 70-1 and a frame conductor 70-2.

The frame conductor 70-1 may be formed in a square frame shape. The frame conductor 70-1 has a square gap 70*a*. The frame conductor 70-2 may be formed inside the gap 70*a*. The frame conductor 70-2 may be formed in a square frame shape. The frame conductor 70-2 has a square gap 70*b*. In the XY plane, the center of the gap 70*a* may match the center of the gap 70*b*. The reference conductor 70 has four-fold rotational symmetry in the XY plane.

Figure 35:
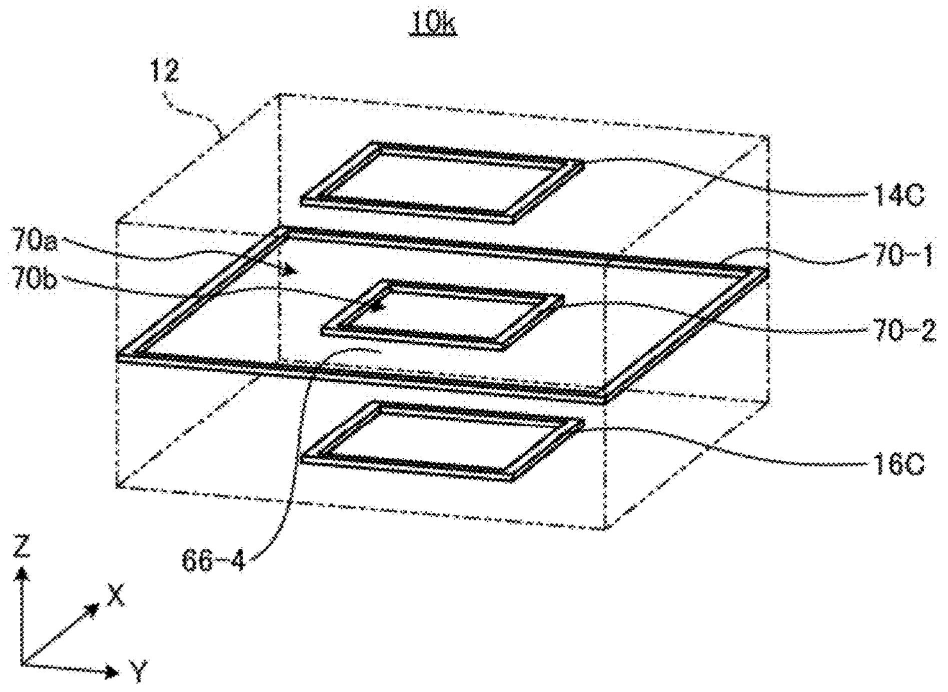
FIG. 35 is a diagram illustrating a configuration example of a unit structure according to the sixth variation of the ninth embodiment.

FIG. 35 is a diagram illustrating a configuration example of a unit structure according to the sixth variation of the ninth embodiment. As illustrated in FIG. 35, a unit structure 10*k* includes the substrate 12, a first resonator 14C, a second resonator 16C, and the reference conductor 68. In the unit structure 10*j*, the second resonator 16C, the reference conductor 70, and the first resonator 14C are stacked in this order from the bottom. The first resonator 14C, the second resonator 16C, and the reference conductor 68 extend on the XY plane.

Figure 36:
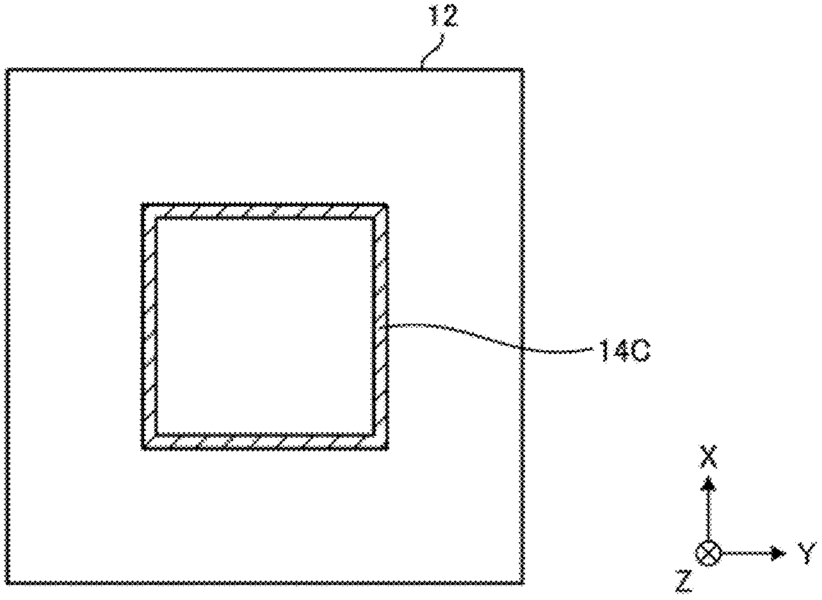
FIG. 36 is a diagram illustrating a configuration example of a resonator according to the sixth variation of the ninth embodiment.

The first resonator 14C is formed in a square shape. The first resonator 14C is formed in a frame shape. The second resonator 16C is formed in a square shape. The second resonator 16C is formed in a frame shape. The first resonator 14C and the second resonator 16C have the same shape. FIG. 36 is a diagram illustrating a configuration example of a resonator according to the sixth variation of the ninth embodiment. As illustrated in FIG. 36, the first resonator 14C is formed in a square frame shape. That is, the shape of the resonator formed in the odd-numbered layer of the present disclosure is not limited to a square shape.

The first resonator 14C and the second resonator 16C are magnetically or capacitively connected across the gap 70*a* and the gap 70*b*.

When the radio wave refracting plate is configured using the unit structures 10*k* according to the sixth variation of the ninth embodiment, the horizontally polarized wave and the vertically polarized wave can be refracted in the same direction.

Seventh Variation

Figure 37:
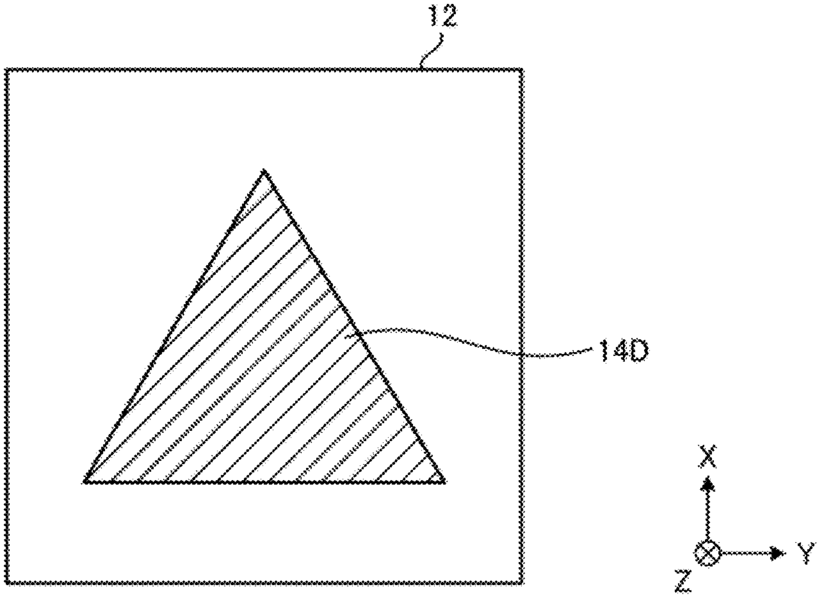
FIG. 37 is a diagram illustrating a configuration example of a resonator according to a seventh variation of the ninth embodiment.

As described in the sixth variation of the ninth embodiment, the shape of the resonator of the present disclosure is not limited to the square shape. FIG. 37 is a diagram illustrating a configuration example of a resonator according to a seventh variation of the ninth embodiment. As illustrated in FIG. 37, a first resonator 14D may be formed in a triangular shape. The first resonator 14D has three-fold rotational symmetry. That is, in the present disclosure, the resonator may be formed in an N-gon (N is an integer of 3 or more), or may be formed in a circular shape.

Tenth Embodiment

A tenth embodiment of the present disclosure will be described. In the embodiments described above, the unit structure has been described as being a quadrangular prism, but the present disclosure is not limited thereto.

Figure 38:
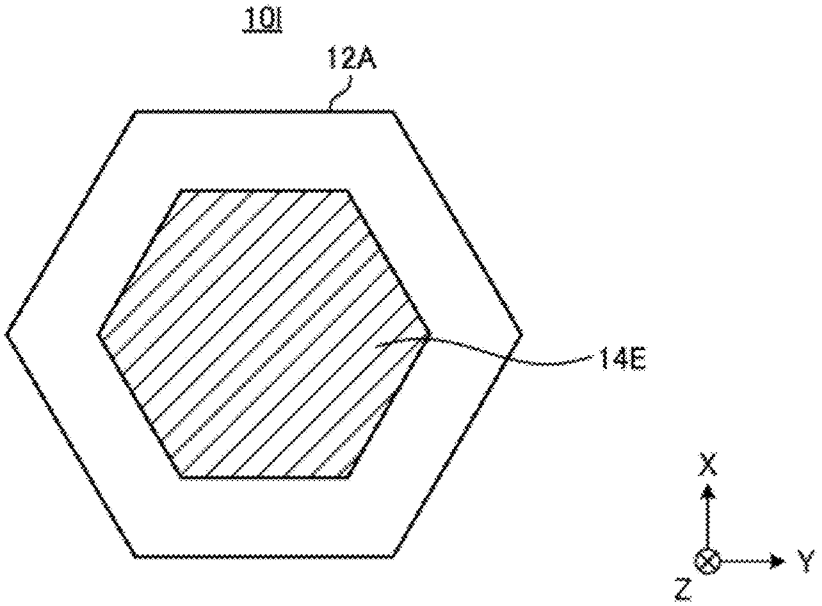
FIG. 38 is a diagram illustrating a configuration example of a unit structure according to a tenth embodiment.
Figure 39:
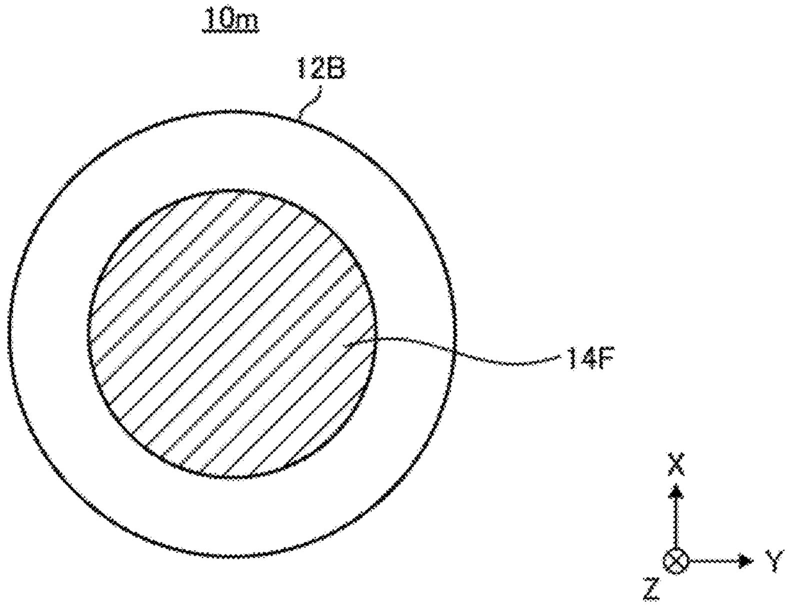
FIG. 39 is a diagram illustrating a configuration example of the unit structure according to the tenth embodiment.

FIGS. 38 and 39 are diagrams illustrating a configuration example of a unit structure according to the tenth embodiment. FIGS. 38 and 39 are diagrams of a unit structure 10*l* as viewed from above.

As illustrated in FIG. 38, a substrate 12A is formed in a hexagonal shape as viewed from above. That is, the unit structure 10*l* is a hexagonal column. In this case, a first resonator 14E may be formed in a hexagonal shape. That is, the unit structure according to the tenth embodiment may be formed in a polygonal shape. Specifically, the unit structure according to the tenth embodiment may be formed in an N-gon (N is an integer of 3 or more).

As illustrated in FIG. 39, a substrate 12B is formed in a circular shape as viewed from above. That is, a unit structure 10*m* is a cylinder. In this case, a first resonator 14F may be formed in a circular shape.

As described in the tenth embodiment, in the present disclosure, the configuration of the unit structure is not limited to a quadrangular prism, and can be various shapes.

Eleventh Embodiment

An eleventh embodiment of the present disclosure will be described.

Configuration of Unit Structure

Figure 40:
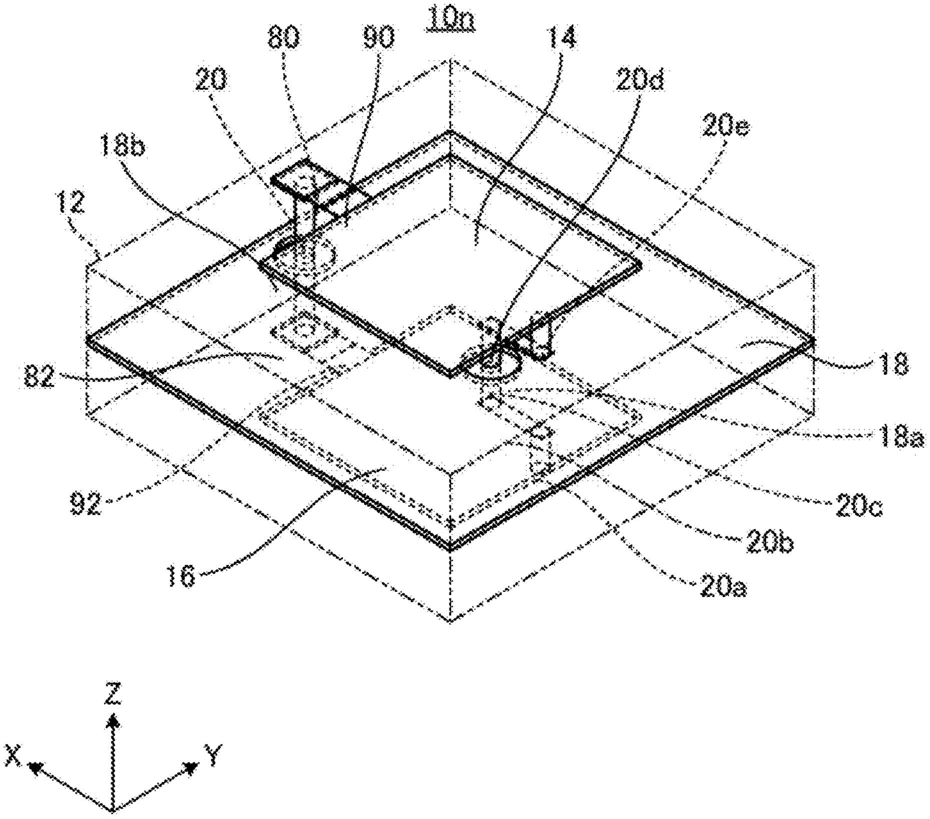
FIG. 40 is a diagram illustrating a configuration example of a unit structure according to an eleventh embodiment.

A configuration example of the unit structure according to the eleventh embodiment will be described with reference to FIG. 40. FIG. 40 is a diagram illustrating the configuration example of the unit structure according to the eleventh embodiment.

As illustrated in FIG. 40, a unit structure 10*n* differs from the unit structure 10*a* illustrated in FIG. 9 in that the unit structure 10*n* includes the connection line path 20, a connection conductor 80, a connection conductor 82, a variable capacitance element 90, and a variable capacitance element 92.

The connection conductor 80 may be formed on the same surface as the surface on which the first resonator 14 is formed. The connection conductor 80 is smaller than the first resonator 14. The connection conductor 80 may be arranged with a clearance from the first resonator 14.

The connection conductor 82 may be formed on the same surface as the surface on which the second resonator 16 is formed. The connection conductor 82 is smaller than the second resonator 16. The connection conductor 82 may be arranged with a clearance from the second resonator 16.

The variable capacitance element 90 may be disposed in a clearance between the first resonator 14 and the connection conductor 80. The variable capacitance element 90 may have one end connected to the first resonator 14 and the other end connected to the connection conductor 80. The variable capacitance element 90 is, for example, a varactor diode, but is not limited thereto.

The variable capacitance element 92 may be disposed in a clearance between the second resonator 16 and the connection conductor 82. The variable capacitance element 92 may have one end connected to the second resonator 16 and the other end connected to the connection conductor 82. The variable capacitance element 92 is, for example, a varactor diode, but is not limited thereto.

Both the variable capacitance element 90 and the variable capacitance element 92 are not necessarily disposed. Disposing at least one of the variable capacitance element 90 and/or the variable capacitance element 92 is sufficient.

The connection line path 20 has one end connected to the connection conductor 80 and the other end connected to the connection conductor 82. The connection line path 20 may be a line path parallel to the Z-axis direction. The reference conductor 18 has the through-hole 18*b* through which the connection line path 20 passes.

That is, in the unit structure 10*n*, the variable capacitance element 90 and the variable capacitance element 92 are disposed to connect the first resonator 14 and the second resonator 16.

Figure 41:
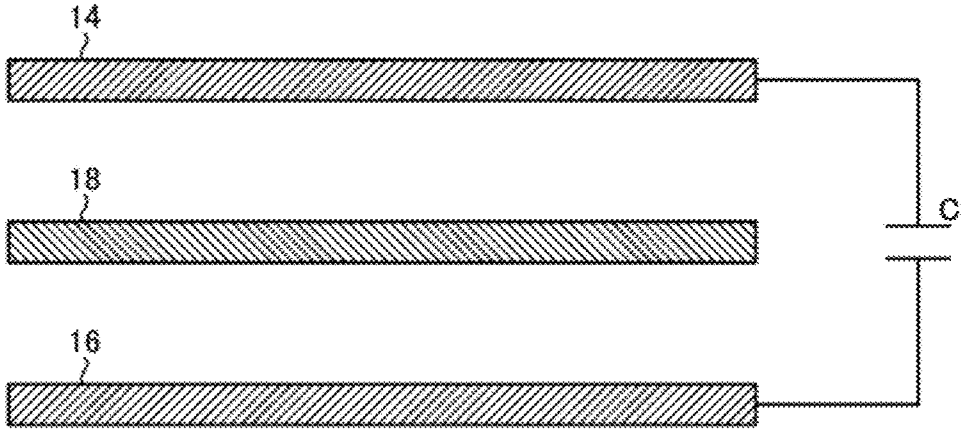
FIG. 41 is a diagram illustrating a schematic configuration example of the unit structure according to the eleventh embodiment.

FIG. 41 is a diagram illustrating a schematic configuration example of the unit structure according to the eleventh embodiment. As illustrated in FIG. 41, in the eleventh embodiment, a variable capacitance C is connected between the first resonator 14 and the second resonator 16. In the unit structure 10*n*, when the capacitance is connected between the first resonator 14 and the second resonator 16, a refraction angle, a convergence degree, a transmittance, and/or the like of a radio wave may change. That is, connecting the variable capacitance C between the first resonator 14 and the second resonator 16 and dynamically controlling the capacitance allow dynamically controlling the refraction angle, the convergence degree, the transmittance, and/or the like of the radio wave.

For example, assume when the capacitance connected between the first resonator 14 and the second resonator 16 is a 1 fF (Femto Farad), the unit structure 10*n* shifts the phase of the electromagnetic wave in the vicinity of 27.75 GHz by about 28°. In this case, for example, when the capacitance connected between the first resonator 14 and the second resonator 16 is changed to 14 fF, the amount of phase shift of the electromagnetic wave in the vicinity of 27.75 GHz of the unit structure 10*n* changes to about −33°.

In the eleventh embodiment, controlling a voltage applied to the variable capacitance element 90 and the variable capacitance element 92 makes it possible to control the capacitance between the first resonator 14 and the second resonator 16. For example, for communications with the base station in a room via the radio wave refracting plate including the unit structure 10*n*, when reception sensitivity of an electromagnetic wave is low or the like, the voltages applied to the variable capacitance element 90 and the variable capacitance element 92 are controlled to allow the refraction angle, the convergence degree, the transmittance, and/or the like of the radio wave to be changed. Thus, the eleventh embodiment can achieve desired reception sensitivity. For example, the voltages applied to the variable capacitance element 90 and the variable capacitance element 92 may be automatically set by a control device (not illustrated) based on reception sensitivity of a receiver or may be manually set.

As described above, in the eleventh embodiment, changing the voltages applied to the variable capacitance element 90 and the variable capacitance element 92 connected between the first resonator 14 and the second resonator 16 makes it possible to control the resonant frequency of the unit structure 10*n*. Thus, in the eleventh embodiment, the refraction angle, the convergence degree, and the transmittance of the radio wave can be dynamically controlled.

Variation of Eleventh Embodiment

A variation of the eleventh embodiment of the present disclosure will be described.

In the eleventh embodiment, the description has been given that the variable capacitance element 90 and the variable capacitance element 92 are connected between the first resonator 14 and the second resonator 16. A variable inductor may be connected between the first resonator 14 and the second resonator 16.

The first resonator 14 and the second resonator 16 are magnetically or capacitively connected. Therefore, the variable capacitance element or the variable inductor only need to be connected between the first resonator 14 and the second resonator 16 according to a balance between the magnetic coupling and capacitive coupling between the first resonator 14 and the second resonator 16.

Twelfth Embodiment

A twelfth embodiment of the present disclosure will be described.

Configuration of Unit Structure

Figure 42:
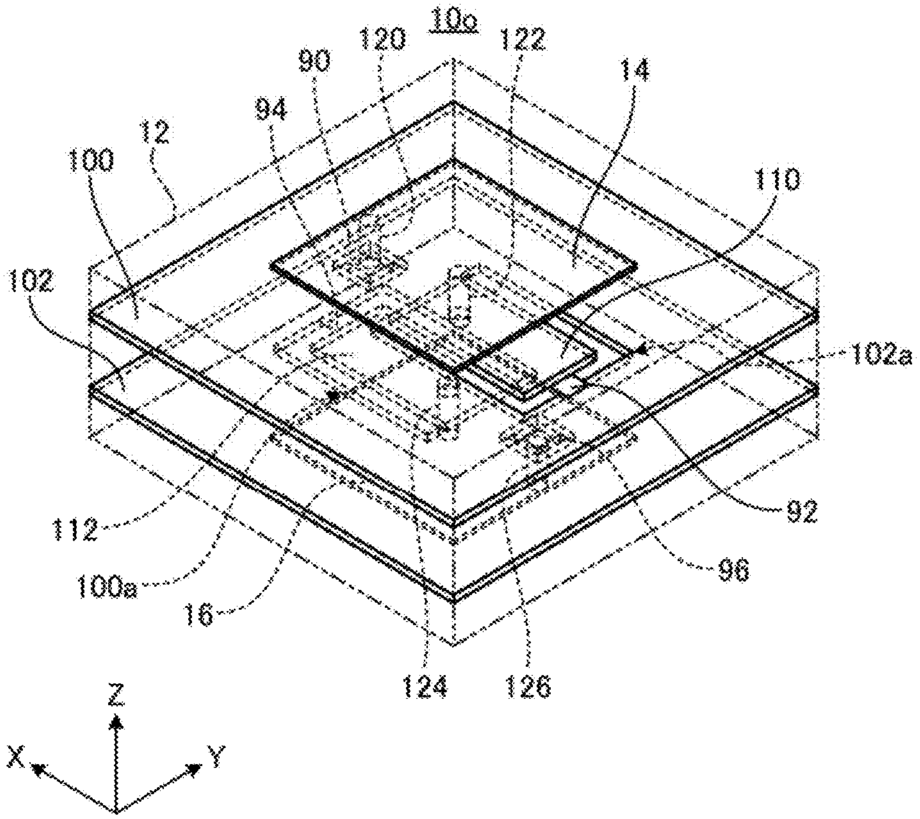
FIG. 42 is a diagram illustrating a configuration example of a unit structure according to a twelfth embodiment.
Figure 43:
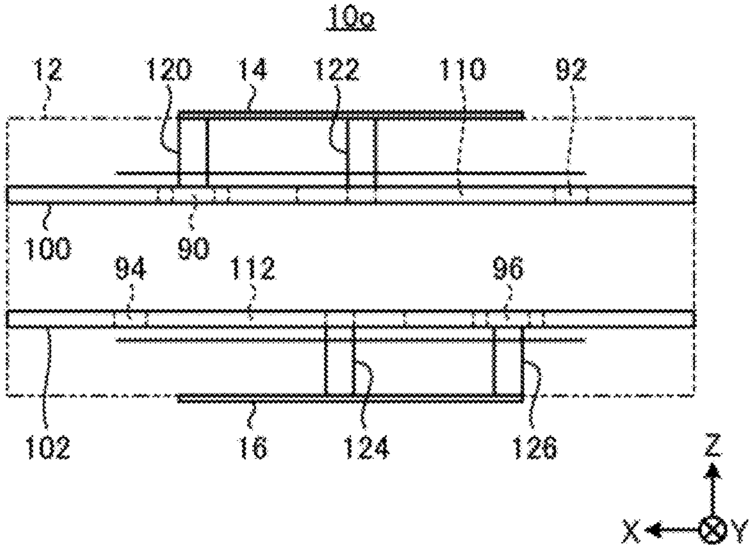
FIG. 43 is a cross-sectional view of the configuration example of the unit structure according to the twelfth embodiment.

A configuration example of the unit structure according to the twelfth embodiment will be described with reference to FIGS. 42 and 43. FIG. 42 is a diagram illustrating the configuration example of the unit structure according to the twelfth embodiment. FIG. 43 is a cross-sectional view of the configuration example of the unit structure according to the twelfth embodiment.

As illustrated in FIG. 42, a unit structure 10*o* includes the substrate 12, the first resonator 14, the second resonator 16, the variable capacitance element 90, the variable capacitance element 92, a variable capacitance element 94, a variable capacitance element 96, a variable capacitance element 98, a first reference conductor 100, a second reference conductor 102, a third resonator 110, a fourth resonator 112, a connection line path 120, a connection line path 122, a connection line path 124, and a connection line path 126.

In the unit structure 10*o*, the second resonator 16, the second reference conductor 102, the first reference conductor 100, and the first resonator 14 are stacked in this order from the bottom.

The first reference conductor 100 extends on the XY plane. The first reference conductor 100 is formed in a square shape. The first reference conductor 100 has a rectangular gap 100*a*. The rectangular third resonator 110 is formed in the gap 100*a*.

The second reference conductor 102 extends on the XY plane. The second reference conductor 102 is formed in a square shape. The second reference conductor 102 has a rectangular gap 102*a*. The rectangular fourth resonator 112 is formed in the gap 102*a*.

One side among the four sides of the third resonator 110 is connected to the first reference conductor 100. The third resonator 110 extends in the —X direction from the connector with the first reference conductor 100. The unit structure 10*o* has a clearance between the remaining three sides of the third resonator 110 and the first reference conductor 100. The first reference conductor 100 and the third resonator 110 are magnetically or capacitively connected via the clearance.

One side among the four sides of the fourth resonator 112 is connected to the second reference conductor 102. The fourth resonator 112 extends in the X direction from the connector with the second reference conductor 102. The second reference conductor 102 and the fourth resonator 112 have a structure obtained by rotating the first reference conductor 100 and the third resonator 110 by 180° in the XY plane. The unit structure 10*o* has a clearance between the remaining three sides of the fourth resonator 112 and the second reference conductor 102. The second reference conductor 102 and the fourth resonator 112 are magnetically or capacitively connected via the clearance.

The connection line path 120 and the connection line path 122 are located between the first resonator 14 and the first reference conductor 100.

The connection line path 120 magnetically or capacitively connects the first resonator 14 and the first reference conductor 100. The connection line path 120 has one end connected to the first resonator 14 and the other end connected to the first reference conductor 100. Note that two or more connection line paths that magnetically or capacitively connect the first resonator 14 and the first reference conductor 100 may be present.

The connection line path 122 magnetically or capacitively connects the first resonator 14 and the third resonator 110. The connection line path 122 has one end connected to the first resonator 14 and the other end connected to the third resonator 110. Note that two or more connection line paths that magnetically or capacitively connect the first resonator 14 and the third resonator 110 may be present.

The connection line path 124 and the connection line path 126 are located between the second resonator 16 and the second reference conductor 102.

The connection line path 124 magnetically or capacitively connects the second resonator 16 and the fourth resonator 112. The connection line path 124 has one end connected to the second resonator 16 and the other end connected to the fourth resonator 112. Note that two or more connection line paths that magnetically or capacitively connect the second resonator 16 and the fourth resonator 112 may be present.

The connection line path 126 magnetically or capacitively connects the second resonator 16 and the second reference conductor 102. The connection line path 126 has one end connected to the second resonator 16 and the other end connected to the second reference conductor 102. Note that two or more connection line paths that magnetically or capacitively connect the second resonator 16 and the second reference conductor 102 may be present.

The variable capacitance element 90 is disposed between the first resonator 14 and the first reference conductor 100. The variable capacitance element 90 is disposed, for example, at a connector between the first reference conductor 100 and the connection line path 120.

The variable capacitance element 92 is disposed in a clearance between the first reference conductor 100 and the third resonator 110. The variable capacitance element 92 is disposed, for example, in the clearance between the side of the third resonator 110 opposite to the side connected to the first reference conductor 100 and the first reference conductor 100.

The variable capacitance element 94 is disposed in a clearance between the second reference conductor 102 and the fourth resonator 112. The variable capacitance element 94 is disposed, for example, in a clearance between the side of the fourth resonator 112 opposite to the side connected to the second reference conductor 102 and the second reference conductor 102.

The variable capacitance element 96 is disposed between the second resonator 16 and the second reference conductor 102. The variable capacitance element 96 is disposed, for example, at a connector between the second reference conductor 102 and the connection line path 126.

That is, in the twelfth embodiment, the variable capacitance elements are connected between the respective resonators and the respective reference conductors in the unit structure 10*o*.

In the twelfth embodiment, since the capacitance between each of the resonators and each of the reference conductors changes by applying a voltage from each of the variable capacitance element 90 to the variable capacitance element 96, the resonance frequency of the unit structure 10*o* can be changed. Thus, in the twelfth embodiment, the refraction angle, the convergence degree, and the transmittance of the radio wave can be dynamically controlled.

For example, assume that the variable capacitance element 96 is not connected from the variable capacitance element 90, the unit structure 10*o* shifts the phase of the electromagnetic wave in the vicinity of 22.50 GHz by about −67°. In this case, when the capacitance of the variable capacitance element 96 is changed to 0.005 pF (Pico Farad) from the variable capacitance element 90, the amount of phase shift of the electromagnetic wave in the vicinity of 22.50 GHz of the unit structure 10*o* changes to about −114°. Note that the capacitance of the variable capacitance element 96 is not limited to 0.005 pF, and may be arbitrarily changed according to the design from the variable capacitance element 90.

As described above, in the twelfth embodiment, the capacitance between the resonators can be changed by changing the voltage applied to the variable capacitance element connected between each of the resonators and each of the reference conductors. Thus, in the twelfth embodiment, the refraction angle, the convergence degree, and the transmittance of the radio wave can be dynamically controlled.

First Variation of Twelfth Embodiment

A first variation of the twelfth embodiment of the present disclosure will be described.

Configuration of Unit Structure

Figure 44:
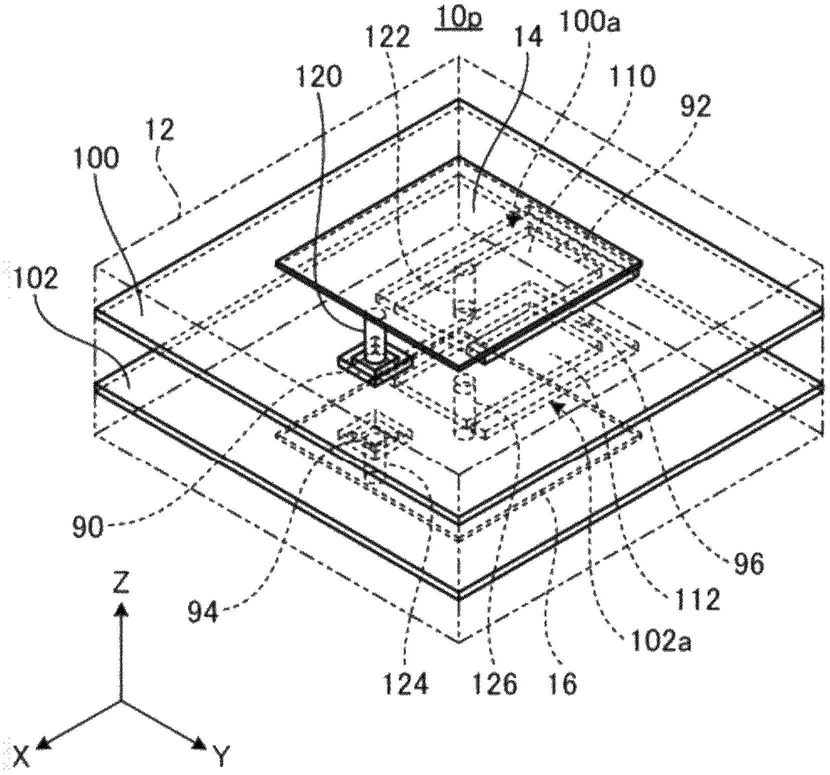
FIG. 44 is a diagram illustrating a configuration example of a unit structure according to a first variation of the twelfth embodiment.
Figure 45:
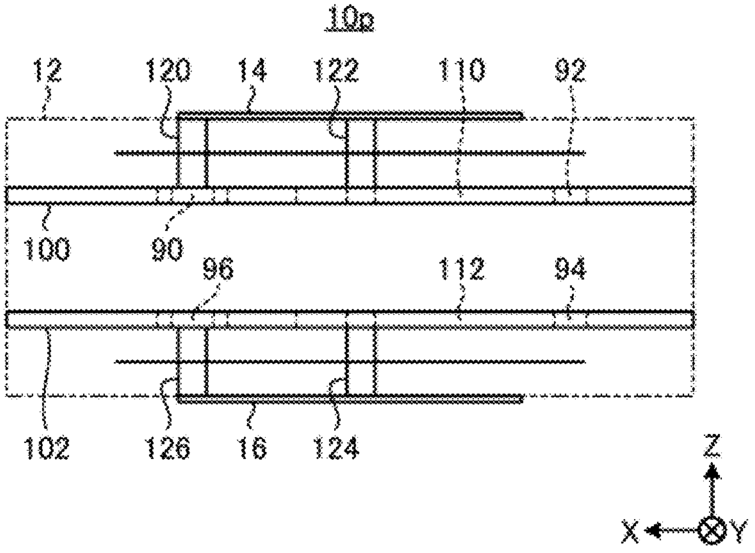
FIG. 45 is a cross-sectional view of the configuration example of the unit structure according to the first variation of the twelfth embodiment.

A configuration example of the unit structure according to the first variation of the twelfth embodiment will be described with reference to FIGS. 44 and 45. FIG. 44 is a diagram illustrating the configuration example of the unit structure according to the first variation of the twelfth embodiment. FIG. 45 is a cross-sectional view of the configuration example of the unit structure according to the first variation of the twelfth embodiment.

As illustrated in FIGS. 44 and 45, a unit structure 10*p* differs from the unit structure 10*o* illustrated in FIGS. 42 and 43 in that the third resonator 110 faces the fourth resonator 112. That is, the unit structure 10*p* has a configuration in which the second reference conductor 102 and the fourth resonator 112 of the unit structure 10*o* illustrated in FIGS. 42 and 43 are rotated by 180° in the XY plane.

Also in the first variation of the twelfth embodiment, by applying a voltage to each of the variable capacitance element 96 from the variable capacitance element 90, the refraction angle, the convergence degree, and the transmittance of the radio wave can be dynamically controlled.

For example, assume that while the variable capacitance element 96 is not connected from the variable capacitance element 90, the unit structure 10*o* shifts the phase of the electromagnetic wave in the vicinity of 22.50 GHz by about −102°. In this case, when the capacitance of the variable capacitance element 96 is changed to 0.005 pF (Pico Farad) from the variable capacitance element 90, the amount of phase shift of the electromagnetic wave in the vicinity of 22.50 GHz of the unit structure 10*o* changes to about −143°. Note that the capacitance of the variable capacitance element 96 is not limited to 0.005 pF, and may be arbitrarily changed according to the design from the variable capacitance element 90.

Second Variation of Twelfth Embodiment

A second variation of the twelfth embodiment of the present disclosure will be described.

In the twelfth embodiment, the description has been given that the voltage is applied to the variable capacitance element connected between each of the resonators and each of the reference conductors to change the resonance frequency of the unit structures 10*n*, thereby changing the refraction angle of the radio wave refracting plate or the like. In the present disclosure, the method of changing the resonance frequency of the unit structure 10*n* is not limited thereto.

In the present disclosure, for example, to change the resonance frequency of the unit structure 10*n*, in the first reference conductor 100 or the second reference conductor 102, a part of the first reference conductor 100 or the second reference conductor 102 may be trimmed to widen the gap. Thus, for example, since the strength of the magnetic or capacitive connection between the first reference conductor 100 and the third resonator 110 also changes, the resonant frequency of the unit structure 10*n* can also be changed.

Third Variation of Twelfth Embodiment

A third variation of the twelfth embodiment of the present disclosure will be described.

In the twelfth embodiment, the description has been given that the respective variable capacitance elements are connected between the respective resonators. Variable inductors may be connected between the respective resonators.

The respective resonators are magnetically or capacitively connected. Therefore, the variable capacitance elements or the variable inductors only need to be connected between the respective resonators in accordance with the balance between the magnetic coupling and the capacitive coupling of the respective resonators.

Thirteenth Embodiment

A thirteenth embodiment of the present disclosure will be described.

In the twelfth embodiment, the description has been given that the resonance frequency is changed by connecting the variable capacitance element between the resonators or between the resonator and the reference conductor. As described in the thirteenth embodiment, a liquid crystal may be interposed between the reference conductors.

Figure 46:
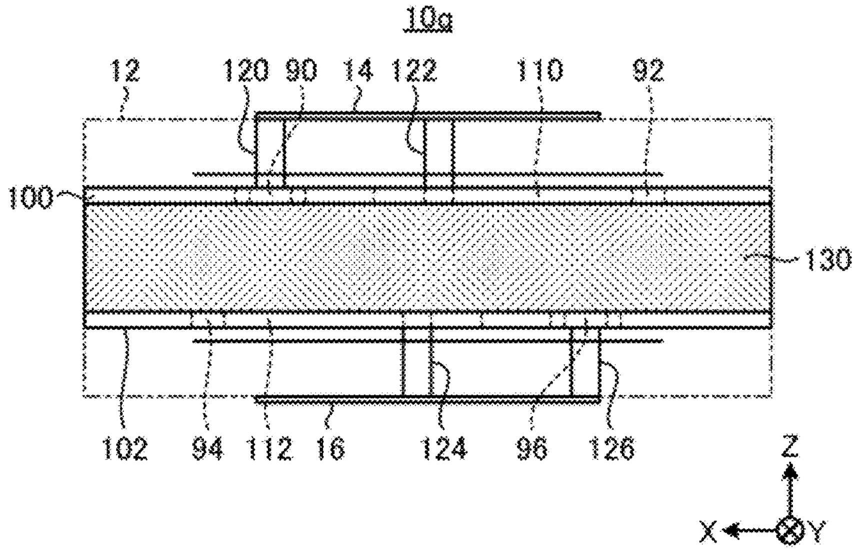
FIG. 46 is a cross-sectional view of a configuration example of a unit structure according to a thirteenth embodiment.

FIG. 46 is a cross-sectional view of the configuration example of the unit structure according to the thirteenth embodiment.

As illustrated in FIG. 46, a unit structure 10*q* includes the substrate 12, the first resonator 14, the second resonator 16, the variable capacitance element 90, the variable capacitance element 92, the variable capacitance element 94, the variable capacitance element 96, the variable capacitance element 98, the first reference conductor 100, the second reference conductor 102, the third resonator 110, the fourth resonator 112, the connection line path 120, the connection line path 122, the connection line path 124, the connection line path 126, and a dielectric constant variable material 130. Since the unit structure 10*q* is the same as the unit structure 10*o* illustrated in FIGS. 42 and 43 except that the unit structure 10*q* includes the dielectric constant variable material 130, the description thereof will be omitted.

As illustrated in FIG. 46, the dielectric constant variable material 130 is interposed between the first reference conductor 100 and the second reference conductor 102. The dielectric constant variable material 130 changes a dielectric constant when a voltage is applied. Examples of the dielectric constant variable material 130 include, but are not limited to, a liquid crystal.

In the thirteenth embodiment, the resonance frequency of the unit structure 10*q* can be changed by changing the dielectric constant by applying a voltage to the dielectric constant variable material 130. That is, in the thirteenth embodiment, the resonant frequency of the dielectric constant of the unit structure 10*q* can be controlled by controlling the dielectric constant of the dielectric constant variable material 130.

As described above, in the thirteenth embodiment, changing the dielectric constant of the dielectric constant variable material 130 interposed between the first reference conductor 100 and the second reference conductor 102 makes it possible to change the resonance frequency of the unit structure 10*q*. Thus, in the thirteenth embodiment, the refraction angle, the convergence degree, and the transmittance of the radio wave can be dynamically controlled.

Variation of Thirteenth Embodiment

In the thirteenth embodiment, the dielectric constant variable material 130 has been described as being interposed between the first reference conductor 100 and the second reference conductor 102 to change the dielectric constant. In the present disclosure, the configuration for changing the dielectric constant is not limited thereto.

For example, in a variation of the thirteenth embodiment, in FIG. 46, the substrate 12 may be made of a dielectric constant variable material, such as a liquid crystal. In this case, the dielectric constant can be changed by applying a voltage to the substrate 12.

As described above, in the variation of the thirteenth embodiment, changing the dielectric constant of the substrate 12 made of the dielectric constant variable material, such as a liquid crystal, makes it possible to change the resonance frequency of the unit structure 10*q*. Thus, in the variation of the thirteenth embodiment, the refraction angle, the convergence degree, and the transmittance of the radio wave can be dynamically controlled.

Fourteenth Embodiment

Figure 47:
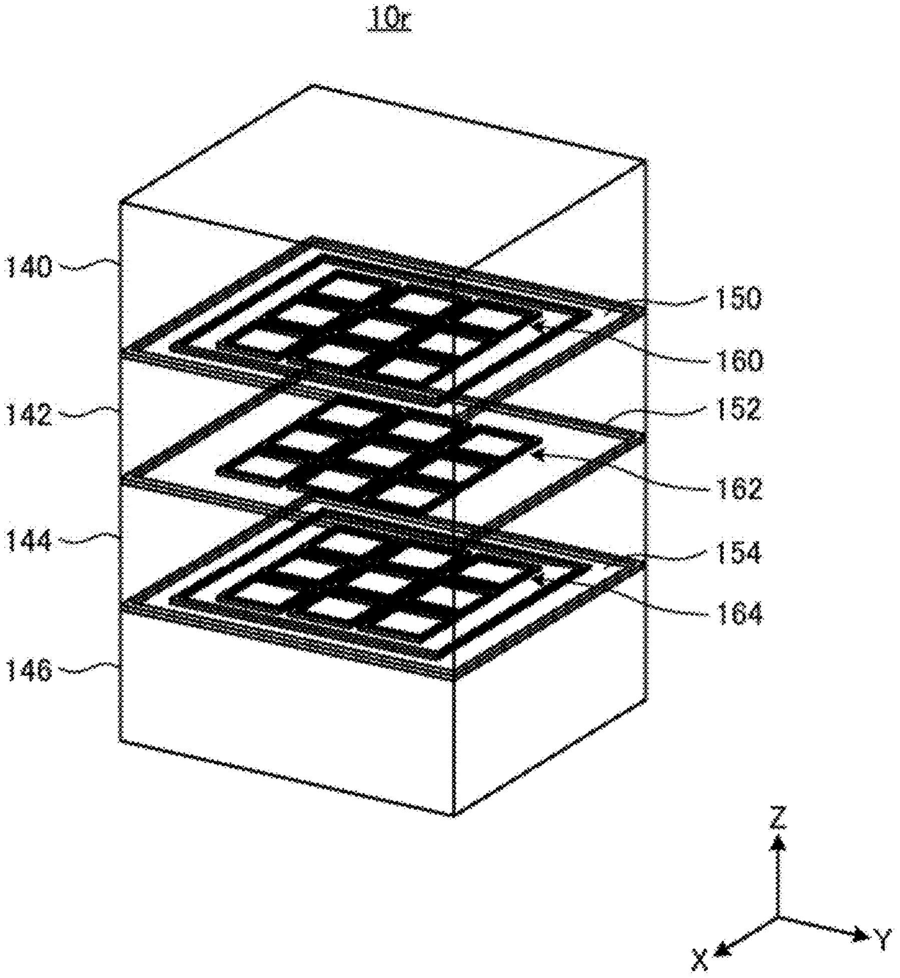
FIG. 47 is a diagram illustrating a configuration example of a unit structure according to a fourteenth embodiment.

A fourteenth embodiment of the present disclosure will be described. FIG. 47 is a diagram illustrating a configuration example of a unit structure according to the fourteenth embodiment.

As illustrated in FIG. 47, a unit structure 10*r* includes a first dielectric layer 140, a second dielectric layer 142, a third dielectric layer 144, a fourth dielectric layer 146, a first reference conductor 150, a second reference conductor 152, a third reference conductor 154, a first floating conductor 160, a second floating conductor 162, and a third floating conductor 164. The first reference conductor 150 and the first floating conductor 160 are formed in the same layer. The second reference conductor 152 and the second floating conductor 162 are formed in the same layer. The third reference conductor 154 and the third floating conductor 164 are formed in the same layer. In the unit structure 10*r*, the fourth dielectric layer 146, the third reference conductor 154 and the third floating conductor 164, the third dielectric layer 144, the second reference conductor 152 and the second floating conductor 162, the second dielectric layer 142, the first reference conductor 150 and the first floating conductor 160 are stacked in this order from the bottom.

The first dielectric layer 140 is formed in the uppermost layer. The first dielectric layer 140 extends on the XY plane. The first dielectric layer 140 is a part of the substrate 12. The dielectric constant, the thickness, and the like of the first dielectric layer 140 may be arbitrarily changed according to the design.

Figure 48:
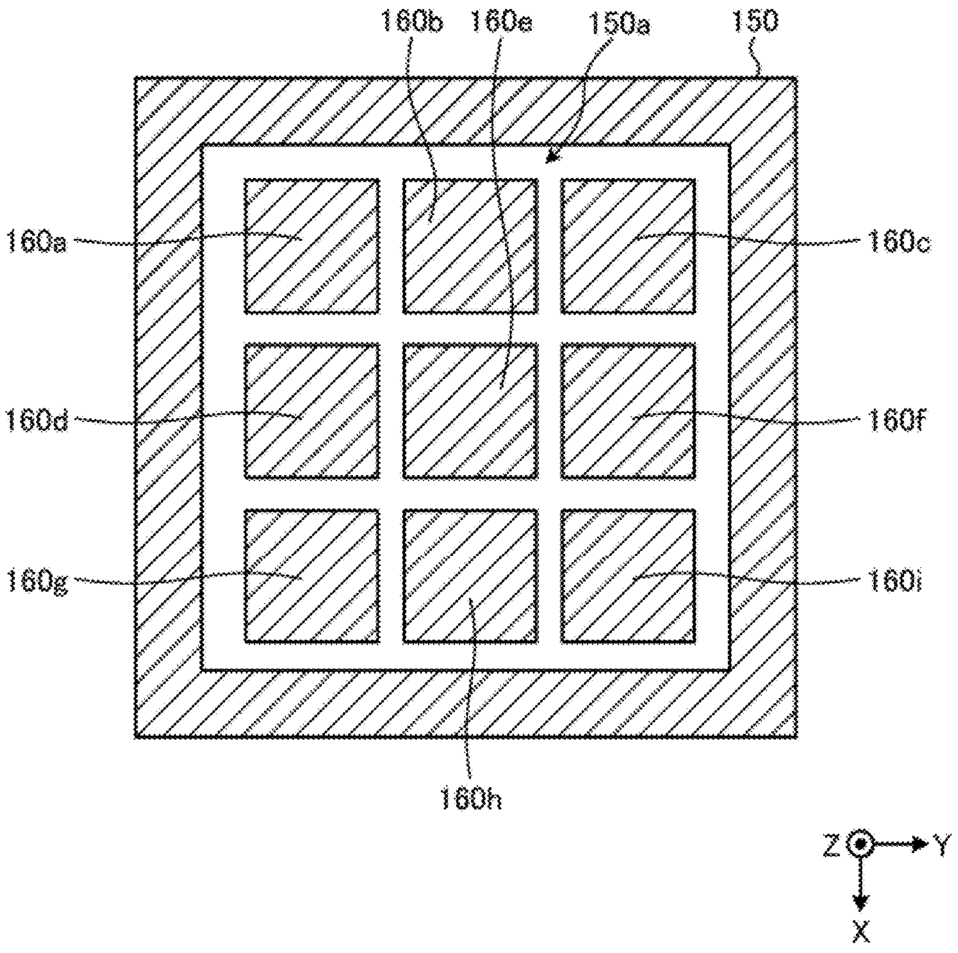
FIG. 48 is a diagram illustrating a configuration example of a coupling layer according to the fourteenth embodiment.

The first reference conductor 150 and the first floating conductor 160 are formed in a layer immediately below the first dielectric layer 140. The first reference conductor 150 and the first floating conductor 160 may also be referred to as coupling layers. FIG. 48 is a diagram illustrating a configuration example of the coupling layer according to the fourteenth embodiment.

As illustrated in FIG. 48, the first reference conductor 150 extends on the XY plane. The first reference conductor 150 may be formed in a square frame shape. The first reference conductor 150 has a square gap 150*a*. The size of the gap 150*a* can be arbitrarily changed according to the design. The first floating conductor 160 is disposed in the gap 150*a*. The first reference conductor 150 can also be referred to as a first frame-shaped conductor.

The first floating conductor 160 extends on the XY plane. The first floating conductor 160 includes, for example, a conductor 160*a*, a conductor 160*b*, a conductor 160*c*, a conductor 160*d*, a conductor 160*e*, a conductor 160*f*, a conductor 160*g*, a conductor 160*h*, and a conductor 160*i*.

The conductor 160*a* to the conductor 160*i* extend on the XY plane. The conductor 160*a* to the conductor 160*i* may be patch conductors formed in a square shape. The conductor 160*a* to the conductor 160*i* may be arranged in a square shape. In other words, the first floating conductor 160 has a structure in which one square conductor is equally divided into nine.

A clearance is formed between the conductor 160*a* and the first reference conductor 150. A clearance is formed between the conductor 160*a* and the conductor 160*b*. A clearance is formed between the conductor 160*a* and the conductor 160*d*. The conductor 160*a* and the conductor 160*b* are magnetically or capacitively connected. The conductor 160*a* and conductor 160*d* are magnetically or capacitively connected.

A clearance is formed between the conductor 160*b* and the first reference conductor 150. A clearance is formed between the conductor 160*b* and the conductor 160*c*. A clearance is formed between the conductor 160*b* and the conductor 160*e*. The conductor 160*b* and the conductor 160*c* are magnetically or capacitively connected. The conductor 160*b* and the conductor 160*e* are magnetically or capacitively connected.

A clearance is formed between the conductor 160*c* and the first reference conductor 150. A clearance is formed between the conductor 160*c* and the conductor 160*f*. The conductor 160*c* and the conductor 160*f* are magnetically or capacitively connected.

A clearance is formed between the conductor 160*d* and the first reference conductor 150. A clearance is formed between the conductor 160*d* and the conductor 160*e*. A clearance is formed between the conductor 160*d* and the conductor 160*g*. The conductor 160*d* and the conductor 160*e* are magnetically or capacitively connected. The conductor 160*d* and the conductor 160*g* are magnetically or capacitively connected.

A clearance is formed between the conductor 160*e* and the conductor 160*f*. A clearance is formed between the conductor 160*e* and the conductor 160*h*. The conductor 160*e* and the conductor 160*f* are magnetically or capacitively connected. The conductor 160*e* and conductor 160*h* are magnetically or capacitively connected.

A clearance is formed between the conductor 160*f* and the first reference conductor 150. A clearance is formed between the conductor 160*f* and the conductor 160*i*. The conductor 160*f* and the conductor 160*i* are magnetically or capacitively connected.

A clearance is formed between the conductor 160*g* and the first reference conductor 150. A clearance is formed between the conductor 160*g* and the conductor 160*h*. The conductor 160*g* and the conductor 160*h* are magnetically or capacitively connected.

A clearance is formed between the conductor 160*h* and the first reference conductor 150. A clearance is formed between the conductor 160*h* and the conductor 160*i*. The conductor 160*h* and the conductor 160*i* are magnetically or capacitively connected.

A clearance is formed between the conductor 160*i* and the first reference conductor 150.

In the example illustrated in FIG. 48, the first floating conductor 160 has been described as having the structure in which one square conductor is divided into nine, but the present disclosure is not limited thereto. The first floating conductor 160 has, for example, a structure in which one square conductor is divided into two, four, or sixteen. The first floating conductor 160 may include, for example, one square conductor. That is, the configuration of the first floating conductor 160 may be arbitrarily changed according to the design.

Returning to FIG. 47, the second dielectric layer 142 is formed in a layer immediately below the first reference conductor 150 and the first floating conductor 160. The second dielectric layer 142 extends on the XY plane. The second dielectric layer 142 is a part of the substrate 12. The dielectric constant, the thickness, and the like of the second dielectric layer 142 may be arbitrarily changed according to the design.

The second reference conductor 152 and the second floating conductor 162 are formed in a layer immediately below the second dielectric layer 142. The second reference conductor 152 and the second floating conductor 162 may also be referred to as coupling layers.

The second reference conductor 152 extends on the XY plane. Similar to the first reference conductor 150 illustrated in FIG. 48, the second reference conductor 152 may be formed in a square frame shape. For example, the second reference conductor 152 has a frame width narrower than that of the first reference conductor 150. The frame width of the second reference conductor 152 may be arbitrarily changed according to the design. The second reference conductor 152 may also be referred to as a second frame-shaped conductor.

The second floating conductor 162 extends on the XY plane. The second floating conductor 162 may include nine conductors, similar to the first floating conductor 160 illustrated in FIG. 48. For example, the nine conductors included in the second floating conductor 162 are smaller than the conductor 160*a* to the conductor 160*i* illustrated in FIG. 48. The sizes of the nine conductors included in the second floating conductor 162 may be arbitrarily changed according to the design. The configuration of the second floating conductor 162 may be arbitrarily changed according to the design. The first floating conductor 160 and the second floating conductor 162 may be magnetically or capacitively connected.

The third dielectric layer 144 is formed in a layer immediately below the second reference conductor 152 and the second floating conductor 162. The third dielectric layer 144 extends on the XY plane. The third dielectric layer 144 is a part of the substrate 12. The dielectric constant, the thickness, and the like of the third dielectric layer 144 may be arbitrarily changed according to the design.

The third reference conductor 154 and the third floating conductor 164 are formed in a layer immediately below the third dielectric layer 144. The third reference conductor 154 and the third floating conductor 164 may also be referred to as coupling layers.

The third reference conductor 154 extends on the XY plane. The third reference conductor 154 has a configuration as that of the first reference conductor 150 illustrated in FIG. 48. The configuration of the third reference conductor 154 may be arbitrarily changed according to the design. The third reference conductor 154 may also be referred to as a third frame-shaped conductor.

The third floating conductor 164 extends on the XY plane. The third floating conductor 164 has a configuration as that of the first floating conductor 160 illustrated in FIG. 48. The configuration of the third floating conductor 164 may be arbitrarily changed according to the design. The second floating conductor 162 and the third floating conductor 164 may be magnetically or capacitively connected.

The fourth dielectric layer 146 is formed in a layer immediately below the third reference conductor 154 and the third floating conductor 164. The fourth dielectric layer 146 extends on the XY plane. The fourth dielectric layer 146 is a part of the substrate 12. The dielectric constant, the thickness, and the like of the fourth dielectric layer 146 may be arbitrarily changed according to the design.

That is, the unit structure 10*r* includes the four dielectric layers and the three coupling layers. According to the above-described configuration, in the unit structure 10*r*, the first dielectric layer 140, the second dielectric layer 142, the third dielectric layer 144, and the fourth dielectric layer 146 can be used as resonators.

Figure 49:
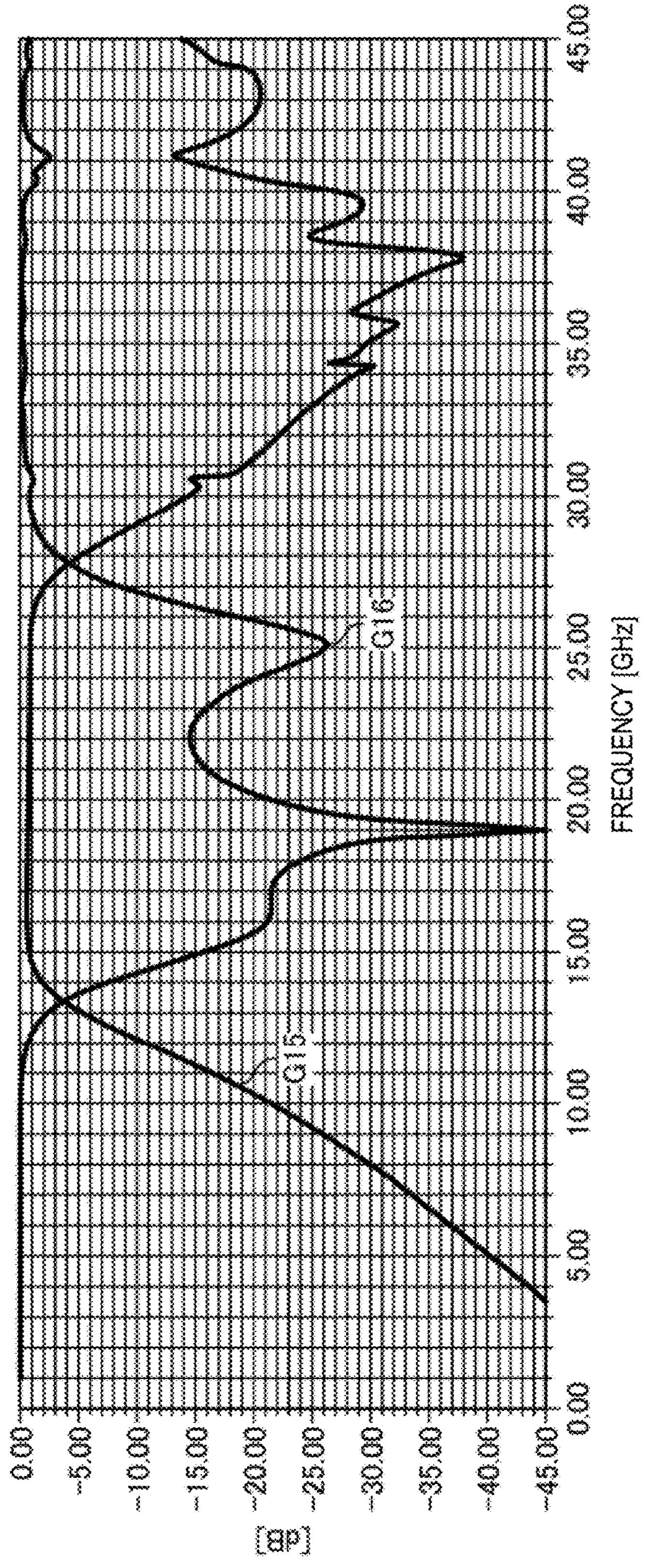
FIG. 49 is a graph showing frequency characteristics of the unit structure according to the fourteenth embodiment.

Frequency characteristics of the unit structure according to the fourteenth embodiment will be described with reference to FIG. 49. FIG. 49 is a graph showing the frequency characteristics of the unit structure according to the fourteenth embodiment.

In FIG. 49, the horizontal axis represents the frequency [GHz] and the vertical axis represents the gain [dB]. FIG. 49 shows a graph G15 and a graph G16. The graph G15 indicates a transmission coefficient. The graph G16 indicates a reflection coefficient. FIG. 49 shows reflection characteristics in a case where the electromagnetic wave is incident on the fourth dielectric layer 146 along the Z-axis direction and is radiated from the first dielectric layer 140. The graph G15 indicates that insertion loss in a region from the vicinity of 14.00 GHz to the vicinity of 27.00 GHz is −3 dB or more and transmission characteristics are satisfactory. The graph G16 indicates that reflection coefficient in a region from the vicinity of 14.00 GHz to the vicinity of 27.00 GHz is not more than ~10 dB and reflection characteristics are satisfactory. That is, the unit structure 10*r* illustrated in FIG. 47 has satisfactory transmission characteristics and reflection characteristics in the region from the vicinity of 14.00 GHz to the vicinity of 27.00 GHz.

Figure 50:
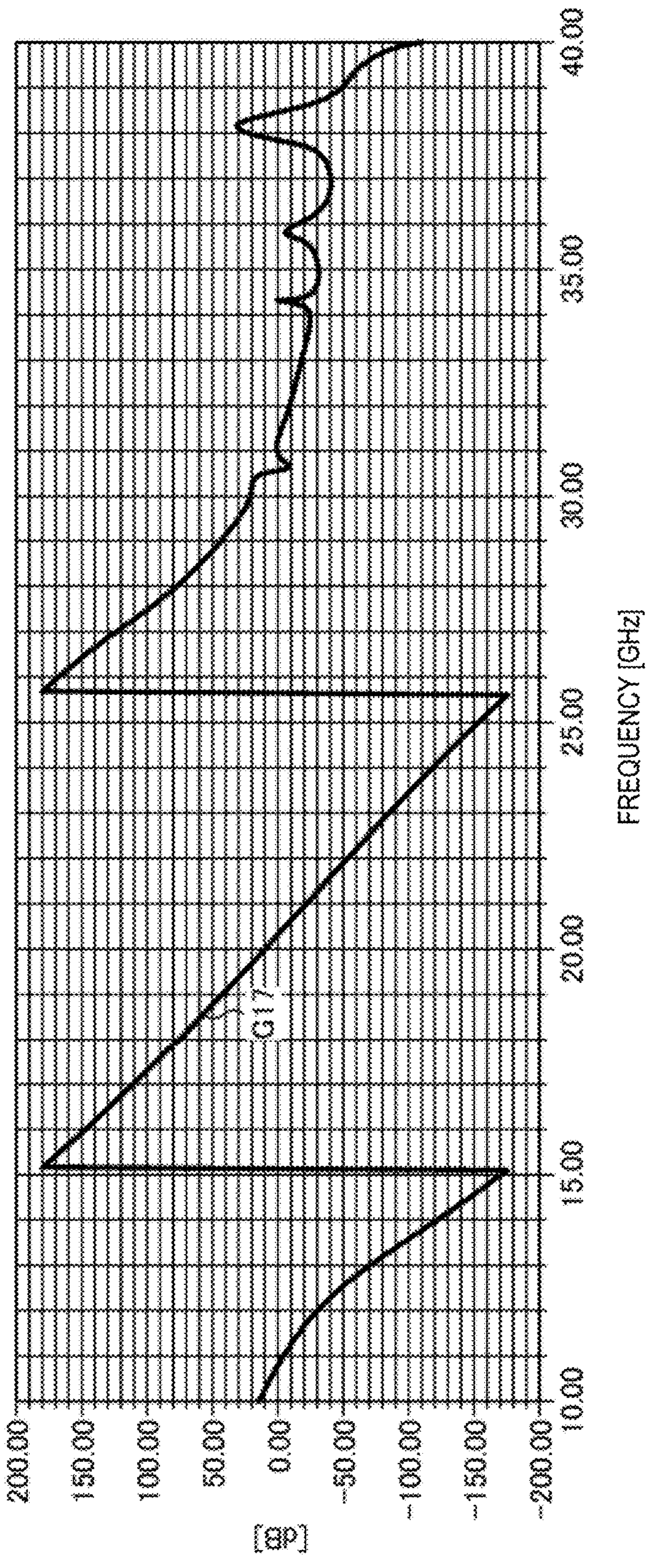
FIG. 50 is a graph showing an amount of change in phase of the unit structure according to the fourteenth embodiment.

The amount of change in phase of the unit structure according to the fourteenth embodiment will be described with reference to FIG. 50. FIG. 50 is a graph showing the amount of change in phase of the unit structure according to the fourteenth embodiment.

In FIG. 50, the horizontal axis represents the frequency [GHz] and the vertical axis represents the amount of change in phase [deg]. FIG. 50 shows a graph G17. FIG. 50 shows the amount of change in phase in a case where the electromagnetic wave is incident on the fourth dielectric layer 146 along the Z-axis direction and is radiated from the first dielectric layer 140. As shown in the graph G17, the unit structure 10*r* can change the phase of the electromagnetic wave incident on the fourth dielectric layer 146 by 360° within a range from the vicinity of 15.00 GHz to the vicinity of 26.00 GHz.

As described above, in the fourteenth embodiment, the dielectric layer is used as the resonator. Thus, in the fourteenth embodiment, since the unit structure can be formed by the three conductor layers, an influence of positional deviation between the conductor layers can be reduced. In the fourteenth embodiment, since the unit structure can be formed by the three conductor layers, the thickness of the unit structure can be thinned. Thus, in the fourteenth embodiment, for example, the conductor layer or the like is made of a transparent electrode, and the radio wave refracting plate is pasted to a transparent plate made of glass or the like for use. Thus, deterioration of transmittance of visible light or deterioration of fine appearance due to the influence of the radio wave refracting plate can be reduced.

Variation of Fourteenth Embodiment

Figure 51:
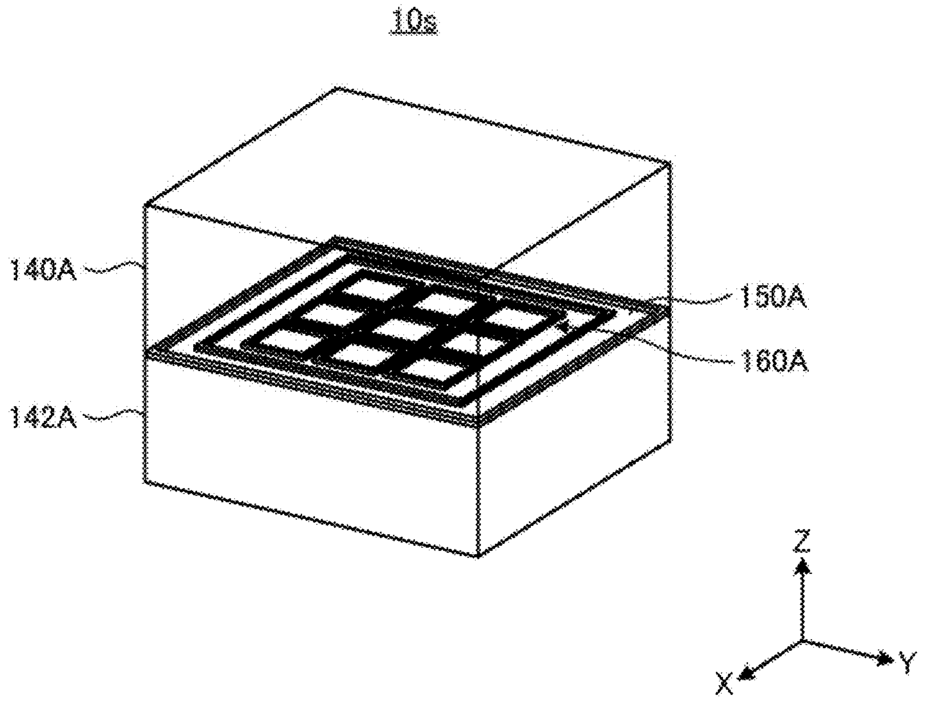
FIG. 51 is a diagram illustrating a configuration example of the unit structure according to the fourteenth embodiment.

A variation of the fourteenth embodiment of the present disclosure will be described. FIG. 51 is a diagram illustrating a configuration example of a unit structure according to the fourteenth embodiment.

As illustrated in FIG. 51, a unit structure 10*s* includes a first dielectric layer 140A, a second dielectric layer 142A, a first reference conductor 150A, and a first floating conductor 160A. The first reference conductors 150A and the first floating conductors 160A are formed in the same layer. The unit structure 10*s* differs from the unit structure 10*r* illustrated in FIG. 47 in that it does not include the third dielectric layer 144, the fourth dielectric layer 146, the second reference conductor 152, the third reference conductor 154, the second floating conductor 162, or the third floating conductor 164. That is, the unit structure 10*s* includes the two dielectric layers and one coupling layer.

The dielectric constants, the thicknesses, and the like of the first dielectric layer 140A and the second dielectric layer 142A may be arbitrarily changed according to the design. The configuration of the first reference conductor 150A may be arbitrarily changed according to the design. The configuration of the first floating conductor 160A may be arbitrarily changed according to the design.

Figure 52:
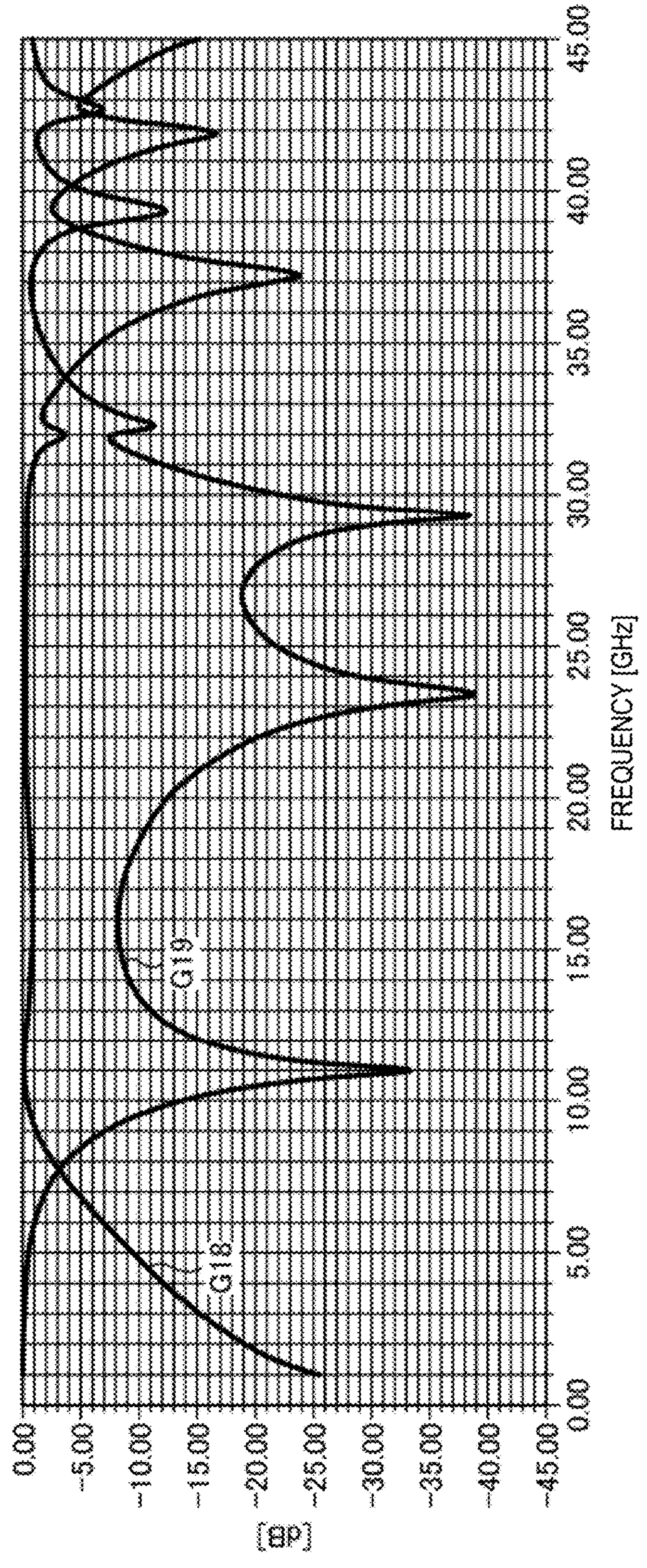
FIG. 52 is a graph showing frequency characteristics of a unit structure according to a variation of the fourteenth embodiment.

Frequency characteristics of the unit structure according to the variation of the fourteenth embodiment will be described with reference to FIG. 52. FIG. 52 is a graph showing the frequency characteristics of the unit structure according to the variation of the fourteenth embodiment.

In FIG. 52, the horizontal axis represents the frequency [GHz] and the vertical axis represents the gain [dB]. FIG. 52 shows a graph G18 and a graph G19. The graph G18 indicates a transmission coefficient. The graph G19 indicates a reflection coefficient. FIG. 52 shows reflection characteristics in a case where the electromagnetic wave is incident on the second dielectric layer 142A along the Z-axis direction and is radiated from the first dielectric layer 140A. The graph G18 indicates that insertion loss in a region over a wide range from the vicinity of 10.00 GHz to the vicinity of 30.00 GHz is −3 dB or more and transmission characteristics are satisfactory. The graph G19 indicates that reflection coefficient in a region from the vicinity of 14.00 GHz to the vicinity of 27.00 GHz is not more than −10 dB and reflection characteristics are satisfactory. That is, the unit structure 10*r* illustrated in FIG. 47 has satisfactory transmission characteristics and reflection characteristics in the region from the vicinity of 14.00 GHz to the vicinity of 27.00 GHz.

As described above, in the variation of the fourteenth embodiment, since the unit structure can be formed by one conductor layer, the thickness can be further thinned, and thus the influence of the positional deviation of the conductor layer can be further reduced. In the variation of the fourteenth embodiment, for example, the conductor layer or the like is made of a transparent electrode, and the radio wave refracting plate is applied to a transparent plate made of glass or the like for use. Thus, deterioration of transmittance of visible light or deterioration of fine appearance due to the influence of the radio wave refracting plate can be further reduced.

The embodiments of the present disclosure have been described above, and the element of the embodiments has a function as a spatial filter. As a result, controlling the phase by a frequency shift of the spatial filter allows the facilitated design. This eliminates the need for the element of the transmission plate to have a similar shape, and can also function as a transmission plate even when elements of various embodiments are mixed. In this case, as a property of a general filter, when the number of stages and coupling between the elements are determined, a phase as a normalized filter is also determined. That is, the initial phase of the filter can be changed by coupling the resonators inductive or capacitive. For example, in the spatial filter, making the low-phase side of the element of the transmission plate capacitive and the high-phase side inductive may facilitate the design. For example, in the spatial filter, the design may be facilitated by making the low-phase side of the element of the transmission plate inductive and the high-phase side capacitive. The boundary between the low-phase side and the high-phase side is not limited to 180°, and various angles, such as 120°, 135°, 150°, 210°, 225°, and 240°, may be employed. When the phase range in one supercell of the spatial filter is from 0° to 360°×n, a plurality of phase boundaries may be included. The boundaries of the plurality of phases are not limited to a single angle and may be individually independent.

Embodiments of the present disclosure have been described above, but the present disclosure is not limited by the contents of the embodiments. Constituent elements described above include those that can be easily assumed by a person skilled in the art, those that are substantially identical to the constituent elements, and those within a so-called range of equivalency. The constituent elements described above can be combined as appropriate. Various omissions, substitutions, or modifications of the constituent elements can be made without departing from the spirit of the above-described embodiments.

REFERENCE SIGNS

1 Radio wave refracting plate
10 Unit structure
12 Substrate
14 First resonator
16 Second resonator
18, 60, 62, 64, 66, 68, 70 Reference conductor
20, 120, 122, 124, 126 Connection line path
22, 110 Third resonator
24 First auxiliary reference conductor
26 Second auxiliary reference conductor
30, 112 Fourth resonator
40, 100, 150 First reference conductor
42,102,152 Second reference conductor
44, 154 Third reference conductor
80, 82 Connection conductor
90, 92, 94, 96, 98 Variable capacitance element
140 First dielectric layer
142 Second dielectric layer
144 Third dielectric layer
146 Fourth dielectric layer
160 First floating conductor
162 Second floating conductor
164 Third floating conductor

The invention claimed is:

1. A radio wave refracting plate, comprising a plurality of unit structures arrayed in a first plane direction, wherein
each of the plurality of unit structures comprises:
a first resonator extending in the first plane direction;
a second resonator positioned away from the first resonator in a first direction, and extending in the first plane direction;
a first reference conductor located between the first resonator and the second resonator, and extending in the first plane direction, wherein the first reference conductor comprises a first gap;
a third resonator located between the first reference conductor and the second resonator, and extending in the first plane direction; and
a second reference conductor located between the third resonator and the second resonator, and extending in the first plane direction, wherein the second reference conductor comprises a second gap,
wherein the first resonator is magnetically or capacitively connected to the second resonator in the first direction, and
wherein each of the first reference conductor and the second reference conductor is configured to serve as a reference potential of the plurality of unit structures.

2. The radio wave refracting plate according to claim 1, wherein
the first resonator and the second resonator have N-fold rotational symmetry in the first plane direction, where N is an integer of 3 or more.

3. The radio wave refracting plate according to claim 1, wherein the first reference conductor comprises the first gap to have N-fold rotational symmetry in the first plane direction, where N is an integer of 3 or more.

4. The radio wave refracting plate according to claim 1, wherein the first reference conductor and the second reference conductor have a same shape.

5. The radio wave refracting plate according to claim 1, further comprising:

a fourth resonator located between the second reference conductor and the second resonator and extending in the first plane direction; and a third reference conductor located between the fourth resonator and the second resonator, and extending in the first plane direction, wherein the third reference conductor comprises a third gap.

6. The radio wave refracting plate according to claim 1, wherein among the plurality of unit structures, two unit structures adjacently located in a second direction as an in-plane direction of the first plane direction are configured to generate a phase difference when electromagnetic waves incident on the first resonator are radiated from the second resonator.

7. The radio wave refracting plate according to claim 6, wherein as the phase advances in a forward direction or a reverse direction in the plurality of unit structures arranged in the second direction, the phase difference increases with respect to a reference unit structure among the plurality of unit structures.

8. The radio wave refracting plate according to claim 6, wherein as the phase advances in a forward direction or a reverse direction in the plurality of unit structures arranged in the second direction, the phase advances or retards by a first phase difference.

9. The radio wave refracting plate according to claim 6, wherein among the plurality of unit structures, two unit structures adjacently located in a third direction intersecting with the second direction as the in-plane direction of the first plane direction are configured to radiate the electromagnetic waves in a same phase when the electromagnetic waves incident on the first resonator are radiated from the second resonator.

10. The radio wave refracting plate according to claim 6, wherein among the plurality of unit structures, two unit structures adjacently located in a first radiation direction as the in-plane direction of the first plane direction are configured to generate a phase difference when the electromagnetic waves incident on the first resonator are radiated from the second resonator.

11. The radio wave refracting plate according to claim 10, wherein as the phase advances in a forward direction or a reverse direction in the plurality of unit structures arranged in the first radiation direction, the phase difference increases with respect to a reference unit structure among the plurality of unit structures.

12. The radio wave refracting plate according to claim 10, wherein as the phase advances in a forward direction or a reverse direction in the plurality of unit structures arranged in the first radiation direction, the phase advances or retards by a second phase difference.

13. The radio wave refracting plate according to claim 6, wherein among the plurality of unit structures, two unit structures adjacently located in a first circumferential direction as the in-plane direction of the first plane direction are configured to radiate the electromagnetic waves in a same phase when the electromagnetic waves incident on the first resonator are radiated from the second resonator.

14. A radio wave refracting plate, comprising a plurality of unit structures arrayed in a first plane direction, wherein each of the plurality of unit structures comprises:

a first resonator extending in the first plane direction;

a second resonator positioned away from the first resonator in a first direction and extending in the first plane direction;

a first reference conductor located between the first resonator and the second resonator, and extending in the first plane direction, wherein the first reference conductor comprises a first gap;

a third resonator disposed in the first gap of the first reference conductor;

a second reference conductor located between the first reference conductor and the second resonator, and extending in the first plane direction, wherein the second reference conductor comprises a second gap;

a fourth resonator disposed in the second gap of the second reference conductor; and a dielectric constant variable material interposed between the first reference conductor and the second reference conductor, wherein the first resonator is magnetically or capacitively connected to the second resonator in the first direction, and wherein each of the first reference conductor and the second reference conductor is configured to serve as a reference potential of the plurality of unit structures.

15. The radio wave refracting plate according to claim 14, wherein the dielectric constant variable material is a liquid crystal.

16. A unit structure for a radio wave refracting plate, comprising:

a first resonator extending in a first plane direction;

a second resonator positioned away from the first resonator in a first direction and extending in the first plane direction;

a first reference conductor located between the first resonator and the second resonator, and extending in the first plane direction, wherein the first reference conductor comprises a first gap;

a third resonator located between the first reference conductor and the second resonator, and extending in the first plane direction; and a second reference conductor located between the third resonator and the second resonator, and extending in the first plane direction, wherein the second reference conductor comprises a second gap, wherein the first resonator is magnetically or capacitively connected to the second resonator in the first direction, and wherein each of the first reference conductor and the second reference conductor is configured to serve as a reference potential for the radio wave refracting plate.

* * * * *